(12) United States Patent
Kuwa

(10) Patent No.: US 7,670,008 B2
(45) Date of Patent: Mar. 2, 2010

(54) OBLIQUE PROJECTION OPTICAL SYSTEM

(75) Inventor: Tomiei Kuwa, Musashino (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 1122 days.

(21) Appl. No.: 11/266,674

(22) Filed: Nov. 3, 2005
(Under 37 CFR 1.47)

(65) Prior Publication Data
US 2006/0164605 A1    Jul. 27, 2006

(30) Foreign Application Priority Data
Nov. 10, 2004   (JP) .............................. 2004-325954

(51) Int. Cl.
*G03B 21/28* (2006.01)
(52) U.S. Cl. .............................. 353/78; 353/99; 353/70
(58) Field of Classification Search .................. 353/77, 353/78, 79, 98, 99, 69, 70; 359/846, 850
See application file for complete search history.

(56) References Cited

U.S. PATENT DOCUMENTS

| | | | | |
|---|---|---|---|---|
| 5,274,406 | A * | 12/1993 | Tejima et al. .................. | 353/70 |
| 5,871,266 | A | 2/1999 | Negishi et al. | |
| 6,513,935 | B2 | 2/2003 | Ogawa | |
| 6,612,704 | B2 | 9/2003 | Ogawa | |
| 6,626,541 | B2 * | 9/2003 | Sunaga ......................... | 353/69 |
| 6,626,542 | B2 | 9/2003 | Baba et al. | |
| 6,631,994 | B2 * | 10/2003 | Suzuki et al. ................. | 353/77 |
| 6,752,500 | B1 | 6/2004 | Yoshii et al. | |
| 6,771,427 | B1 | 8/2004 | Matsuo | |
| 6,779,897 | B2 | 8/2004 | Konno et al. | |
| 6,822,811 | B2 | 11/2004 | Ishihara | |
| 6,848,794 | B2 * | 2/2005 | Sunaga ......................... | 353/98 |
| 6,850,361 | B1 | 2/2005 | Nakano et al. | |
| 6,883,922 | B2 | 4/2005 | Kurematsu et al. | |
| 7,133,217 | B2 * | 11/2006 | Chatani et al. ............... | 359/730 |
| 2006/0092385 | A1 | 5/2006 | Hisada et al. ................. | 353/70 |

FOREIGN PATENT DOCUMENTS

| | | |
|---|---|---|
| JP | 2001-215412 A | 8/2001 |
| JP | 2001-222063 A | 8/2001 |
| JP | 2001-264634 A | 9/2001 |
| JP | 2003-255229 A | 9/2003 |
| JP | 2004-258218 A | 9/2004 |

\* cited by examiner

*Primary Examiner*—William C. Dowling
(74) *Attorney, Agent, or Firm*—Sidley Austin LLP

(57) ABSTRACT

In an oblique projection optical system for performing enlargement projection from a primary image surface on the reduction side to a secondary image surface on the enlargement side, at least one reflective surface having an optical power is provided, and, assuming that of the aforementioned surfaces, the reflective surface located on the most secondary image surface side in the optical path is a first curved reflective surface, the first curved reflective surface has a portion having a positive optical power and a portion having a negative optical power.

22 Claims, 29 Drawing Sheets

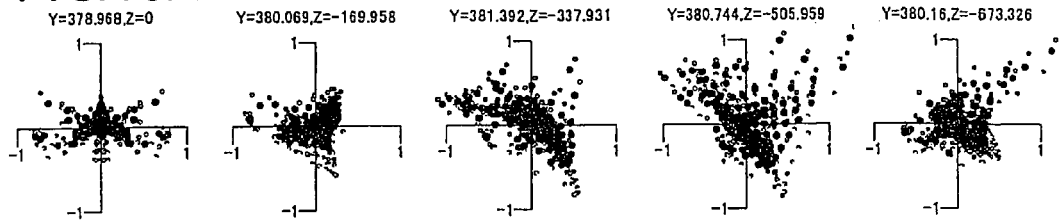
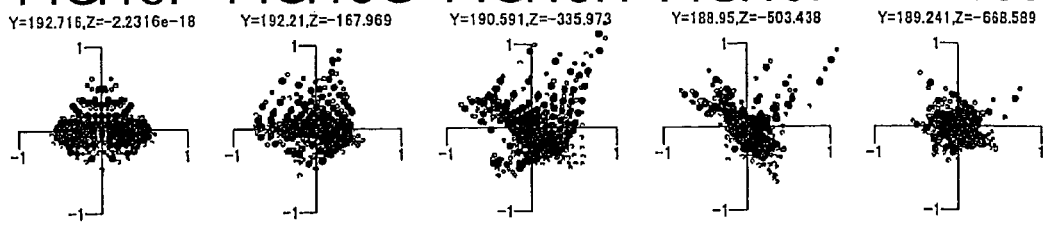
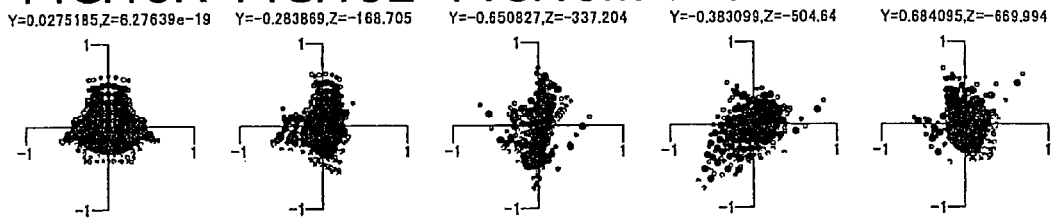
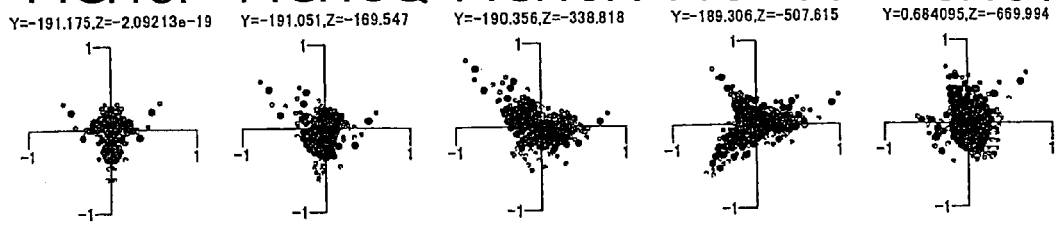
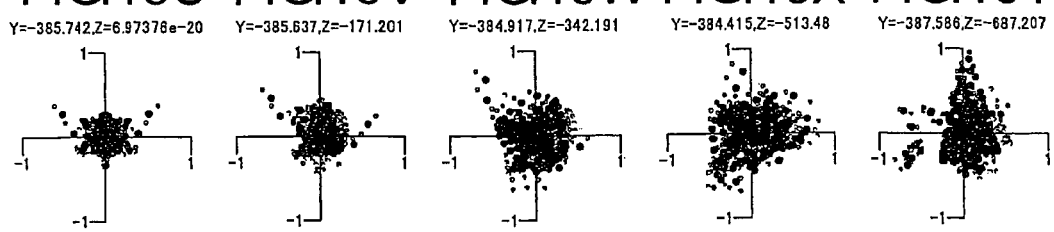

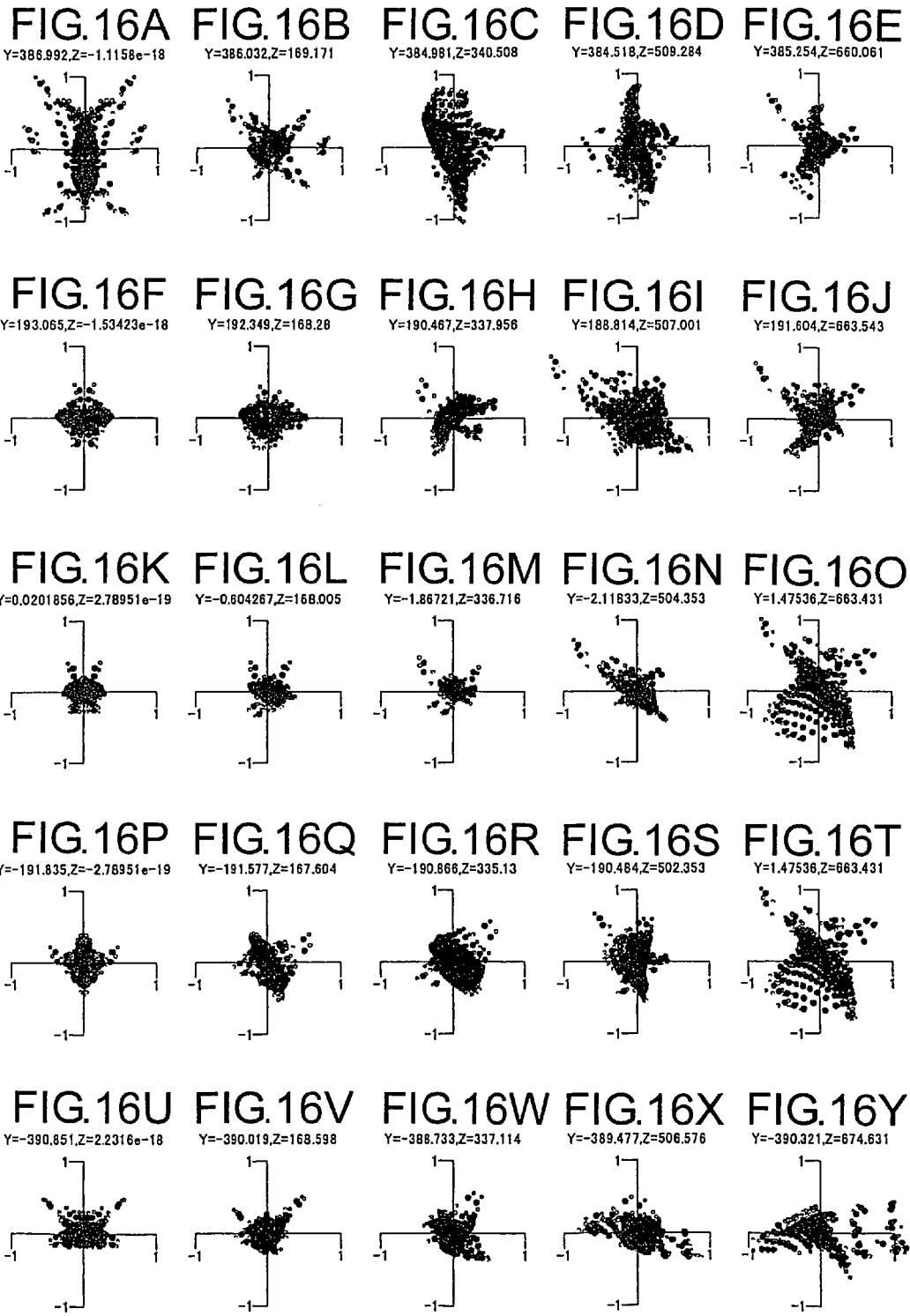

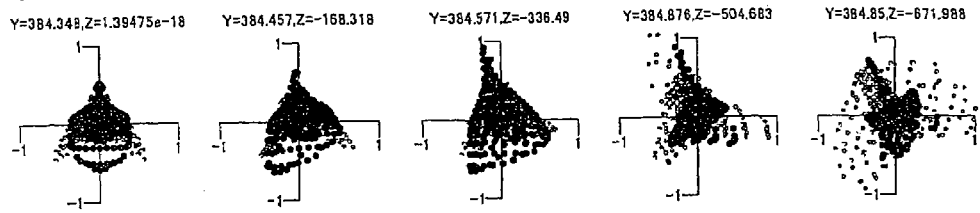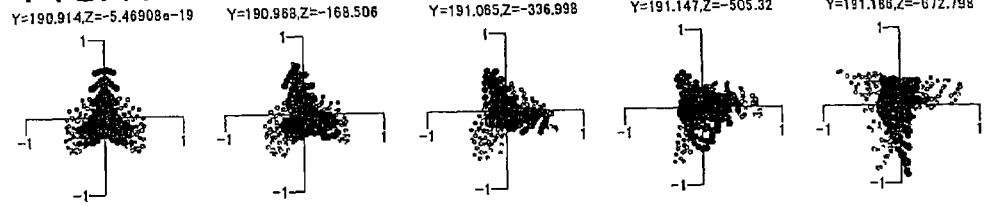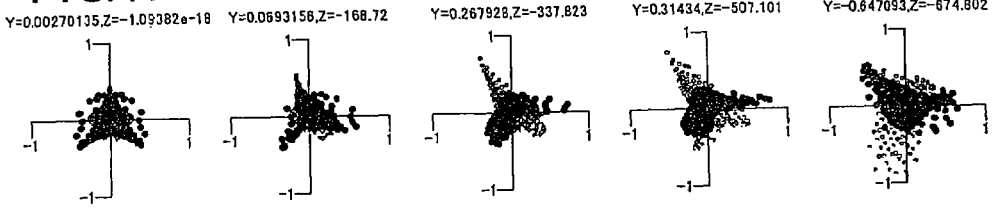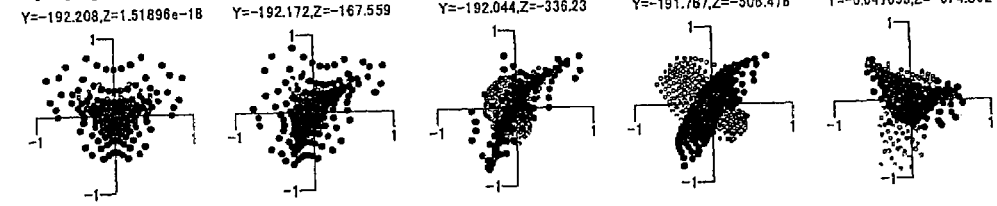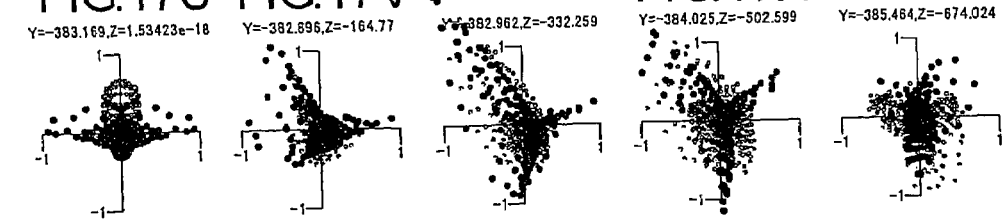

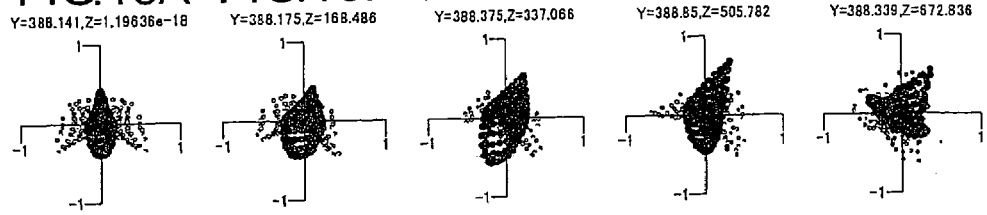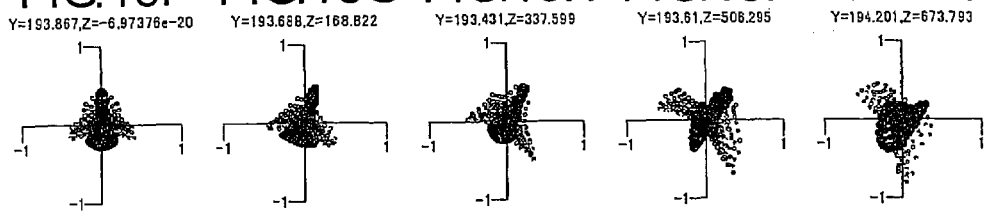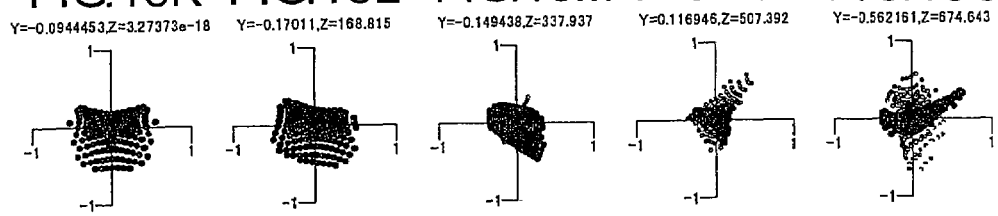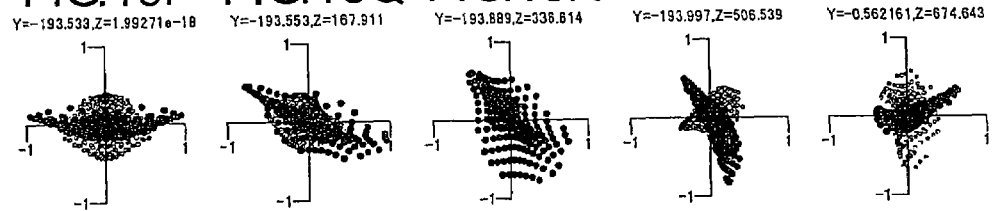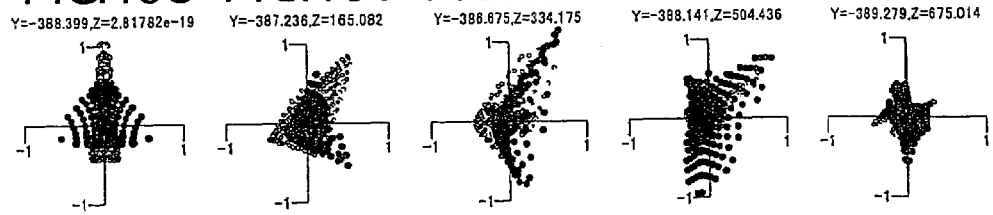

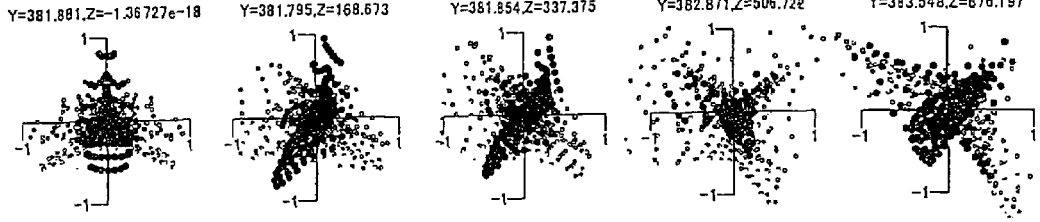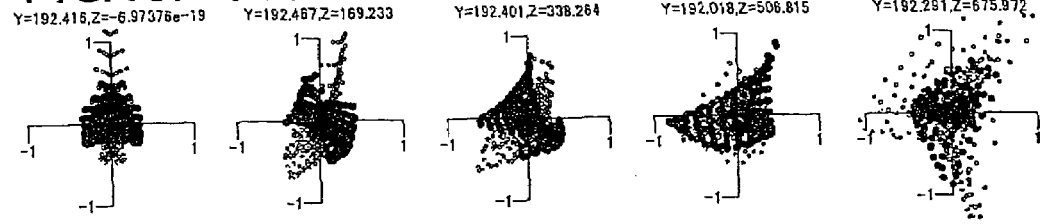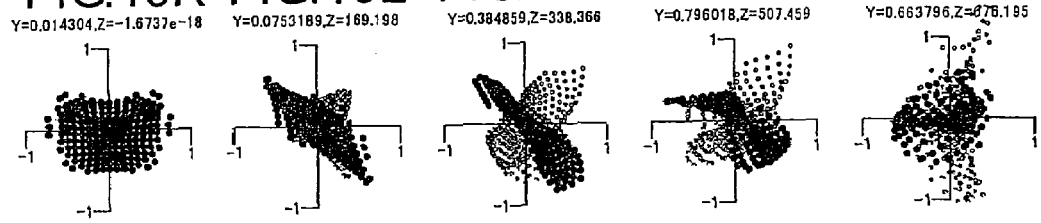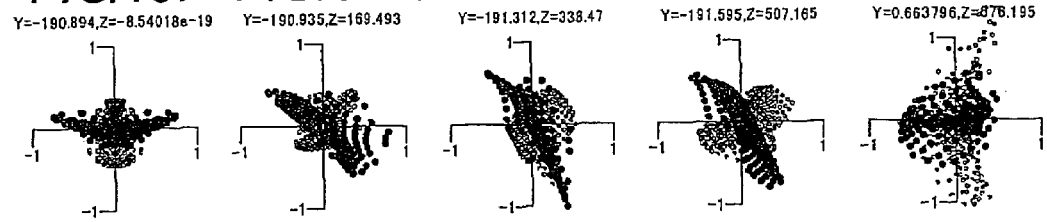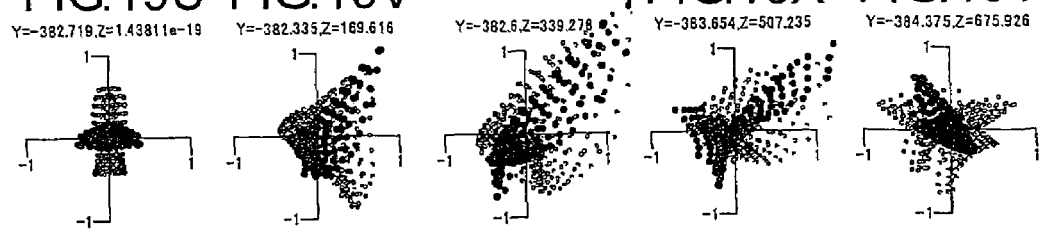

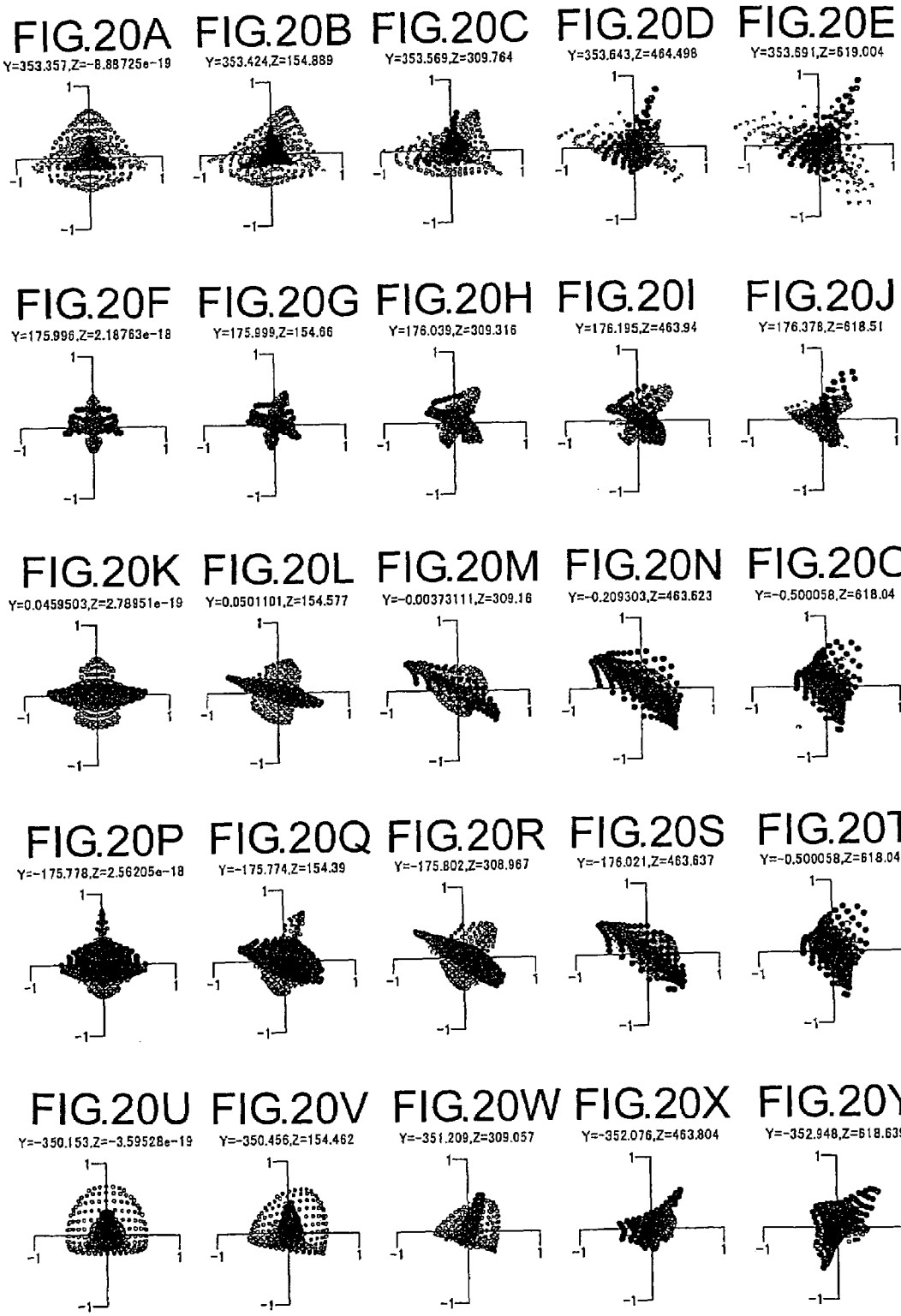

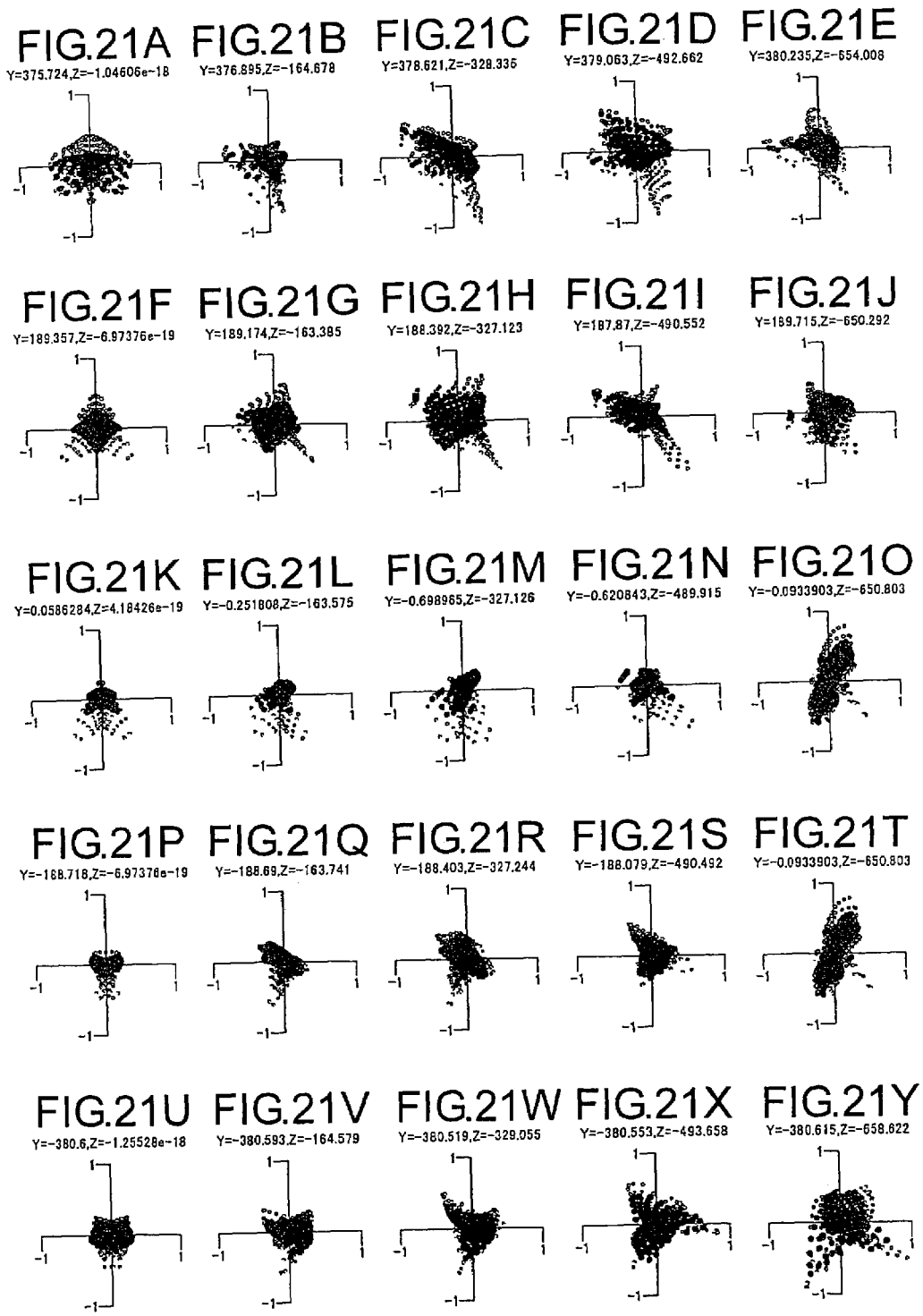

OBLIQUE PROJECTION OPTICAL SYSTEM

This application is based on Japanese Patent Application No. 2004-325954 filed on Nov. 10, 2004, the contents of which are hereby incorporated by reference.

BACKGROUND OF THE INVENTION

1. Field of the Invention

The present invention relates to a projection optical system, and more specifically, to an oblique projection optical system that has a reflective optical element with an optical construction suitable for rear projection and that performs enlargement projection in an oblique direction from a primary image surface to a secondary image surface.

2. Description of Related Art

Examples of an oblique optical system employing a reflective optical element for wide-angle enlargement projection from the primary image surface on the reduction side to the secondary image surface on the enlargement side include those proposed in patent documents 1 to 3. The oblique projection optical systems as described in patent documents 1 to 3 employs a reflective optical element having a positive optical power and a reflective optical element having a negative optical element to achieve slimming-down of a rear projection apparatus (i.e., slimming-down of the apparatus thickness in the direction normal to the screen surface).

[Patent Document 1] U.S. Pat. No. 6,779,897
[Patent Document 2] U.S. Pat. No. 5,871,266
[Patent Document 3] Japanese Patent Application Laid-open No. 2003-255229

However, just use of a reflective optical element having a positive optical power and a reflective optical element having a negative optical element, as described in patent documents 1 to 3, suffers from limitations in achieving the slimming-down of a rear projection apparatus in terms of correction of aberration such as curvature of field and distortion. Moreover, the use of a large reflective optical element in a typical oblique projection optical system that employs a reflective optical element can reduce the curvature of field and the distortion; however, the use of a large reflective optical element causes cost increase or upsizing of the entire optical system.

SUMMARY OF THE INVENTION

In view of the conditions described above, the present invention has been made, and it is an object of the invention to provide an oblique projection optical system which provides a cost advantage while maintaining a favorable optical performance and also which is provided in a slim size with a large screen and light-weight, compact optical components.

To achieve the object described above, one aspect of the invention refers to an oblique projection optical system for performing enlargement projection from a primary image surface on the reduction side to a secondary image surface on the enlargement side. At least one reflective surface having an optical power is provided. Assuming that of said at least one reflective surface, the reflective surface located on the most secondary image surface side in the optical path is a first curved reflective surface, the first curved reflective surface has a portion having a positive optical power and a portion having a negative optical power.

According to another aspect of the invention, an image projection apparatus includes: an image display device that forms an image to be projected; a light source; an illumination optical system that guides light from the light source to the image display device; and a projection optical system that obliquely projects on a screen an image formed by the image display device. The projection optical system has at least one reflective surface having an optical power. Of said at least one reflective surface having an optical power, a first curved reflective surface located on the most screen side has a portion having a positive optical power and a portion having a negative optical power.

According to still another aspect of the invention, an oblique projection optical system for performing enlargement projection from a primary image surface on the reduction side to a secondary image surface on the enlargement side includes: in order along the projection optical path from the secondary image surface side, a first curved reflective surface; a second curved reflective surface; a third curved reflective surface having a negative optical power; and a fourth curved reflective surface having a positive optical power. The first curved reflective surface has a portion having a positive optical power and a portion having a negative optical power.

According to still another aspect of the invention, an oblique projection optical system for performing enlargement projection from a primary image surface on the reduction side to a secondary image surface on the enlargement side includes: in order along the projection optical path from the secondary image surface side, a first curved reflective surface; and a lens unit having a plurality of lens elements. The first curved reflective surface has a portion having a positive optical power and a portion having a negative optical power.

BRIEF DESCRIPTION OF THE DRAWINGS

FIG. 11 is an enlarged view of main components of FIG. 4;
FIG. 15A to 15Y are spot diagrams of Example 1;
FIG. 16A to 16Y are spot diagrams of Example 2;
FIG. 17A to 17Y are spot diagrams of Example 3;
FIG. 18A to 18Y are spot diagrams of Example 4;
FIG. 19A to 19Y are spot diagrams of Example 5;
FIG. 20A to 20Y are spot diagrams of Example 6;
FIG. 21A to 21Y are spot diagrams of Example 7.

DETAILED DESCRIPTION OF PREFERRED EMBODIMENTS

Figure 1:
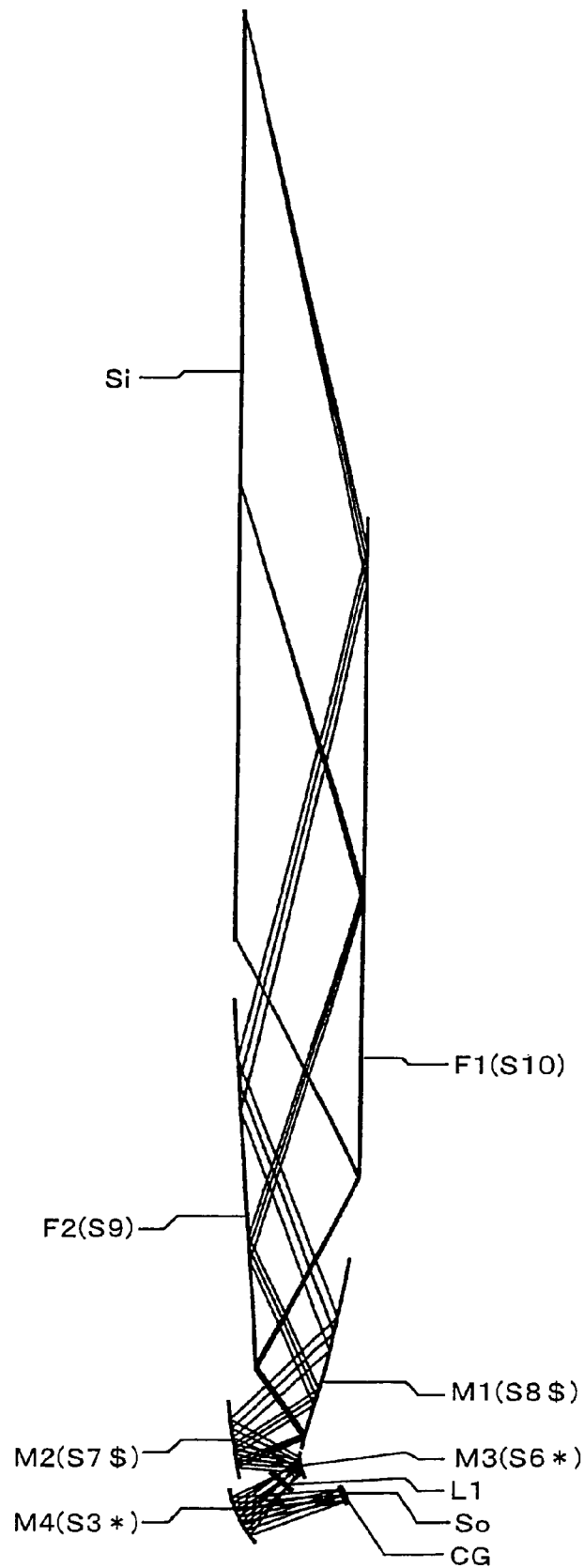
FIG. 1 is a sectional view showing the optical construction of a first embodiment (Example 1) of the present invention.
Figure 2:
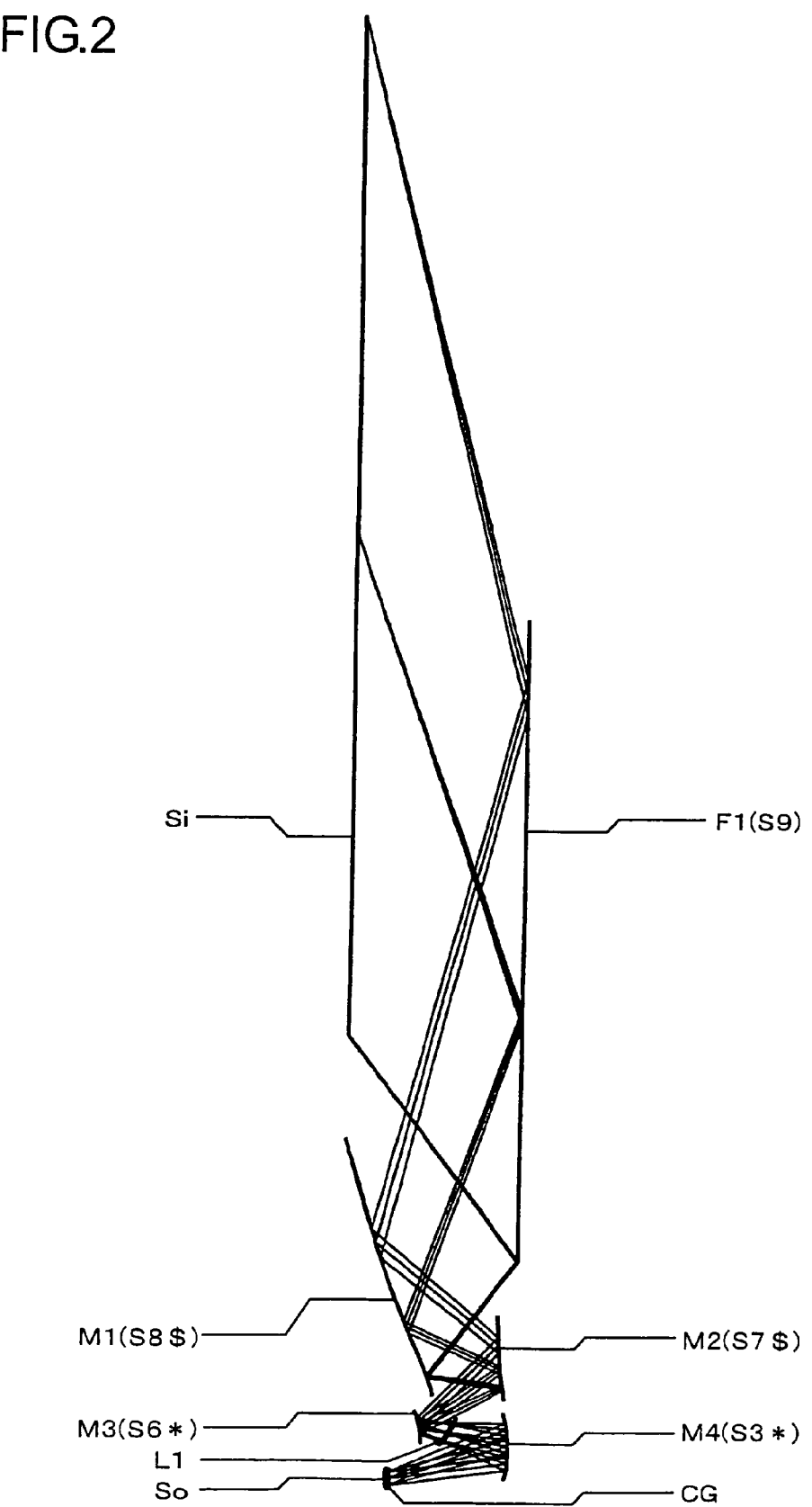
FIG. 2 is a sectional view showing the optical construction of a second embodiment (Example 2) of the present invention.
Figure 3:
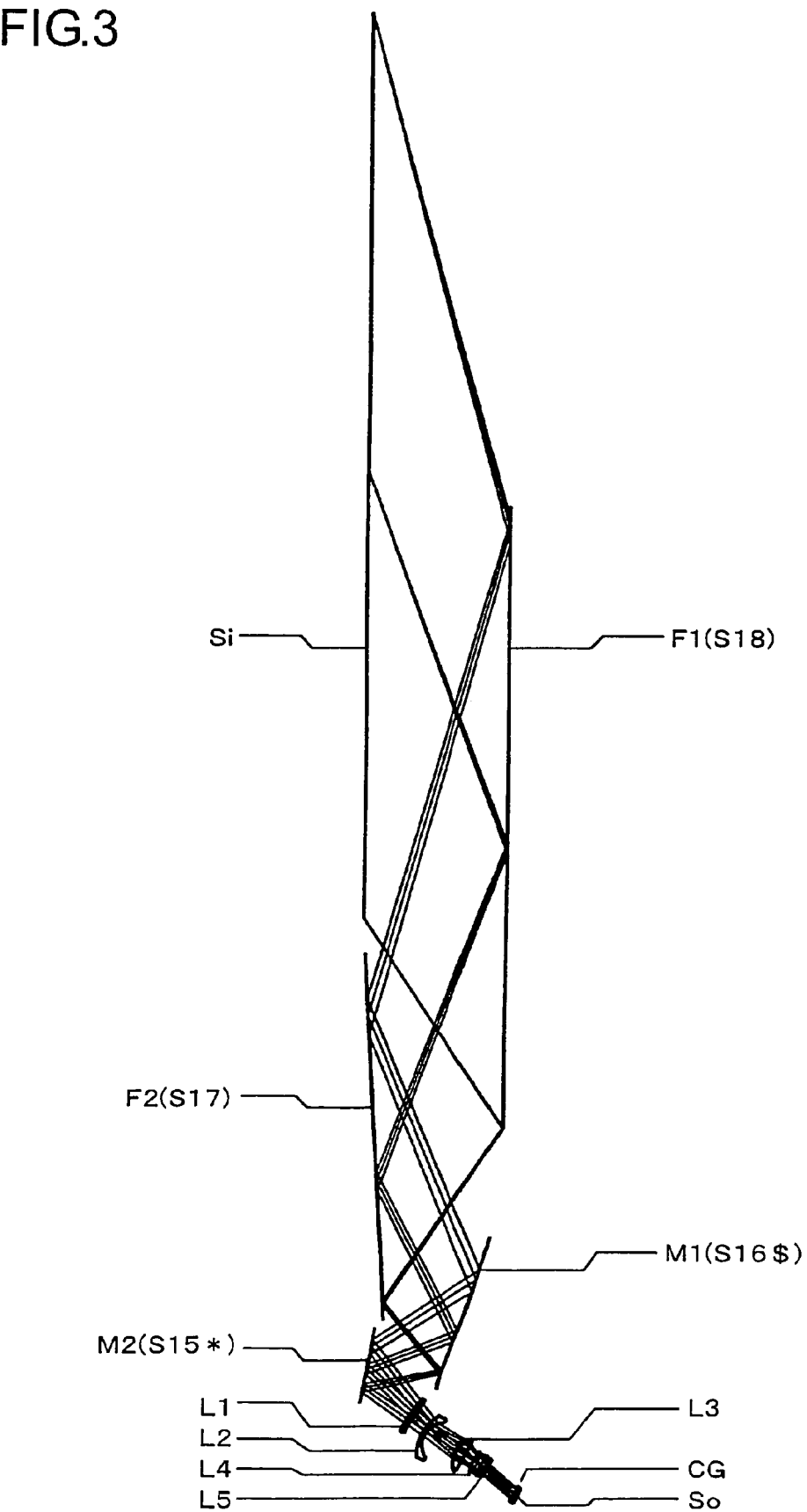
FIG. 3 is a sectional view showing the optical construction of a third embodiment (Example 3) of the present invention.
Figure 4:
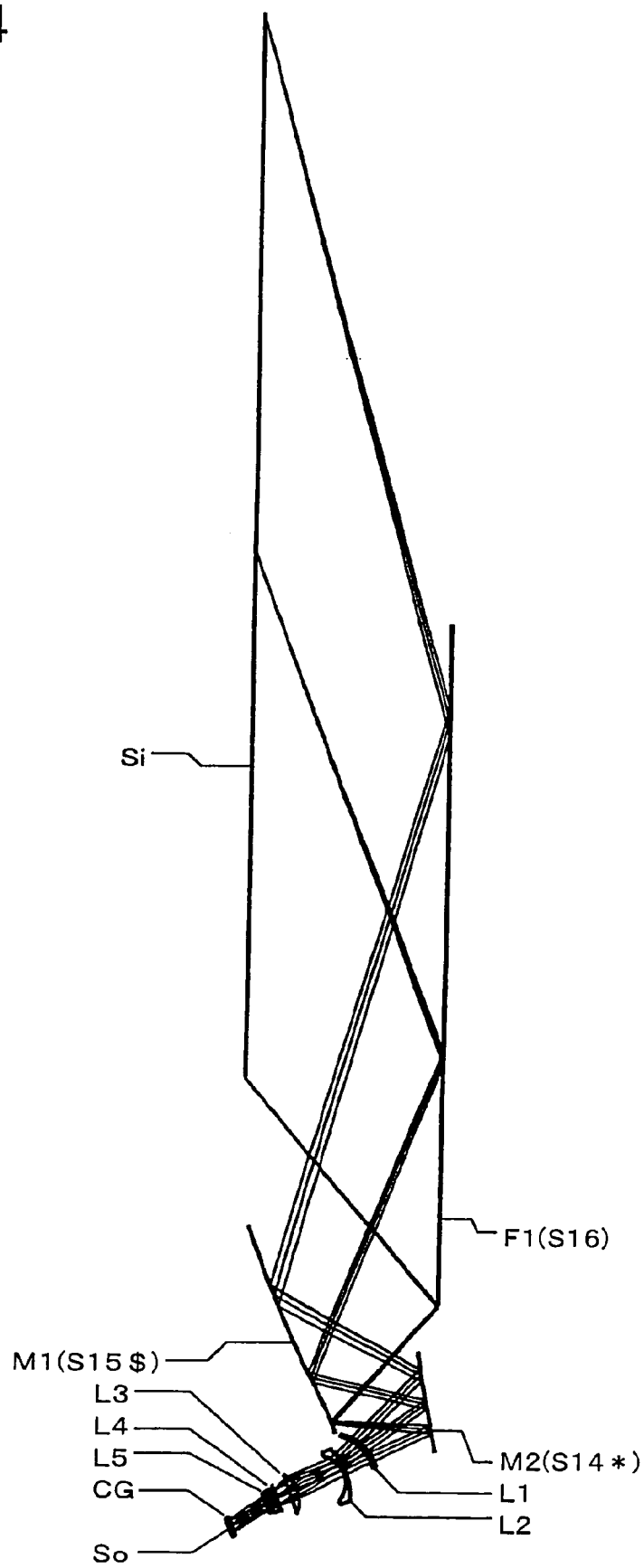
FIG. 4 is a sectional view showing the optical construction of a fourth embodiment (Example 4) of the present invention.
Figure 5:
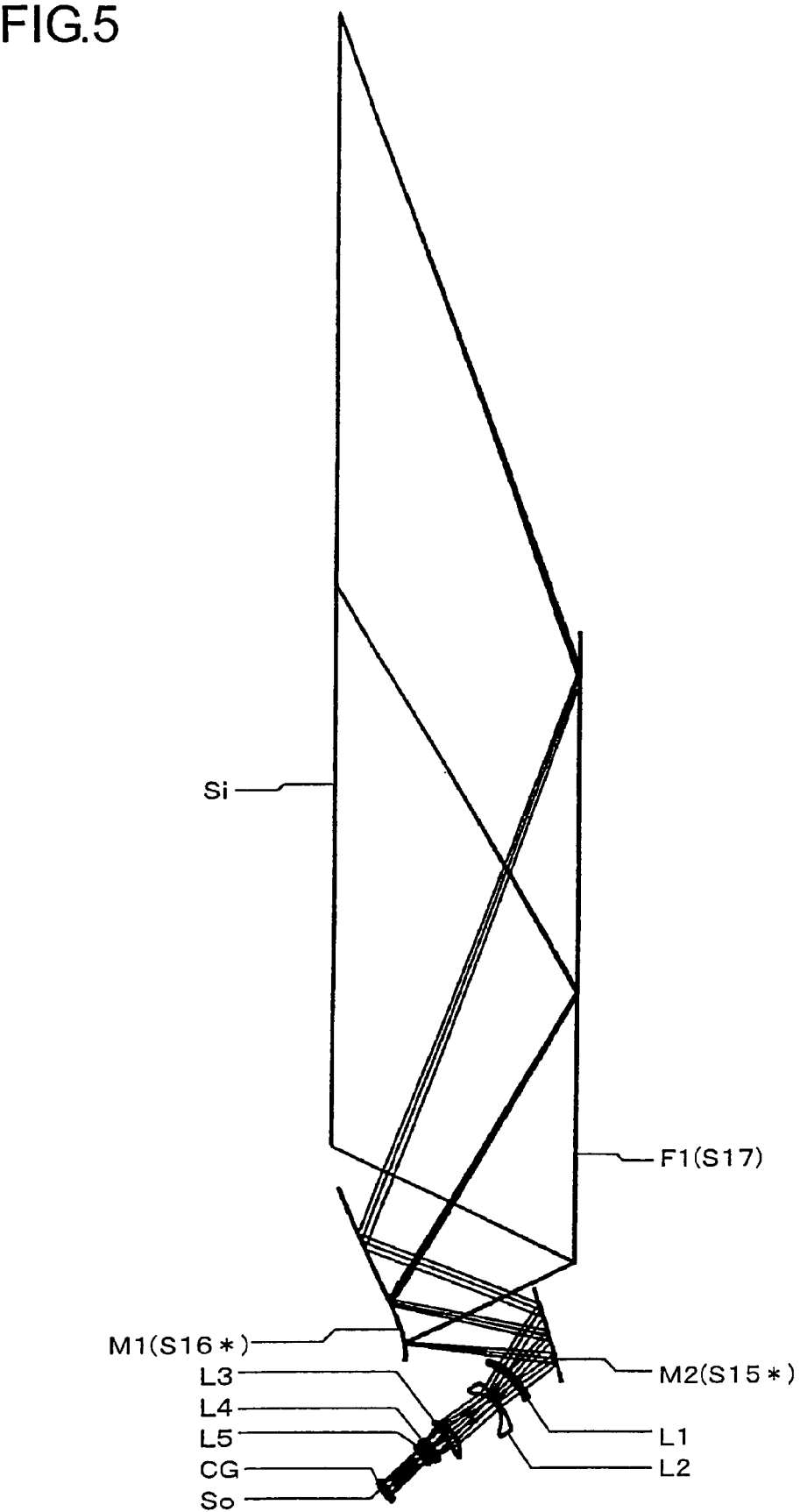
FIG. 5 is a sectional view showing the optical construction of a fifth embodiment (Example 5) of the present invention.
Figure 6:
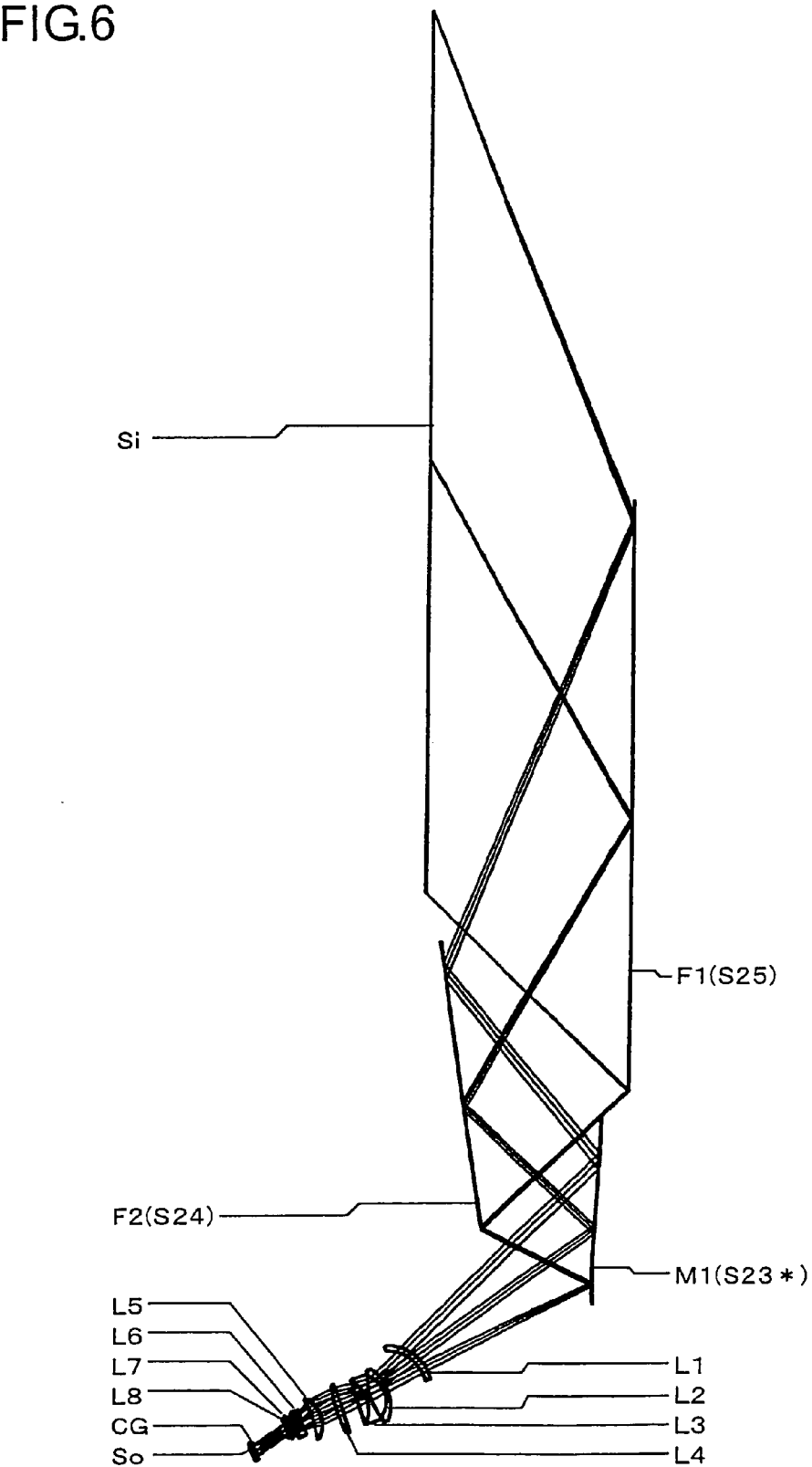
FIG. 6 is a sectional view showing the optical construction of a sixth embodiment (Example 6) of the present invention.
Figure 7:
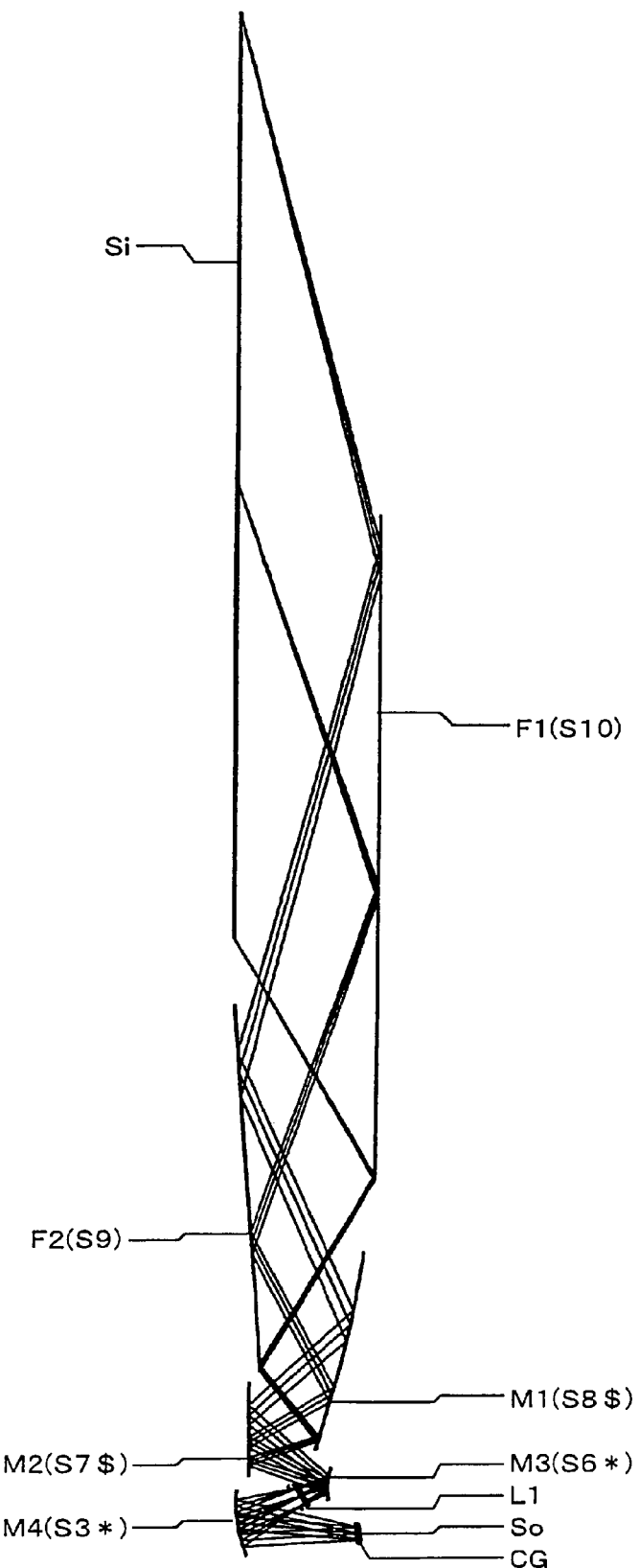
FIG. 7 is a sectional view showing the optical construction of a seventh embodiment (Example 7) of the present invention.

Embodiments of an oblique projection optical system according to the present indention and the like will be described below, with reference to the accompanying drawings. FIGS. 1 to 7 show in optical section, the optical construction (optical arrangement, projection optical path, etc.) along the entire projection optical path from a primary image surface So to a secondary image surface Si in a first to seventh embodiments, respectively, of the oblique projection optical system of the invention, as viewed along the longer sides of the image on the primary image surface So. FIGS. 8 to 14 show on an enlarged scale main components (mainly detailed portion including an aperture stop and lens units) of FIGS. 1 to 7, respectively. That is, in the orthogonal coordinate system (x, y, z) established so that the x-axis runs normal to the primary image surface So, that the y-axis runs along the shorter sides of the image on the primary image surface So, and that the z-axis runs along the longer sides of the image on the primary image surface So, FIGS. 1 to 14 show the optical construction along the entire projection optical path in the first to seventh embodiments, respectively, as viewed on the xy-section. In FIGS. 1 to 14, an optical surface marked with an asterisk "*" is a rotation-symmetric aspherical surface, and an optical surface marked with a dollar sign "$" is a rotation-asymmetric aspherical surface (a so-called free-form curved surface).

In the first to seventh embodiments, the oblique projection optical system is designed to perform enlargement projection obliquely from the primary image surface So on the reduction side to the secondary image surface Si on the enlargement side and thus for use in an image projection apparatus. Accordingly, the primary image surface So corresponds to the image formation surface (for example, image display surface) of a display device that forms a two-dimensional image by modulating the intensity of light, and the secondary image surface Si corresponds to the image projection surface (for example, screen surface). Near the primary surface So, the cover glass CG of the display device is disposed. In the first to seventh embodiments, a digital micromirror device is assumed to be used as the display device. It should be understood, however, that the display device is not limited to a digital micromirror device, but may be any other kind of non-luminous, reflective (or transmissive) display device (for example, a liquid crystal display device) that suits the oblique projection optical system of each embodiment. In a case where a digital micromirror device is used as the display device, the light incident thereon is reflected by individual micromirrors, each either in an ON or OFF state (for example, inclined at ±12°), so that the intensity of the light is spatially modulated. As a result, only the light reflected by the micromirrors in the ON state enters the oblique projection optical system so as to be projected onto the screen surface. As the display device above, a self-luminous display device may be used. When a self-luminous display device is used as the display device, there is no need to provide a light source and the like for illumination, and therefore it is possible to make the optical construction more lightweight and compact.

It should be understood that the optical construction of each of the first to seventh embodiments does not necessarily have to be designed exactly as shown in FIGS. 1 to 14, but may be inverted upside down. That is, designing any of the constructions shown in FIGS. 1 to 14 upside down to suit the actual apparatus arrangement, optical system arrangement, etc. causes no problem whatsoever. In the first to seventh embodiments, the oblique projection optical system, which is optically so constructed as to be suitable for use in a rear-projection-type image projection apparatus (rear projector), may also be used, as an oblique projection optical system that performs reduced projection obliquely from the secondary image surface Si to the primary image surface So, for an image reading apparatus. In that case, the primary image surface So corresponds to the photoreceptive surface of a photoreceptive device (for example, a CCD (charge-coupled device)) for reading an image, and the secondary image surface Si corresponds to the surface of an image (for example, a document) to be read. In the first to seventh embodiments, the reflective surface that light passes immediately before reaching the secondary image surface Si on the enlargement side is a flat reflective surface. A flat mirror F1 (and further, a second flat mirror F2) on which this reflective surface is formed may be removed, and a screen may be placed at the resulting new position of the secondary image surface Si (that is, the mirror image position of the secondary image surface Si with respect to the flat reflective surface). This makes the oblique projection optical system usable in a front-projection-type image projection apparatus (front projector). Even with this construction, the oblique projection optical system can be used as a reduction optical system.

In the first to seventh embodiments, both a reflective optical element and a refractive optical element are used. Used as a reflective optical element is a power mirror having a curved reflective surface and a flat mirror having a flat reflective surface. A reflective optical element used is not limited to a mirror, but may be, for example, a kind of prism having a curved or flat reflective surface. Moreover, one or more reflective optical elements each having a plurality of reflective surfaces may be used, and an optical element having a reflective surface, refractive surface, or diffractive surface, or a combination thereof may be used. Used as a refractive optical element is a refractive lens having a curved refractive surface. A refractive optical element used is not limited to a refractive lens that deflects the light incident thereon by refraction (that is, one that deflects light at the interface between two media having different refractive indices), but may be a diffractive lens that deflects the light incident thereon by diffraction, a refractive/diffractive hybrid lens that deflects the light incident thereon by the combined effect of diffraction and refraction, a gradient-index lens that deflects the light incident thereon through varying refractive indices distributed within a medium, or the like. Now, the optical construction of each of the fifth to eleventh embodiments will be described in more detail.

Figure 8:
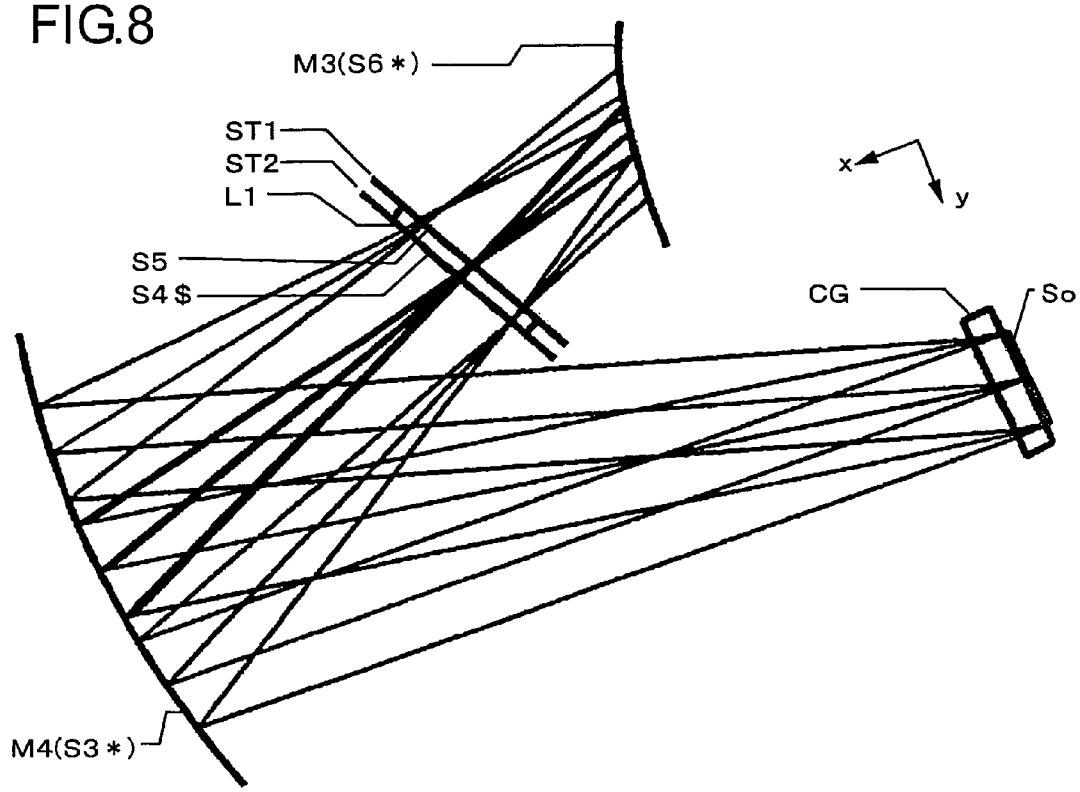
FIG. 8 is an enlarged view of main components of FIG. 1.

In the first embodiment (FIGS. 1, 8), along the projection optical path from the primary image surface So to the secondary image surface Si, there are arranged the following optical elements in the order they are named: a cover glass CG; a fourth power mirror M4 having a curved reflective surface S3 formed with a rotation-symmetric aspherical surface; an aperture stop ST2; a substantially non-power rotation-asymmetric aspherical surface lens L1; an aperture stop ST1; a third power mirror M3 having a negative optical power and a curved reflective surface S6 formed with a rotation-symmetric aspherical surface; a second power mirror M2 having a curved reflective surface S7 formed with a rotation-asymmetric aspherical surface; a first power mirror M1 having a curved reflective surface S8 formed with a rotation-asymmetric aspherical surface; a second flat mirror F2 having a flat reflective surface S9 for bending the optical path; and a first flat mirror F1 having a flat reflective surface S10 for bending the optical path. FIG. 8 shows an example of the two aperture stops ST1 and ST2 arranged are arranged within the effective diameters on the front and rear surfaces of the refractive lens L1. The number of aperture stops used is not limited to two, and thus may be one.

Figure 9:
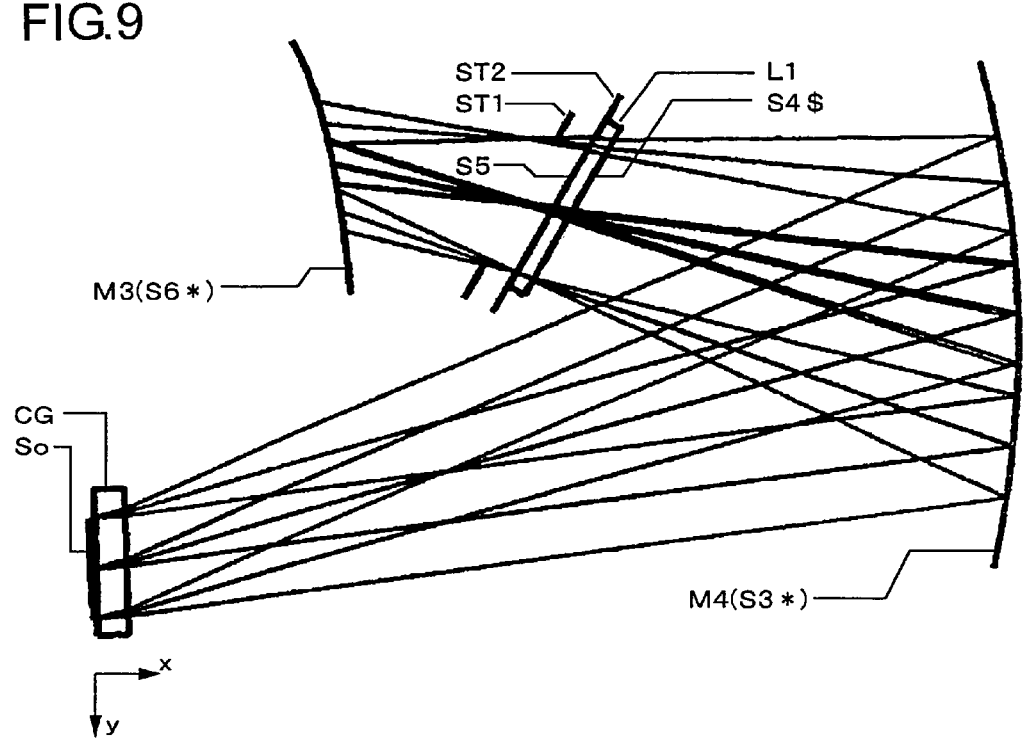
FIG. 9 is an enlarged view of main components of FIG. 2.
Figure 10:
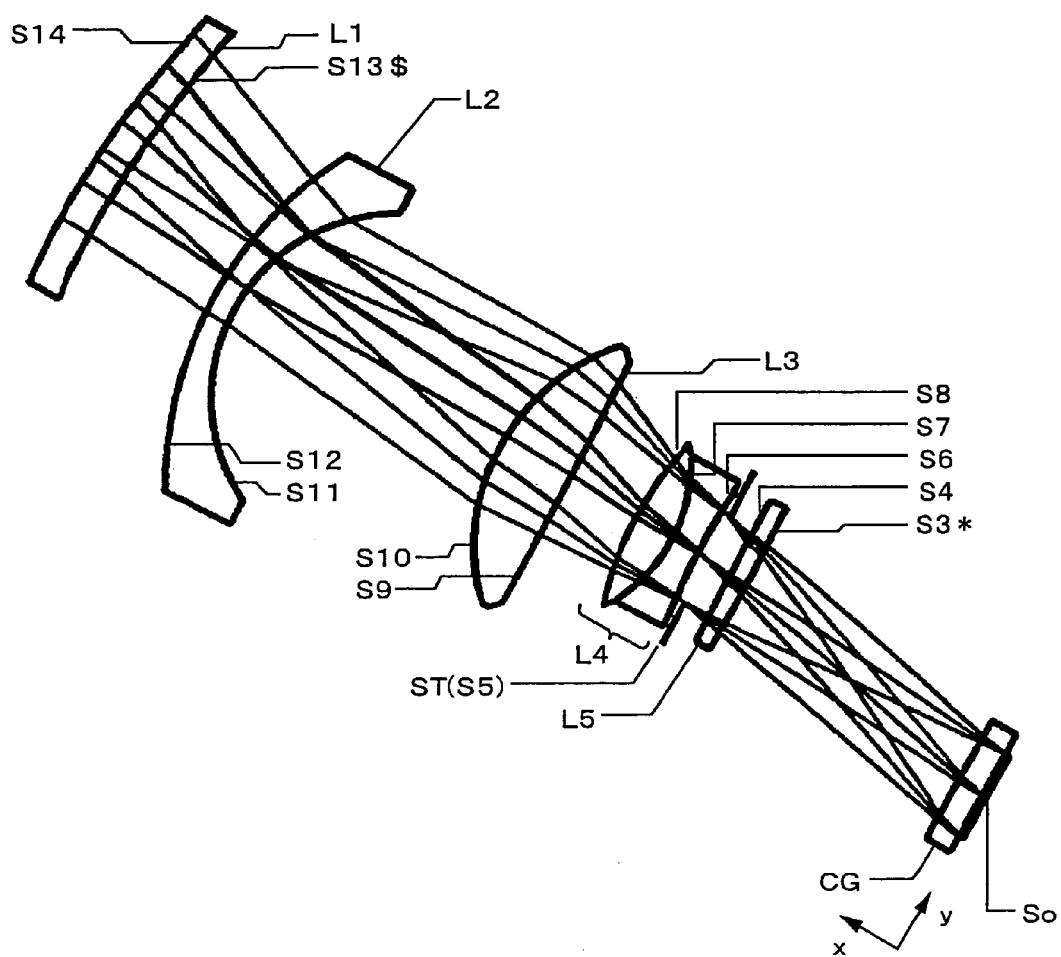

In the second embodiment (FIGS. 2, 9), along the projection optical path from the primary image surface So to the secondary image surface Si, there are arranged the following optical elements in the order they are named: a cover glass CG; a fourth power mirror M4 having a positive optical power and a curved reflective surface S3 formed with a rotation-symmetric aspherical surface; a substantially non-power rotation-asymmetric aspherical surface lens L1; an aperture stop ST2; an aperture stop ST1; a third power mirror M3 having a negative optical power and a curved reflective surface S6 formed with a rotation-symmetric aspherical surface; a second power mirror M2 having a curved reflective surface S7 formed with a rotation-asymmetric aspherical surface; a first power mirror M1 having a curved reflective surface S8 formed with a rotation-asymmetric aspherical surface; and a first flat mirror F1 having a flat reflective surface S9 for bending the optical path. FIG. 9 shows an example of the two aperture stops ST1 and ST2 arranged on the secondary image surface Si side of the refractive lens L1. The number of aperture stops used is not limited to two, and thus may be one.

In the third embodiment (FIGS. 3, 10), along the projection optical path from the primary image surface So to the secondary image surface Si, there are arranged the following optical elements in the order they are named: a cover glass CG; a rotation-symmetric aspherical surface lens L5; an aperture stop ST; a cemented lens L4 formed with a negative lens and a positive lens; a positive lens L3; a negative lens L2; a substantially non-power rotation-asymmetric aspherical surface lens L1; a second power mirror M2 having a curved reflective surface S15 formed with a rotation-symmetric aspherical surface; a first power mirror M1 having a curved reflective surface S16 formed with a rotation-asymmetric aspherical surface; a second flat mirror F2 having a flat reflective surface S17 for bending the optical path; and a first flat mirror F1 having a flat reflective surface S18 for bending the optical path.

Figure 11:
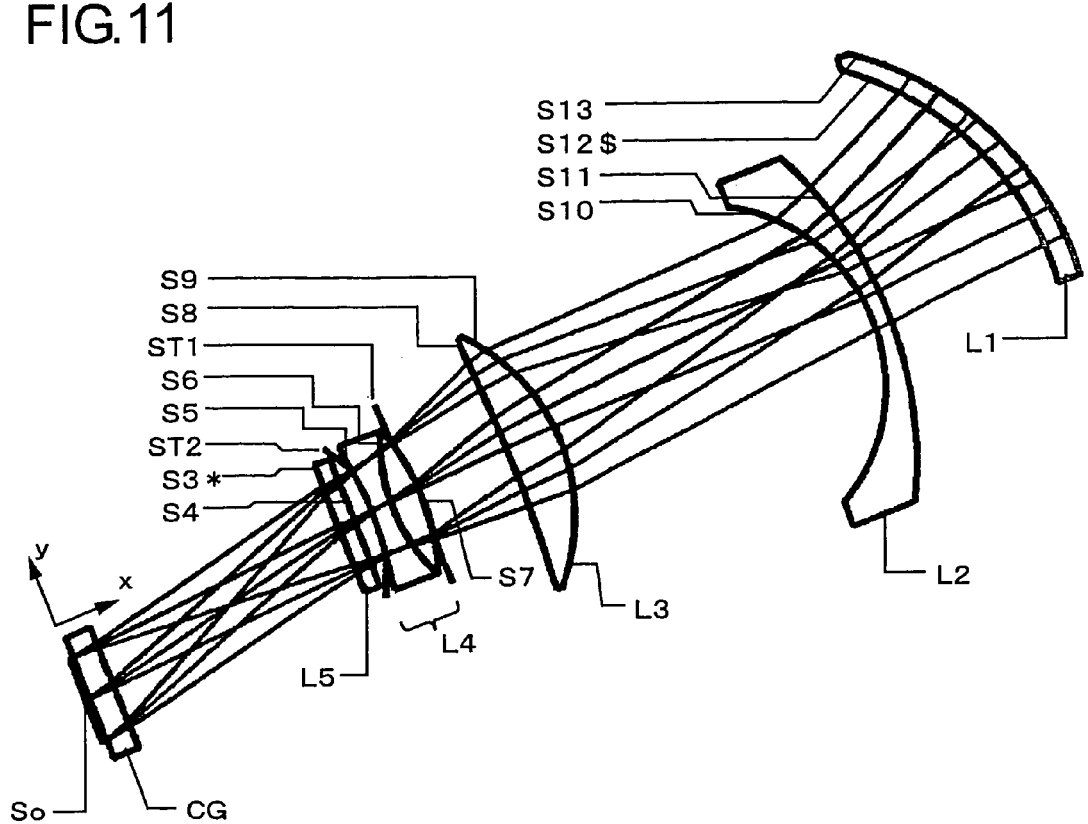
FIG. 11 is an enlarged view of main components of FIG. 3.
Figure 12:
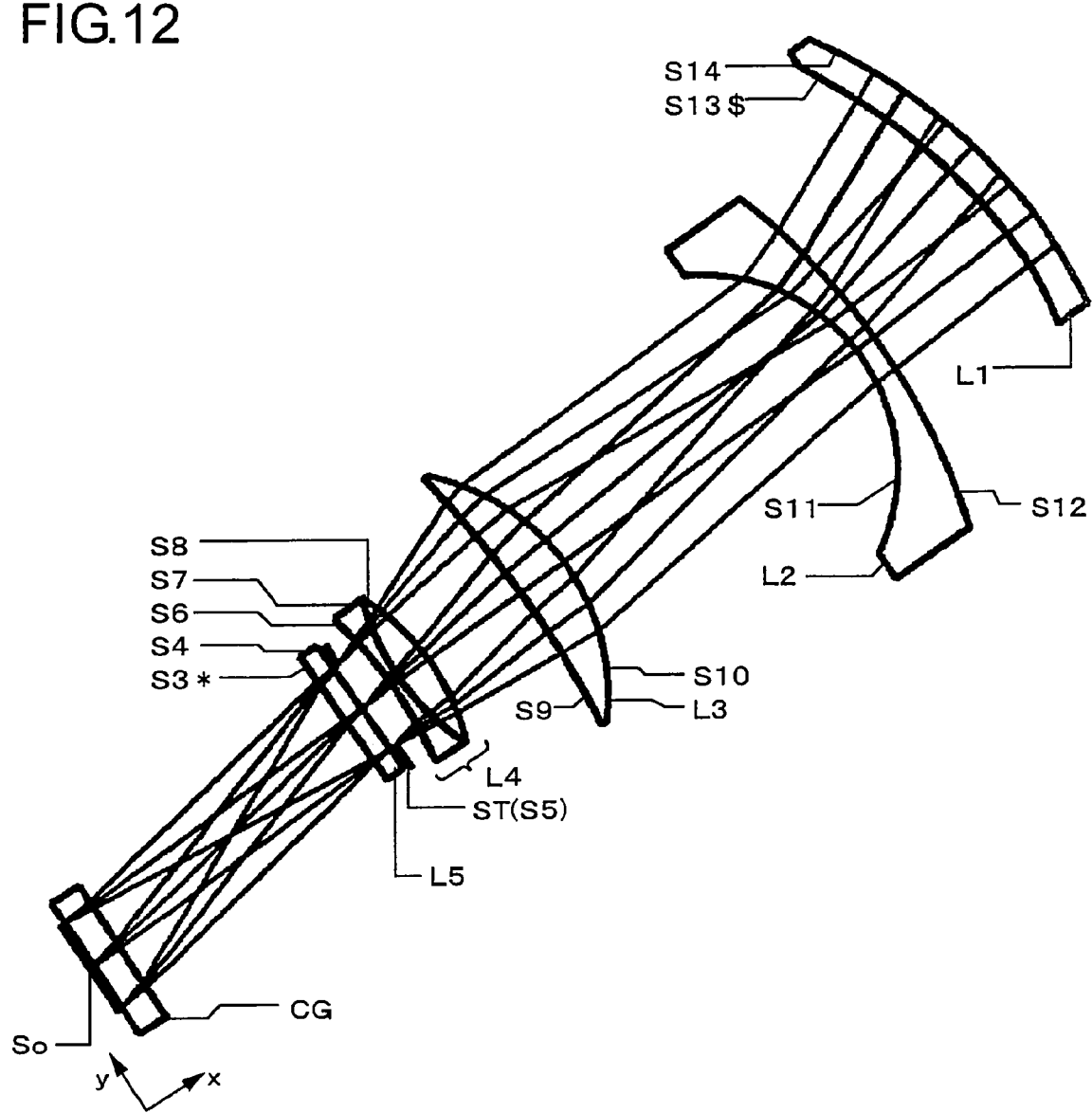
FIG. 12 is an enlarged view of main components of FIG. 5.
Figure 13:
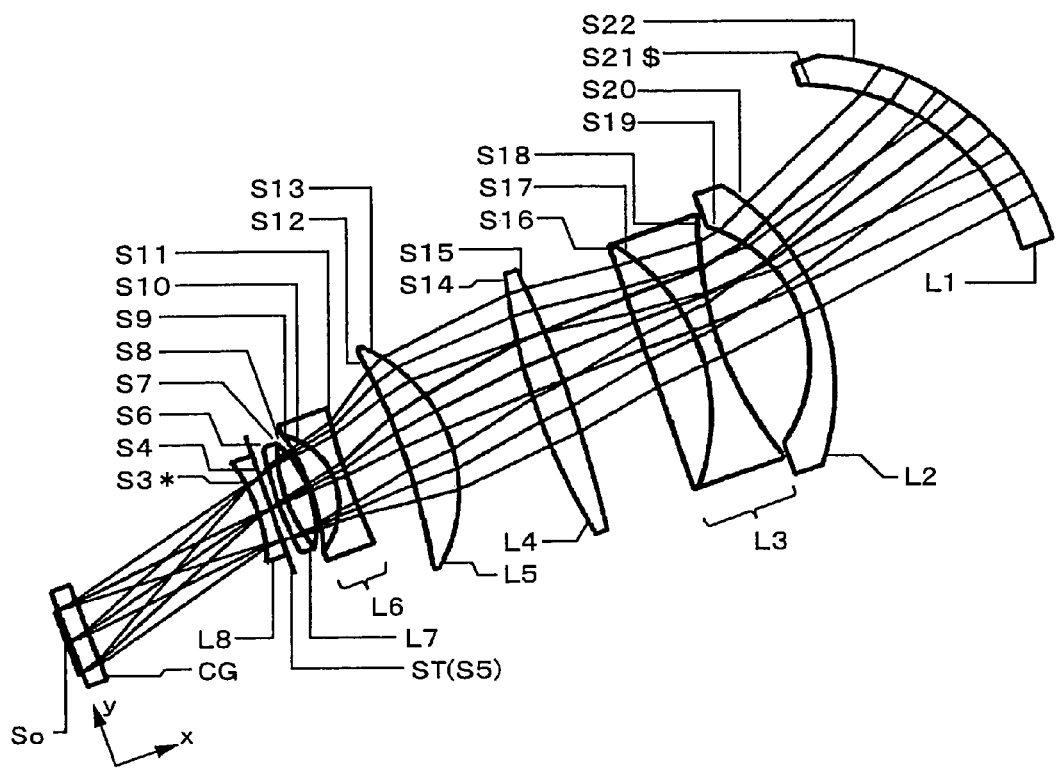
FIG. 13 is an enlarged view of main components of FIG. 6

In the fourth embodiment (FIGS. 4, 11), along the projection optical path from the primary image surface So to the secondary image surface Si, there are arranged the following optical elements in the order they are named: a cover glass CG; a rotation-symmetric aspherical surface lens L5; an aperture stop ST2; a cemented lens L4 formed with a negative lens and a positive lens; an aperture stop ST1; a positive lens L3; a negative lens L2; a substantially non-power rotation-asymmetric aspherical surface lens L1; a second power mirror M2 having a curved reflective surface S14 formed with a rotation-symmetric aspherical surface; a first power mirror M1 having a curved reflective surface S15 formed with a rotation-asymmetric aspherical surface; and a first flat mirror F1 having a flat reflective surface S16 for bending the optical path. FIG. 11 shows an example of the two aperture stops ST1 and ST2 arranged within the effective diameters on the front and rear surfaces of the cemented lens L4. The number of aperture stops used is not limited to two, and thus may be one.

In the fifth embodiment (FIGS. 5, 12), along the projection optical path from the primary image surface So to the secondary image surface Si, there are arranged the following optical elements in the order they are named: a cover glass CG; a rotation-symmetric aspherical surface lens L5; an aperture stop ST; a cemented lens L4 formed with a negative lens and a positive lens; a positive lens L3; a negative lens L2; a substantially non-power rotation-asymmetric aspherical surface lens L1; a second power mirror M2 having a curved reflective surface S15 formed with a rotation-symmetric aspherical surface; a first power mirror M1 having a curved reflective surface S16 formed with a rotation-symmetric aspherical surface; and a first flat mirror F1 having a flat reflective surface S17 for bending the optical path.

In the sixth embodiment (FIGS. 6, 13), along the projection optical path from the primary image surface So to the secondary image surface Si, there are arranged the following optical elements in the order they are named: a cover glass CG; a rotation-symmetric aspherical surface lens L8; an aperture stop ST; a cemented lens L7 formed with a negative lens and a positive lens; a cemented lens L6 formed with a positive lens and a negative lens; a positive lens L5; a positive lens L4; a cemented lens L3 formed with a positive lens and a negative lens; a negative lens L2; a substantially non-power rotation-asymmetric aspherical surface lens L1; a first power mirror M1 having a curved reflective surface S23 formed with a rotation-symmetric aspherical surface; a second flat mirror F2 having a flat reflective surface S24 for bending the optical path; and a first flat mirror F1 having a flat reflective surface S25 for bending the optical path. In the sixth embodiment, the optical arrangement of the oblique projection optical system can be altered by bending the optical path through the arrangement of the flat mirror between the substantially non-power rotation-asymmetric aspherical surface lens L1 and the first power mirror M1. For example, bending the optical path with the flat mirror so that the image longer-side direction of the primary image surface So (i.e., local Z-axis direction to be described later) and the direction normal to the secondary image surface Si (i.e., local X-axis direction) become parallel to each other permits downsizing of the oblique projection optical system in the direction normal to the secondary image surface Si.

Figure 14:
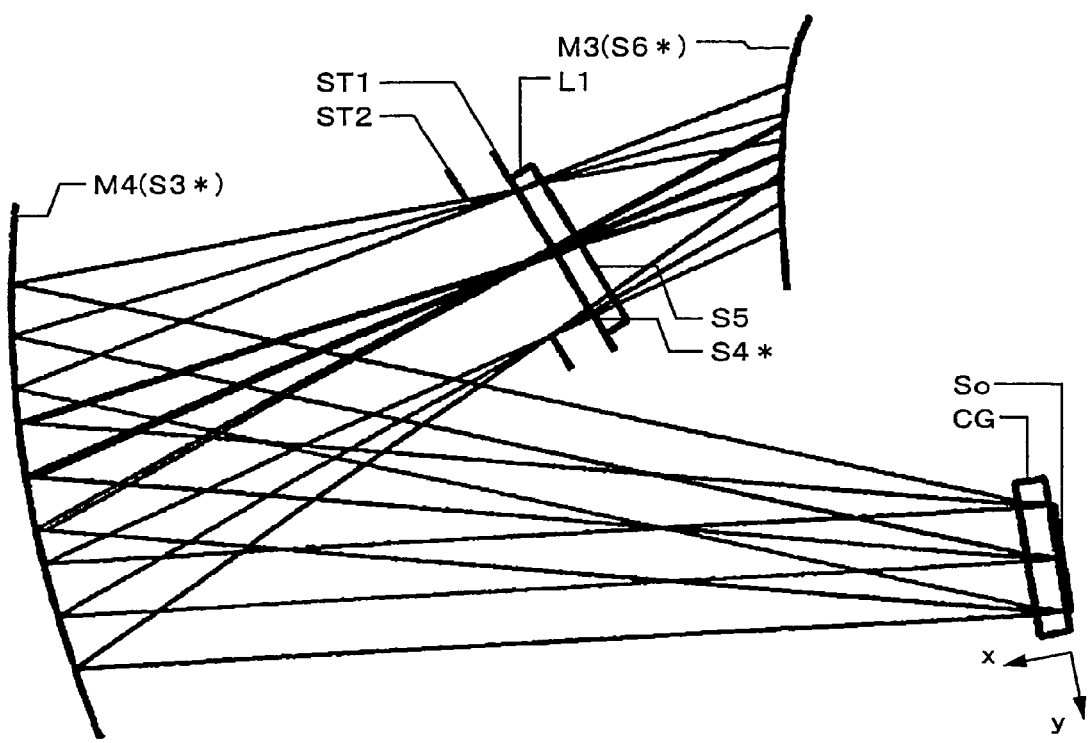
FIG. 14 is an enlarged view of main components of FIG. 7.
Figure 22:
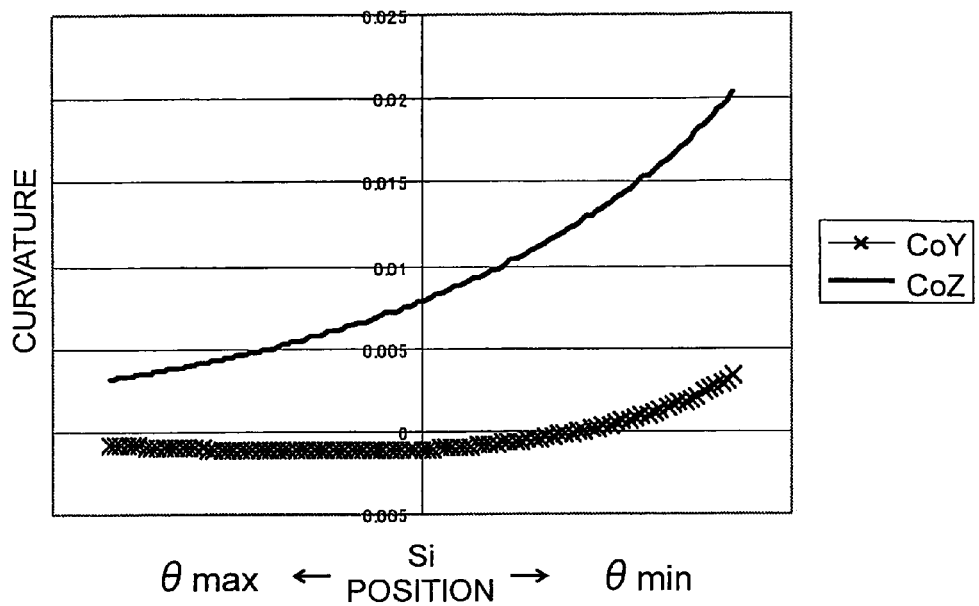
FIG. 22 is a graph showing in curvature plot the surface shape of a first power mirror of Example 1.
Figure 23:
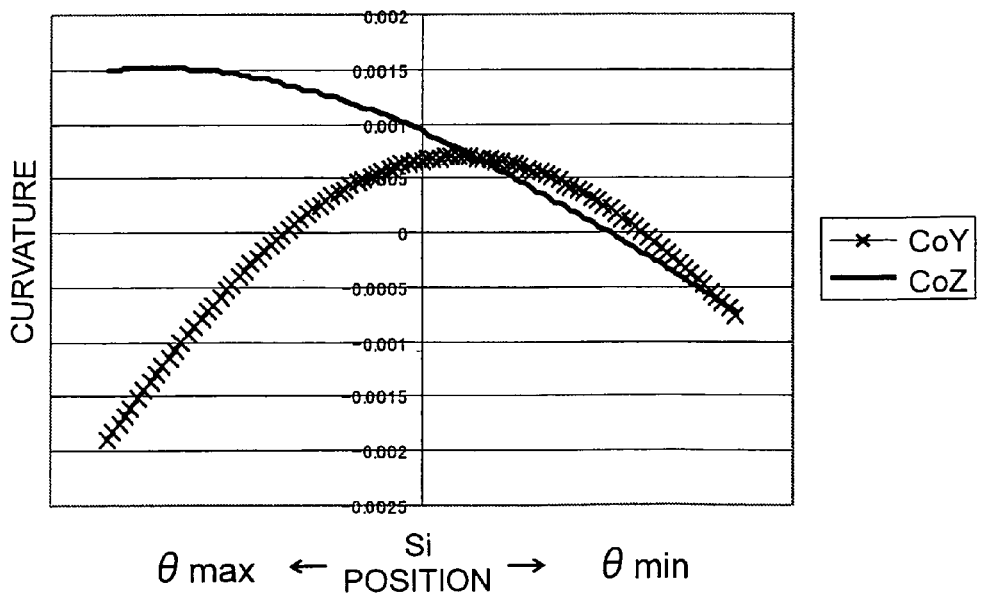
FIG. 23 is a graph showing in curvature plot the surface shape of a second power mirror of Example 1.
Figure 24:
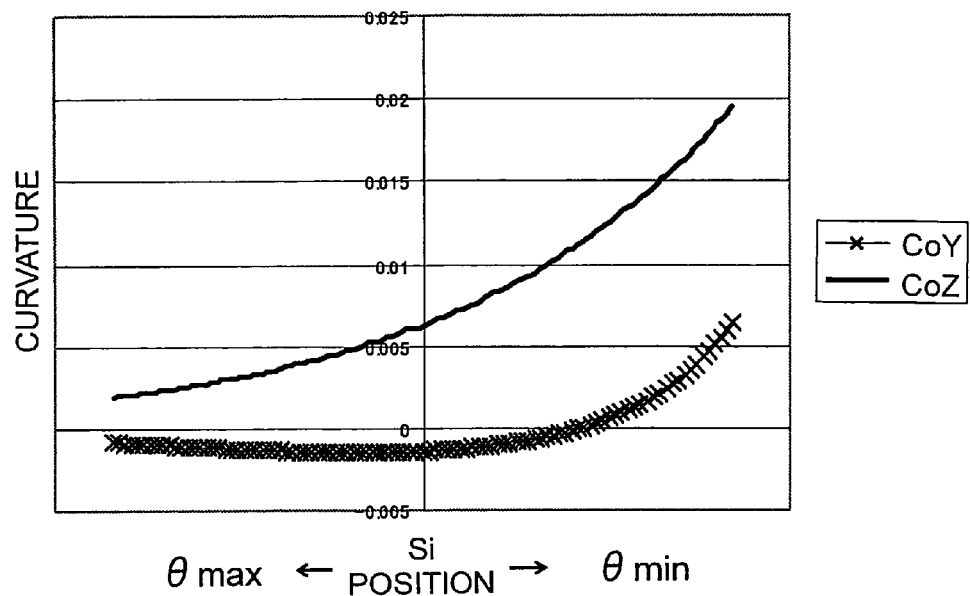
FIG. 24 is a graph showing in curvature plot the surface shape of a first power mirror of Example 2.
Figure 25:
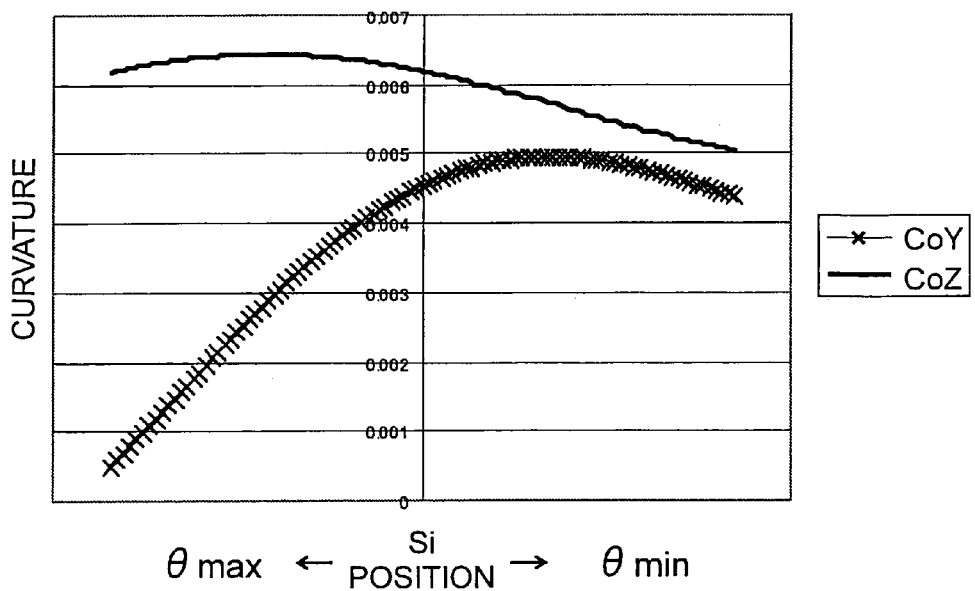
FIG. 25 is a graph showing in curvature plot the surface shape of a second power mirror of Example 2.
Figure 26:
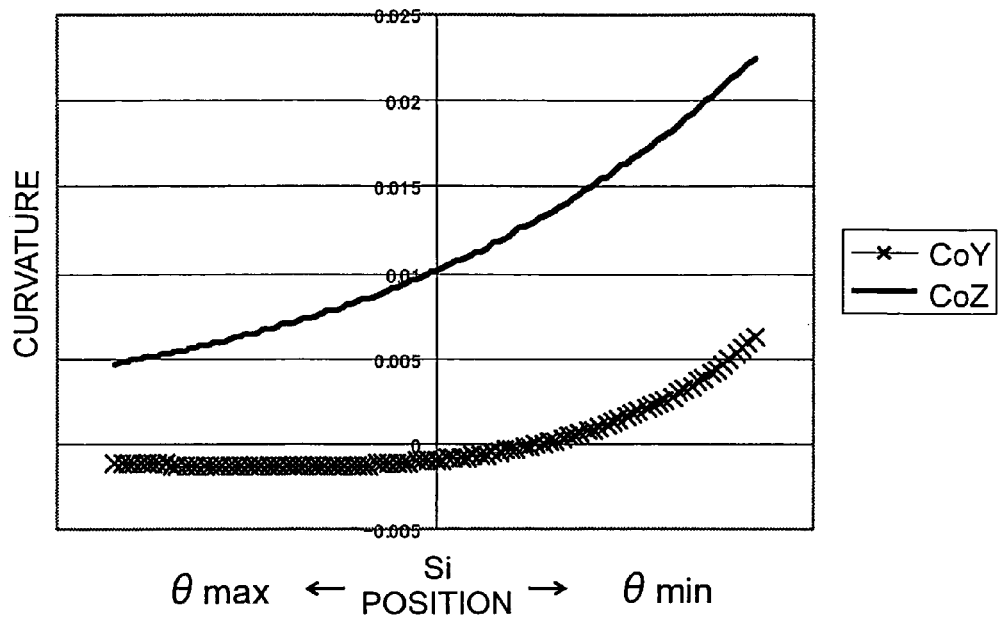
FIG. 26 is a graph showing in curvature plot the surface shape of a first power mirror of Example 3.
Figure 27:
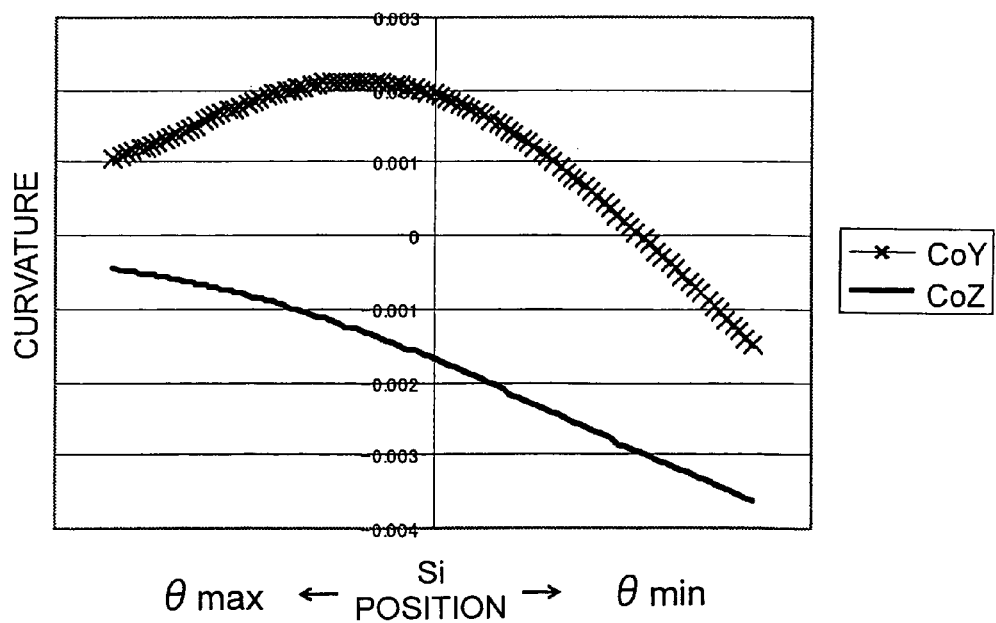
FIG. 27 is a graph showing in curvature plot the surface shape of a second power mirror of Example 3.
Figure 28:
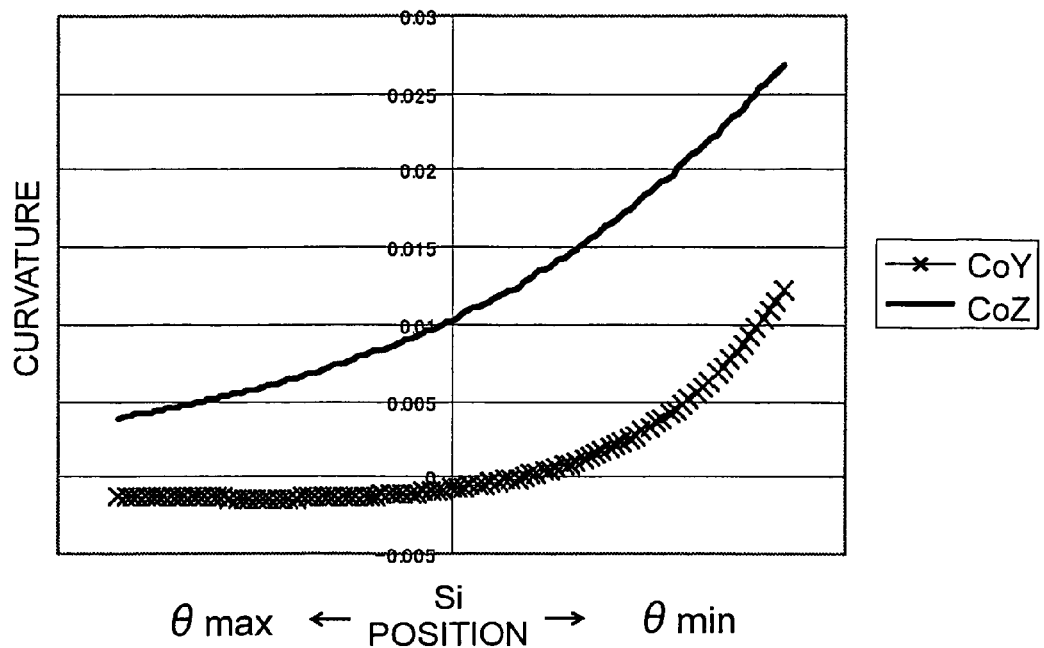
FIG. 28 is a graph showing in curvature plot the surface shape of a first power mirror of Example 4.
Figure 29:
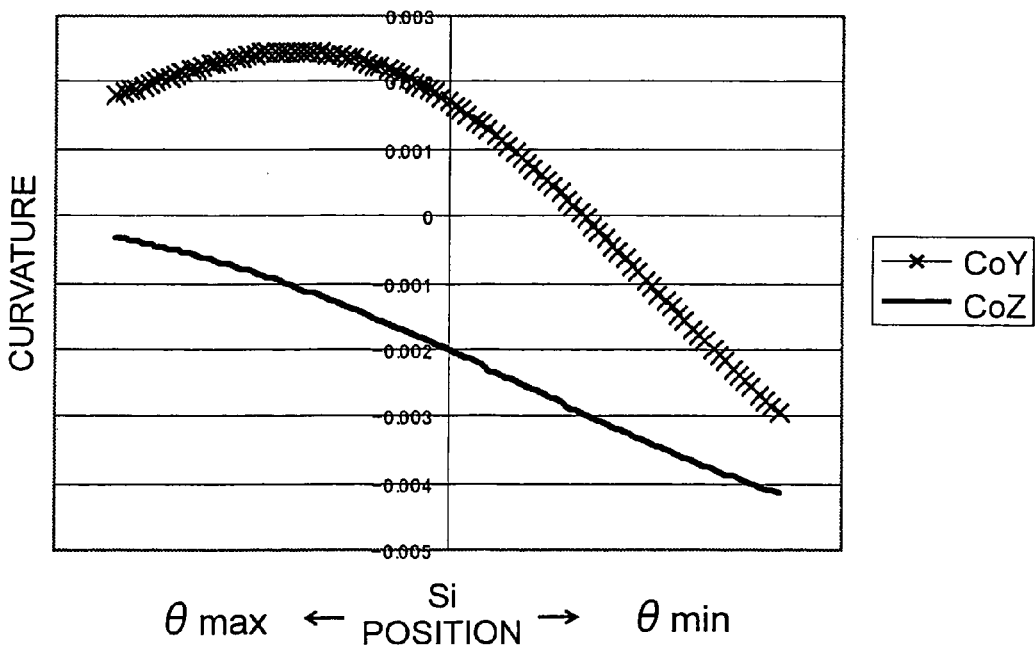
FIG. 29 is a graph showing in curvature plot the surface shape of a second power mirror of Example 4.
Figure 30:
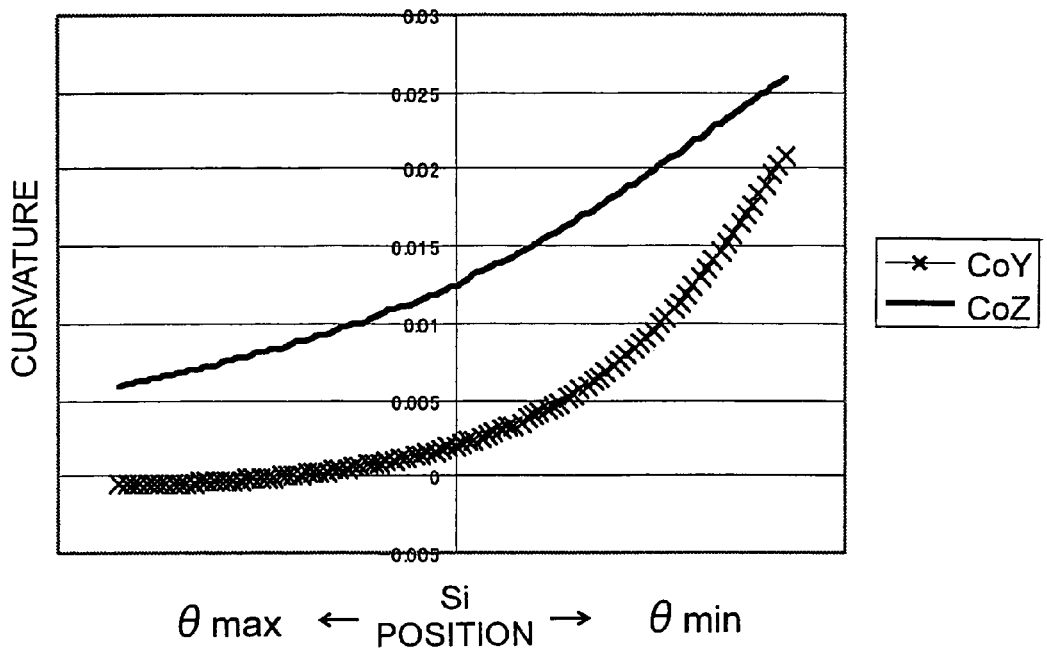
FIG. 30 is a graph showing in curvature plot the surface shape of a first power mirror of Example 5.
Figure 31:
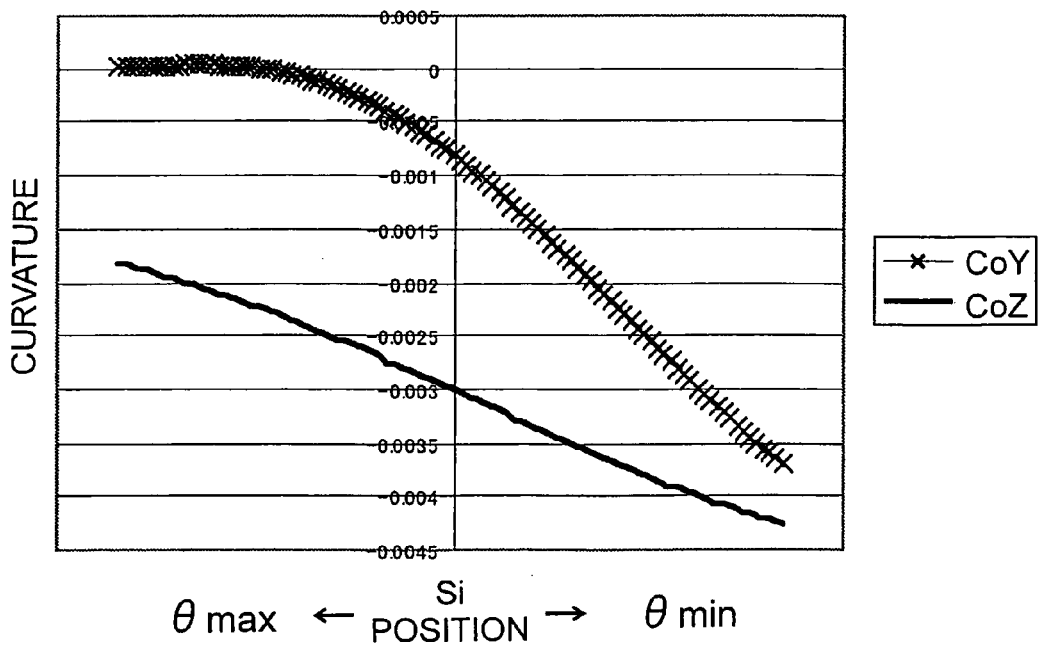
FIG. 31 is a graph showing in curvature plot the surface shape of a second power mirror of Example 5.
Figure 32:
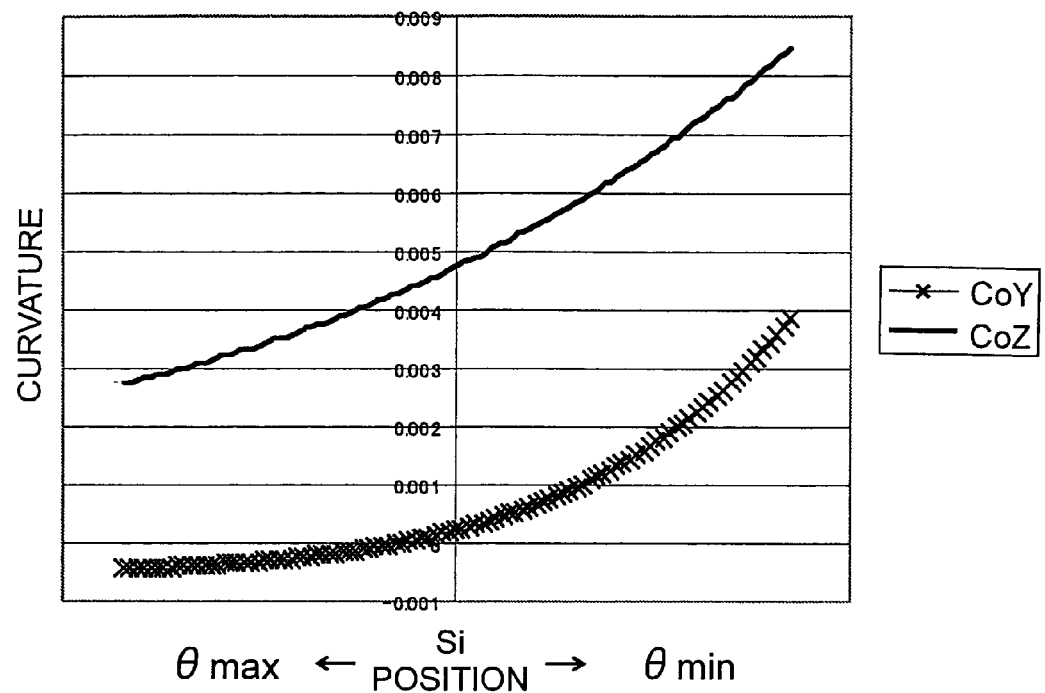
FIG. 32 is a graph showing in curvature plot the surface shape of a first power mirror of Example 6.
Figure 33:
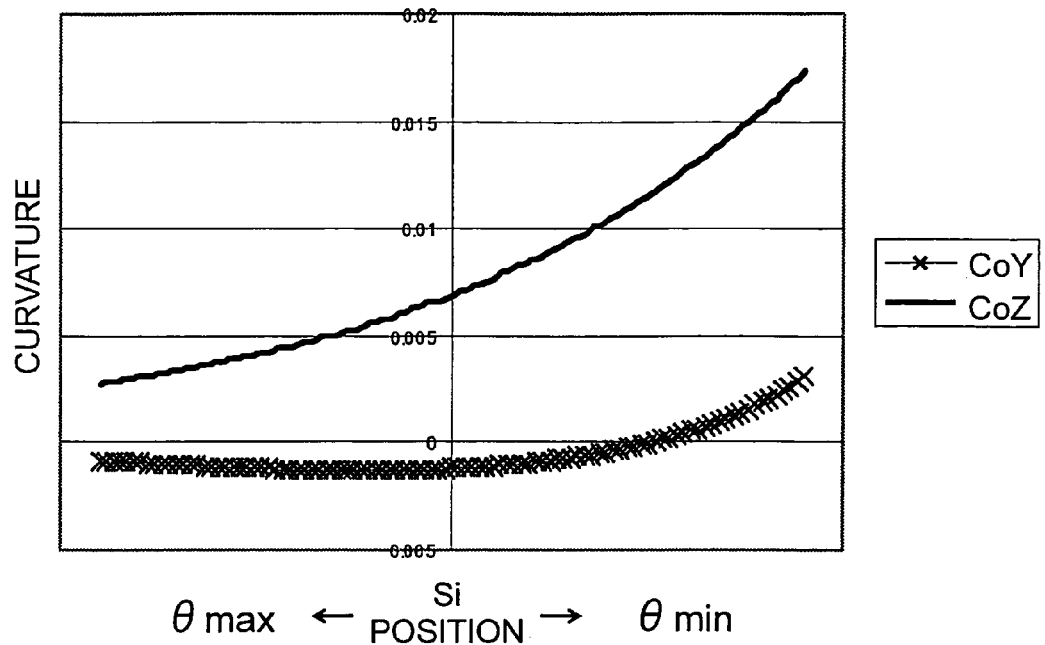
FIG. 33 is a graph showing in curvature plot the surface shape of a first power mirror of Example 7.
Figure 34:
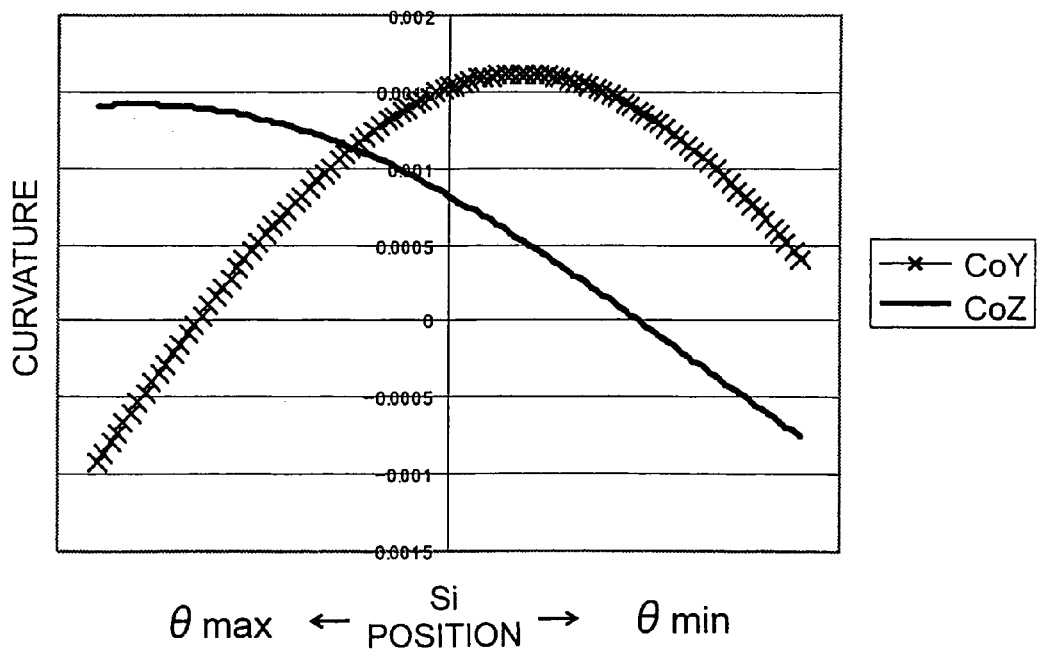
FIG. 34 is a graph showing in curvature plot the surface shape of a second power mirror of Example 7.

In the seventh embodiment (FIGS. 7, 14), along the projection optical path from the primary image surface So to the secondary image surface Si, there are arranged the following optical elements in the order they are named: a cover glass CG; a fourth power mirror M4 having a positive optical power and a curved reflective surface S3 formed with a rotation-symmetric aspherical surface; an aperture stop ST2; an aperture stop ST1; a substantially non-power rotation-symmetric aspherical surface lens L1; a third power mirror M3 having a negative optical power and a curved reflective surface S6 formed with a rotation-symmetric aspherical surface; a second power mirror M2 having a curved reflective surface S7 formed with a rotation-asymmetric aspherical surface; a first power mirror M1 having a curved reflective surface S8 formed with a rotation-asymmetric aspherical surface; a second flat mirror F2 having a flat reflective surface S9 for bending the optical path; and a first flat mirror F1 having a flat reflective surface S10 for bending the optical path. FIG. 14 shows an example of the two aperture stops ST1 and ST2 arranged on the primary image surface So side of the refractive lens L1. The number of aperture stops used is not limited to two, and thus may be one.

Figure 35:
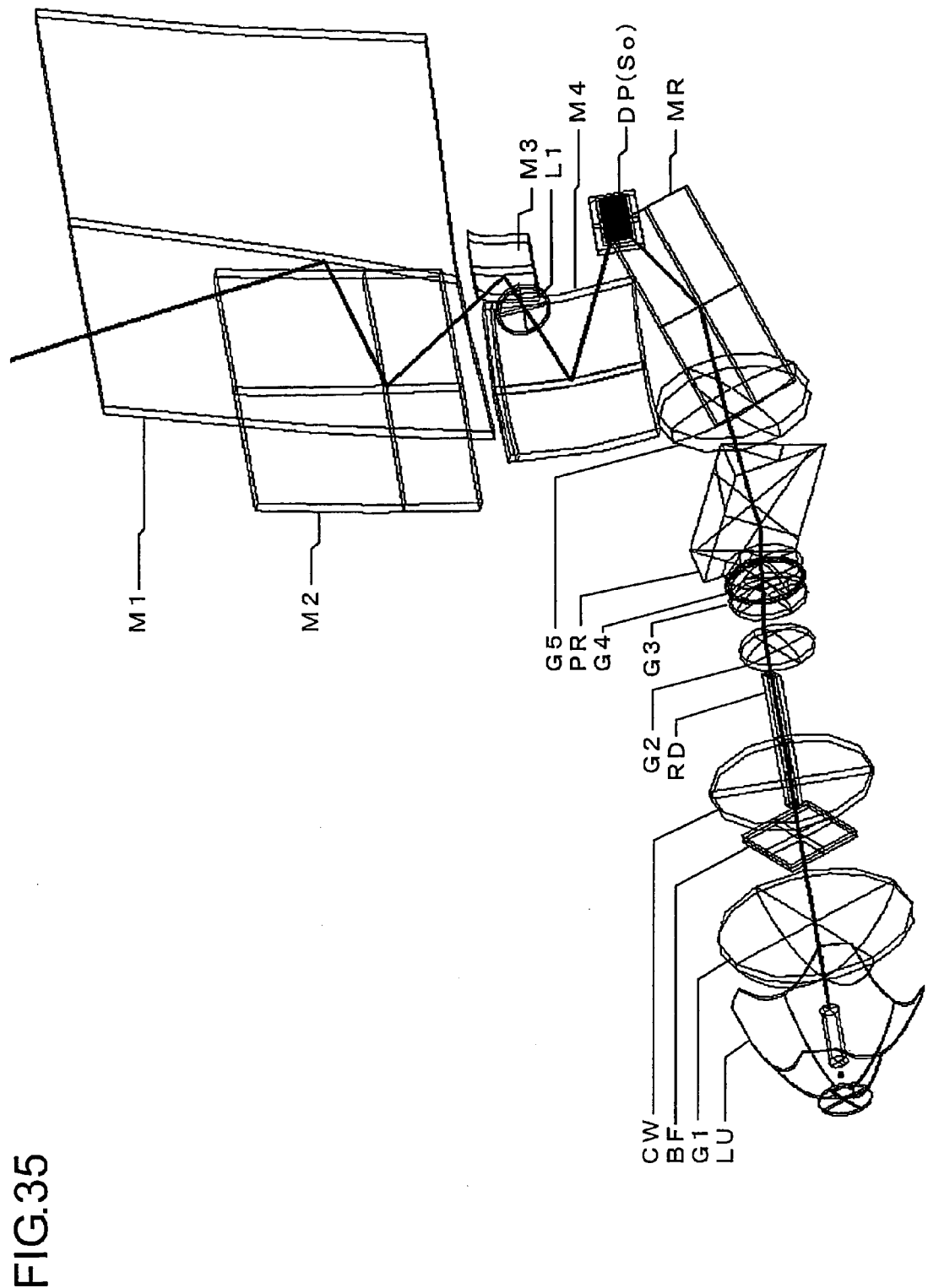
FIG. 35 is a cross section showing the main optical construction of an image projection apparatus formed by combining together the oblique projection optical system of the seventh embodiment (Example 7) and an illumination optical system.

FIG. 35 shows the main optical construction of an image projector built by combining the oblique projection optical system of the seventh embodiment with an illumination optical system. The illumination optical system is composed of a bandpass filter BF, an integrating rod RD, a color wheel CW, a prism PR, refractive lenses G1 to G5, a mirror MR for bending the optical path, and the like, and guides light from a lamp LU to a display device DP. The display device DP forms an image by modulating the intensity of light. The formed image (corresponding to the primary image surface So) is then enlarged and obliquely projected on the screen surface (corresponding to the formation surface of the secondary image surface So) by the aforementioned oblique projection optical system. The construction of each components of the illumination optical system will be described in detail below.

Light emitted from the lamp LU is condensed on the lens G1, transmitted through the bandpass filter BF and the color wheel CW, and then focused near the incidence end surface of the integrating rod RD. For example, UV (ultraviolet ray)-IR (infrared ray) cut filter is used as the bandpass filter BF, which cuts ultraviolet and infrared rays from illumination light. The color wheel CW arranged near the incidence end surface of the integrating rod RD is formed with a color filter for illuminating the display device DP in a color sequential method, and changes in a time-shared manner the color of emitted light for color display by rotational movement of the filter portion at the position through which the illumination light is transmitted. The position of the color wheel CW is not limited to the incidence end surface of the integrating rod RD, but may be set in accordance with the arrangement and the like of the other optical elements. Therefore, for example, the color wheel CW may be arranged near the exit end surface of the integrating rod RD.

The light transmitted through the color wheel CW enters the integrating rod RD. The integrating rod RD is built as a hollow rod formed with four flat mirrors bonded together, and functions as a means for making the light intensity uniform. Light that has entered the integrating rod RD through the incidence end surface thereof is repeatedly reflected on the side surfaces (i.e., inner wall surfaces) of the integrating rod RD and is thereby mixed so that, when the light exits from the integrating rod RD through the exit end surface thereof, it has a uniform spatial energy distribution. The entrance and exit end surfaces of the integrating rod RD are given rectangular shapes that are geometrically similar to that of the display device DP. Moreover, the exit end surface of the integrating rod RD conjugates with the image formation surface (corresponding to the primary image surface So) of the display device DP. As the result of the mixing described above, a uniform brightness distribution is obtained at the exit end surface, and this permits the display device DP to be illuminated efficiently and uniformly. The integrating rod RD does not necessarily have to be a hollow rod, but may be a glass rod built with a glass member in the shape of a rectangular prism. The integrating rod RD may have any number of side surfaces other than four, provided that it then suits the shape of the image formation surface of the display device DP. Thus, as the integrating rod RD, a hollow columnar member formed with a plurality of reflective mirrors combined together, a glass member in the shape of a polygonal prism, or the like can be used.

Light exiting form the integrating rod RD enters the refractive lens G2 having a positive optical power. Focus adjustment of the illumination optical system is made by moving this lens G2 along the optical axis. The light exiting from the refractive lens G2 is transmitted through the refractive lens G3 having a positive optical power, and the cemented lens G4 formed with a positive lens and a negative lens, and then enters the prism PR of a non-power, wedge type. At least one of normal lines of the incidence surface and the exit surface of the prism PR is not parallel to the normal line of the end surface of the integrating rod RD, thus functioning to correct asymmetric aberration in the illumination optical system. For the prism PR, it is preferable to use a rectangular prism which is easy to manufacture.

The light exiting from the prism PR is transmitted through the refractive lens G5 having a positive optical power, and then its optical path is bent by the mirror MR. The mirror MR may be a flat mirror or a curved surface mirror, but it is preferable to use a low-cost flat mirror in order to achieve cost reduction of the optical system. The mirror MR may also be configured to be oscillatable for adjustment of the illumination region. The light whose path has been bent by the mirror MR is guided by the display device DP, whereby the image of the exit end surface of the integrating rod RD is formed on the image formation surface of the display device DP. Power required for this image formation is shared among the lenses G2 to G5. It is preferable that the lenses G2 to G4 be coaxial with one another since this makes the manufacture easier. Moreover, it is further preferable that the lens G5 be coaxial with respect to the lenses G2 to G4 since this makes manufacture even easier.

The image formation surface of the display device DP illuminated by the illumination optical system described above is enlarged and projected obliquely on the screen surface by the oblique projection optical system according to the seventh embodiment. Enlargement projection is performed with those systems according to the first to sixth embodiments in the same manner as with the system according to the seventh embodiment. In application of such oblique enlargement projection to a rear projector, it is important to provide a favorable balance between the slimming-down of the rear projector and an optical performance of the oblique projection optical system. However, aiming at achieving a favorable optical performance while achieving the slimming-down of the projector results in upsizing of optical components, which contributes to upsizing and cost increase of the entire projector.

To avoid the problem described above, used in each of the embodiments is at least one reflective optical element having a reflective surface provided with an optical power, and, of these reflective surfaces, the reflective optical element located on the most secondary image surface Si side in the optical path (i.e., the first power mirror M1) has a unique surface provided with a portion having a positive optical power and a portion having a negative optical power. The surface provided with a portion having a positive optical power and a portion having a negative optical power is formed with a rotation-symmetric aspherical surface in the fifth and sixth embodiments and with a rotation-asymmetric aspherical surface in the first to fourth embodiments and the seventh embodiment. Providing the reflective surface of the first power mirror M1 with both a positive and a negative optical powers increases the degree of freedom to improve the capability of correcting distortion and curvature of field simultaneously, thus permitting achieving a higher performance.

Therefore, in the oblique projection optical system for performing enlargement projection from the primary image surface on the reduction side to the secondary image surface on the enlargement side, assuming that, as in the embodiments, there is provided at least one reflective surface having an optical power and the reflective surface located on the most secondary image surface side in the optical path is defined as "a first curved reflective surface", it is preferable that the first curved reflective surface be provided with a portion having a positive optical power and a portion having a negative optical power. Accordingly, a higher performance can be achieved by use of the first curved reflective surface provided with a unique surface, thus providing a slim oblique projection optical system that has a large screen and light-weight, compact optical components and that provides cost advantages while maintaining a favorable optical performance.

Further, assuming that a principal ray exiting from the center of the primary image surface and passing through the center of aperture stop is defined as a "central principal ray", it is desirable that at its intersection with the central principal ray, the first curved reflective surface have a direction having a positive optical power and a direction having a negative optical power. As the oblique projection angle increases (that is, as the angle of incidence with respect to the secondary image surface increases), a difference in the depth of the image surface between two directions on the secondary image surface increases. To correct this, a positive optical power and a negative optical power function favorably, especially in an oblique projection optical system in which the angel of incidence of the central principal ray with respect to the secondary image surface is 55 degrees or more.

It is desirable that the direction having a positive optical power and the direction having a negative optical power be two directions orthogonal to each other at the intersection described above. When the angle of incidence on the secondary image surface increases, considering only the effect of the angle of incidence, a difference in the depth of the image surface becomes maximum between the plane where the central principal ray is incident on the secondary image surface at a maximum angle with respect to the secondary image surface and the plane orthogonal to the aforementioned plane. To correct this, it is effective to provide a positive optical power and a negative optical power in the orthogonal direction. In Examples 1 to 4 and 7 to be described later, as shown in FIGS. 22, 24, 26, 28, and 33, the reflective surface (i.e., the first curved reflective surface) of the first power mirror M1 has a negative optical power and a positive optical power in two directions, respectively, that are orthogonal to each other at the intersection with the central principal ray. That is, in the orthogonal coordinate system (X, Y, Z), the curvature CoY in the Y direction is negative while the curvature CoZ in the Z direction is positive.

It is desirable that the two directions orthogonal to each other at the aforementioned intersection agree respectively with the image vertical direction and the image horizontal direction of the secondary image surface. Assuming that the direction normal to the secondary image surface is a Xi direction, that the image shorter-side direction of the secondary image surface is a Yi direction, that the image longer-side direction of the secondary image surface is a Zi direction, that a XiYi plane including the center of the secondary image surface is a PXiYi plane, and that a XiZi plane including the center of the secondary image surface is a PXiZi plane, in a case of an optical system which has the PXiYi plane and the PXiZi plane orthogonal to each other and which is symmetric with respect to the optical extension plane of the PXiYi plane, the optical system is decentered only within the optical extension plane of the PXiYi plane. In this case, the cross section where the central principal ray forms a maximum angle with respect to the secondary image surface becomes the PXiYi plane. Thus, considering only the angle of incidence, the depth of the image surface with the component on this cross section is smallest; therefore, if this cross section agrees with either the positive or negative direction of the first curved reflective surface (reflective surface of the first power mirror M1 in each embodiment), the image surface property can be corrected effectively. The "optical extension plane of the plane" denotes a virtual plane bent together with an optical path that is bent by a reflective surface having no optical power (i.e., flat reflective surface). Therefore, this plane indicates a plane with the optical path being expanded. For example, as mentioned in the description of the sixth embodiments (FIG. 6) above, when a flat mirror is arranged between the substantially non-power rotation-asymmetric aspherical lens L1 and the first power mirror M1 and when the optical path on the reduction side is bent by the flat mirror such that the image longer-side direction of the primary image surface So (local Z-axis direction to be described later) and the direction normal to the secondary image surface Si (local X-axis direction to be described later) are parallel to each other, the optical extension plane of the PXiYi plane is located perpendicularly to the PXiYi plane at the area located on the reduction side with respect to the bending position.

Assuming that the direction normal to the secondary image surface is an Xi direction, that the image shorter-side direction of the secondary image surface is a Yi direction, and that the XiYi plane including the center of the secondary image surface is a PXiYi plane, it is desirable that the effective optical region of the first curved reflective surface on the optical extension plane of the PXiYi plane be formed of a concavely shaped portion having a positive optical power and a convexly shaped portion having a negative optical power. Forming the first curved reflective surface into such a shape permits maintaining a favorable balance between curvature of field and distortion while providing a wider angle to the oblique projection optical system. The "providing a wider angle" in this case means increasing the maximum angle of incidence for a ray that is incident on the secondary image surface. In this case, attention is given to the shape of the effective optical region of the first curved reflective surface on the plane optically extended from the PXiYi plane. However, in any of the embodiments, there is no discontinuity and the like on the shape of the reflective surface on the effective optical region of the first power mirror M1, and the reflective surface thereof is so formed as to be continuous and smooth, thus providing a favorable optical performance on the entire secondary image surface.

In Examples 1 to 7 to be described later, as shown in FIGS. 22, 24, 26, 28, 30, 32, and 33, the symbol of the curvature CoY possessed by the reflective surface of the first power mirror M1 is inverted. This proves that the reflective surface of the first power mirror M1 has a concavely shaped portion having a positive optical power and a convexly shaped portion having a negative optical power. Using the convex portion of the first curved reflective surface of the first power mirror M1 permits increasing the optical path length of a ray incident on the secondary image surface at the minimum angle of incidence θmin; therefore, the angle of view can be increased effectively, especially in an oblique projection optical system having two or more power mirrors, while maintaining a favorable balance between curvature of field and distortion.

Assuming that at least one rotation-symmetric optical element is provided which has an optical power and whose rotation-symmetric shape is formed at least partially with a reflective surface or a refractive surface, that the direction normal to the primary image surface is an Xo direction, that the image shorter-side direction of the primary image surface is a Yo direction, and that the XoYo plane including the center of the primary image surface is a PXoYo plane, it is desirable that the rotation center axis of at least one rotation-symmetric optical element lies within the optical extension plane of the PXoYo plane and also be not parallel to the optical extension direction of the Xo direction. An optical element having a rotation-symmetric shape is easier to manufacture, evaluate, adjust, and the like, than those not having such a rotation-symmetric shape, thus requiring relatively low costs. However, in a wide-angle oblique projection optical system employing a reflective optical element as in the embodiments, even if this reflective surface has a rotation-symmetric shape, it is difficult to efficiently avoid the interference of the reflective optical path. To efficiently avoid the interference of the reflective optical path, it is effective to decenter its rotation center axis with respect to the normal lines of the primary image surface and the secondary image surface. Moreover, tilt decentering in addition to parallel decentering further increases the degree of freedom, thereby easily achieving the slimming-down of the projector while maintaining a favorable optical performance. For example, the first embodiment (FIGS. 1, 8) shows that the third and fourth power mirrors M3 and M4 correspond to the rotation-symmetric optical elements described above and that their arrangement permits effective slimming-down of the projector. The "optical extension direction" denotes a virtual direction that is bent together with an optical path when the optical path is bent by a reflective surface (i.e., a flat reflective surface) having no optical power, and thus its concept is similar to that of the "optical extension plane".

As in the embodiments, it is desirable that at least one refractive optical element having an aberration correction function be provided. A refractive optical element typically has lower error sensitivity than a reflective optical surface due to its low relative index of refraction, and thus is easy to manufacture and adjust. Therefore, providing a refractive optical element with an aberration correction capability in addition to providing a reflective optical element having an optical power permits lowering the degree of difficulty in manufacture and also permits cost reduction.

For example, in the first embodiment, the substantially non-power rotation-asymmetric aspherical surface lens L1 is used as the refractive optical element described above. Providing the refractive optical element with an aspherical shape permits further improvement in the effect of aberration correction while maintaining error sensitivity low. Moreover, providing the lens with substantially no power permits a further decrease in the error sensitivity. Therefore, it is desirable that the refractive optical element have at least one refractive surface formed with an aspherical surface. The "aspherical surface" denotes surfaces that have any shape other than a spherical shape, for example, a rotation-symmetric aspherical surface, a rotation-asymmetric aspherical surface (i.e., free curved surface), a cylinder surface, and the like. Further, in a wide-angle decentered optical system as in the embodiments, an even more favorable optical performance can be provided by correcting rotation-asymmetric aberration. Thus, it is further desirable that the above refractive optical element have at least one refractive surface formed with an aspherical surface having a rotation-asymmetric shape.

It is preferable that the refractive optical element having the aspherical form be arranged near the aperture stop or near the position where principal rays converge. An optical element located near the aperture stop typically has a great influence on aberration highly sensitive in the aperture stop radius direction dimensions, as is the case with spherical aberration in a co-axial system. Therefore, the arrangement of an aspherical surface near this position permits reducing the amount of aberration occurring in the oblique projection optical system. It is further preferable that this aspherical surface is formed with a refractive optical element since the refractive optical element has lower error sensitivity than a reflective optical element. Moreover, as in the first, second, and seventh embodiments (FIGS. 8, 9, and 14), the arrangement of the lens L1 formed with a refractive optical element near the aperture stops ST1 and ST2, or the arrangement of a refractive optical element at the position where principal rays converge permits use of the refractive optical element as a frame window for sealing the primary image surface So. This permits preventing the intrusion of trash and dust near the primary image surface So.

To install in a slim apparatus a wide-angle projection optical system as in the embodiments, each optical element needs to be arranged such that the thickness (thickness in the Xi direction) of the apparatus stays thin. The arrangement of a flat mirror having no optical power in such a manner as to be tilted with respect to the secondary image surface permits the installation of the oblique projection optical system in a well-balanced manner in the thickness direction, without imposing any load on the oblique projection optical system. This is typically effective in the slimming-down of the apparatus. However, when only one flat mirror is provided, tilting the flat mirror causes distortion (i.e., trapezoidal distortion), which requires the oblique projection optical system to be provided with an extra distortion correction capability. Thus, it is advantageous to provide at least two flat mirrors in series. For example, as in the first, third, sixth, and seventh embodiments (FIGS. 1, 3, 6, and 7), it is preferable to use the two flat mirrors F1 and F2. The use of two flat mirrors permits elongating the conjugation length while achieving the slimming-down, thereby permitting downsizing of the first curved reflective surface (i.e., the first power mirror M1). Therefore, it is preferable that at least two flat reflective surface be provided in series along the optical path from the secondary image surface side.

Assuming that the flat reflective surface among those described above, which is located at the second position counted from the secondary image surface, is a "second flat reflective surface", it is further preferable that the normal line of the second flat reflective surface is neither parallel nor perpendicular to the normal line of the secondary image surface. As can be understood from FIGS. 1, 3, 6 and 7, the secondary image surface Si is located on the enlargement conjugation side; therefore, the second flat mirror F2 has an area smaller than the first flat mirror F1. Thus, the amount of change in the apparatus thickness in the Xi direction is smaller when the second flat mirror F2 is tilted with respect to the secondary image surface Si than when the first flat mirror F1 is tilted at the same angle. Therefore, as long as the flat mirror is tilted in such a manner as to store optical elements located on the more primary image surface So side than the flat mirror in the thickness direction of the apparatus, the tilt of the second flat mirror F2 is advantageous in the slimming-down of the apparatus. Moreover, it is preferable that the first flat mirror F1 having a larger area be arranged in parallel to the secondary image surface Si since this makes it easy to maintain and adjust the first flat mirror F1 and also permits less warp occurring in the mirror. From such a viewpoint, in the first, third, sixth, and seventh embodiments, the normal line of the flat reflective surface of the second flat mirror F2 is neither parallel nor perpendicular to the normal line of the secondary image surface.

For the tilt of the second flat reflective surface with respect to the secondary image surface, it is desirable that conditional formula (1) below be fulfilled.

$$0<\theta 1<40 \tag{1}$$

where

θ1 represents the angle formed by the normal line of the second flat reflective surface and the normal line of the secondary image surface (in degrees).

The conditional formula (1) defines a preferable conditional range for slimming-down the projector. If the lower limit of the conditional formula (1) is disregarded with the angle θ1 reaching 0 degree, the degree of freedom in arranging the oblique projection optical system is lost. By contrast, if the upper limit of the conditional formula (1) is disregarded with the angle θ1 reaching 40 degrees or more, the angle of the second flat reflective surface becomes too large in such a direction as to increase the apparatus thickness, which adversely reduces the degree of freedom in the arrangement in terms of the slimming-down of the apparatus. It is further preferable that the conditional formula (1) be fulfilled, assuming, while considering the direction in which the second flat reflective surface is tilted with respect to the secondary image surface, that the direction normal to the secondary image surface is an Xi direction, that the image shorter-side direction of the secondary image surface is a Yi direction, that the XiYi plane including the center of the secondary image surface is a PXiYi plane, that, of beams on the PXiYi plane that reach the secondary image surface, the beam having a principal ray that forms the largest angle with the Xi direction when incident on the secondary image surface is RaysXiYiθmax and the beam having a principal ray that forms the smallest angle with the Xi direction when incident on the secondary image surface is RaysXiYiθmin, and that, with θ1=0 as a reference for the +/− border of the angle θ1, the direction in which the optical path of the beam RaysXiYiθmin becomes increasingly shorter than that of the RaysXiYiθmax (counterclockwise in FIGS. 1 to 14) is a positive direction of the angle θ1.

In any of the embodiments, at least one rotation-asymmetric aspherical surface is used. When the rotation-symmetry-axis of the rotation-symmetric optical element is tilted with respect to the Xo direction, rotation-asymmetric aberration occurs. To correct the rotation-asymmetric aberration, it is effective to use an optical element having a surface so formed as to be rotation-asymmetric. The use of a rotation-asymmetric optical surface permits effectively achieving a favorable optical performance. The use of a plurality of optical surfaces that is decentered and rotation-symmetric can provide similar effects in aberration correction to the effects provided by the rotation-asymmetric optical surface; however, a corresponding increase in the number of optical elements employed leads to cost increase. Therefore, it is preferable that at least one rotation-asymmetric optical surface be provided. The use of a rotation-asymmetric optical surface is effective not only in rotation-asymmetric aberration correction but also in cost reduction.

It is preferable that the rotation-asymmetric optical surface is a refractive surface so formed as to be rotation-asymmetric. If the rotation-asymmetric optical surface that corrects rotation-asymmetric aberration is a refractive surface, the error sensitivity can be kept lower in accordance with the absolute value of refractive index lower than that of a reflective surface. This makes its manufacture and adjustment easier, thereby achieving cost reduction. It is preferable that the rotation-asymmetric optical surface be arranged near the aperture stop or near the position where principal rays converge, as is the case with the arrangement of the refractive optical element having an aspherical surface described above. This permits reducing rotation-asymmetric aberration highly sensitive in the aperture radius direction dimensions to thereby provide favorable image quality. Moreover, it is preferable that, in order of optical passage, the rotation-asymmetric refractive surface be arranged adjacent to a reflective surface having an optical power. This permits allocating the aberration correction function of the reflective surface having an optical power partly to the rotation-asymmetric refractive surface, thereby reducing an absolute value of error sensitivity provided to each optical surface. From such a viewpoint, in the first to sixth embodiments (FIGS. 8 to 13), a refractive surface is provided which is so formed as to be rotation-asymmetric.

It is preferable that the rotation-asymmetric optical surface is a reflective surface so formed as to be rotation-asymmetric. From the viewpoint of error sensitivity abbreviation, it cannot be simply stated that only providing a refractive surface as the rotation-asymmetric optical surface is excellent. It is also useful to provide a reflective surface so formed as to be rotation-asymmetric. The first reason for this usefulness is that the reflective surface has a merit which does not cause chromatic aberration. That is, the use of a reflective surface so formed as to be rotation-asymmetric permits correction of curvature of field, distortion, aberration with pupils, and the like that are rotation-asymmetric, without chromatic aberration. The second reason lies in its advantages in manufacture. When the rotation-asymmetric optical surface is used at the position in the optical path closer to the secondary image surface, where required surface accuracy and position accuracy are relatively low, making good use of the magnitude of the absolute value of a value (equal to −1) corresponding to the refractive index of the reflective surface, the same optical power as achieved with the refractive surface can be achieved with a smoother curved surface, which is advantageous in manufacture. Manufacturing a refractive curved surface that is not smooth and has an optical power requires longer machining time due to a large thickness, a large thickness difference, and a sharp curvature, thus resulting in longer molding time in case of molded products, which leads to cost increase. Moreover, there is a risk of deteriorating the illumination distribution since it is typically difficult to provide an antireflective coating uniformly to a surface steeply curved. For the reasons described above, it is preferable to provide a reflective surface so formed as to be rotation-asymmetric in the oblique projection optical system in order to achieve a favorable performance. In the first to fourth and seventh embodiments (FIGS. 1 to 4, FIG. 7), reflective surfaces is used which has a rotation-asymmetric shape. To provide a reflective surface with a rotation-asymmetric shape, it is further preferable to arrange the rotation-asymmetric reflective surface on the more secondary image surface side than the neighborhood of the aperture stop or near the position where principal rays converge.

As in the first to fifth and seventh embodiments (FIGS. 1 to 5, 7), it is preferable that at least two reflective surfaces having an optical power be provided. As long as there is provided at least one reflective optical element for canceling out the effects that the shape of, mainly, the first reflective surface (i.e., curved reflective surface of the first power mirror M1) has on curvature of field and distortion, both the curvature of field and distortion can be improved. As one of the effects, canceling out between the reflective surfaces in this way does not cause chromatic aberration. Thus, it is preferable that at least another one curved reflective surface to be provided in addition to the first curved reflective surface be located at the position adjacent to the first curved reflective surface in the optical path. In another word, it is preferable that, when counted in order from the secondary image surface Si, another one power mirror is an optical element located next to the first power mirror M1.

Assuming that the direction normal to the secondary image surface is an Xi direction, that the image shorter-side direction of the secondary image surface is a Yi direction, that the XiYi plane including the center of the secondary image surface is a PXiYi plane, that, of beams on the PXiYi plane that reach the secondary image surface, the beam having a principal ray which forms the largest angle with the Xi direction when incident on the secondary image surface is RaysXiYiθmax and the beam having a principal ray which forms the smallest angle with the Xi direction when incident on the secondary image surface is RaysXiYiθmin, that the direction perpendicular to the surface optically extended from the PXiYi plane is a Zi direction, and that, of reflective surfaces having an optical power, the reflective surface located at the second position when counted from the secondary image surface side is a "second curved reflective surface", it is desirable that the second curved reflective surface fulfill conditional formula (2) below.

$$(CoR2Zmax - CoR2Zmin) > 0 \qquad (2)$$

where
  CoR2Zmax represents the curvature of the second curved reflective surface in the Zi direction near the region where the beam RaysXiYiθmax is reflected on the second curved reflective surface on the optical extension plane of the PXiYi plane (that is, the curvature in the Zi direction near the line where the optical extension plane of the PXiYi plane and the second curved reflective surface intersect each other, the value for the region where the beam RaysXiYiθmax is reflected), and
  CoR2Zmin represents the curvature of the second curved reflective surface in the Zi direction near the region where the beam RaysXiYiθmin is reflected on the second curved reflective surface on the optical extension plane of the PXiYi plane (that is, the curvature in the Zi direction near the line where the optical extension plane of the PXiYi plane and the second curved reflective surface intersect each other, the value for the region where the beam RaysXiYiθmin is reflected.

Assuming that the side of the secondary image surface including a point at which the principal ray of the beam RaysXiYiθmin reaches the secondary image surface is a lower side and that the side of the secondary image surface including a point at which the principal ray of the beam RaysXiYiθmax reaches the secondary image surface is an upper side, the optical path length of a ray reaching the lower side is shorter than the optical path length of a ray reaching the upper side. To provide a projection optical system that keeps a magnification difference between the lower and upper sides small (that is, keeps distortion small), rays need to be widened drastically on the lower side. Thus, the curvature of the first curved reflective surface in the Zi direction near the region through which the beam RaysXiYiθmin passes becomes larger while the curvature of the first curved reflective surface in the Zi direction near the region through which the beam RaysXiYiθmax passes becomes smaller. In order to cancel out curvature of field arising from this phenomena, it is preferable that the curvature of the second curved reflective surface in the Zi direction near the region through which the beam RaysXiYiθmin passes be smaller than the curvature of the second curved reflective surface in the Zi direction near the region through which the beam RaysXiYiθmax passes. That is, it is preferable that the conditional formula (2) be fulfilled. In another word, if the lower limit of the conditional formula (2) is disregarded, it is difficult to maintain favorable curvature of field. In Examples 1 to 5 and 7 to be described later, FIGS. 23, 25, 27, 29, 31, and 34 show that the value at the left end of the curvature CoZ line is CoR2Zmax and that the value at the right end thereof is CoR2Zmin. The graphs are downward-sloping, thereby proving that the conditional formula (2) is fulfilled.

Assuming that the direction normal to the secondary image surface is an Xi direction, that the image shorter-side direction of the secondary image surface is a Yi direction, that the XiYi plane including the center of the secondary image surface is a PXiYi plane, that, of beams on the PXiYi plane that reach the secondary image surface, the beam having a principal ray which forms the largest angle with the Xi direction when incident on the secondary image surface is RaysXiYiθmax and the beam having a principal ray which forms the smallest angle with the Xi direction when incident on the secondary image surface is RaysXiYiθmin, and that, of reflective surfaces having an optical power, the reflective surface located at the second position when counted from the secondary image surface side is a "second curved reflective surface", it is desirable that along the line, where the second curved reflective surface and the optical extension plane of the PXiYi plane intersect each other, from the region on which the beam RaysXiYiθmax is reflected to the region on which the beam RaysXiYiθmin is reflected, there be a range such that the curvature on this line once becomes large and then small. Forming the second curved reflective surface into such a shape can improve the curvature of field on the PXiYi plane. In Examples 1 to 5 and 7 to be described later, as seen from FIGS. 23, 25, 27, 29, 31, and 34, there exists a range such that the curvature CoY becomes sharp and then gentle.

It is desirable that the maximum value of the angle of incidence formed by the principal ray of a projected beam with respect to the secondary image surface be 65 degrees or more. This angle corresponds to an angle of view in a typical optical system. The larger this angle is, the larger the angle of view is, thus requiring a shorter projection distance. Since this means that projection in a small space is possible, the area occupied by a projected beam can be reduced in either of a front projector and a rear projector.

For the angle of incidence that is formed by the principal ray of a projected beam with respect to the secondary image surface, it is desirable that conditional formula (3) below be fulfilled.

$$1.05 < (\alpha max / \alpha min) < 3 \qquad (3)$$

where
  $\alpha max$ represents the maximum value (in degrees) of the angle of incidence that is formed by the principal ray of the projected beam with respect to the secondary image surface, and αmin represents the minimum value (in degrees) of the angle of incidence that is formed by the principal ray of the projected beam with respect to the secondary image surface.

The conditional formula (3) defines a favorable ratio of the maximum angle of incidence of a principal ray incident on the screen to the minimum angle of incidence thereof. The existence of the upper limit for the conditional formula (3) indicates that the optical system is a projection optical system that has no principal ray perpendicularly incident on the screen surface. That is, referring to a co-axial optical system, the optical system is of a type such as a shift optical system that employs less than half of all angles of view. In the condition described above, since the maximum angle of incidence is 65 degrees or more, it means that, when the ratio in the conditional formula (3) is 3, the minimum value αmin is approximately 21.7 degrees or more. The small ratio obtained by this conditional formula (3) means a small difference existing between the minimum angle of view and the maximum angle of view; therefore, the image surface quality and distortion performance can be improved with ease accordingly, and, in an application to an oblique projection optical system in a rear projection apparatus, the principal ray can be easily bent and returned with a flat mirror or the like due to a small width of the entire beam. Further, when a Fresnel lens is used for the screen in a rear projection apparatus, a small ratio obtained by the conditional formula (3) permits avoiding phenomena such as luminance irregularity, double image, and the like even by use of a Fresnel lens adopting only total reflection. A large ratio over the upper limit of the conditional formula (3) makes it difficult to avoid the aforementioned problems (the phenomena such as luminance irregularity, double image, and the like) without use of a Fresnel lens (hybrid Fresnel lens) combining total reflection and transmission, thus leading to cost increase since such a hybrid Fresnel lens is typically expensive. By contrast, if the lower limit of the conditional formula (3) is disregarded, the angle of incidence is too large to cope with on the screen, thus resulting in a failure to maintain a favorable optical performance.

It is further desirable that conditional formula (3a) below be fulfilled.

$$1.05 < (\alpha max/\alpha min) < 2 \tag{3a}$$

This conditional formula (3a) defines, within the conditional range defined by the conditional formula (3), a conditional range further preferable out of the above-stated points and other considerations. Fulfillment of the conditional formula (3a) permits achieving further slimming-down and an even higher performance.

It is desirable that conditional formula (4) below be fulfilled, assuming that the direction normal to the secondary image surface is an Xi direction, that the image shorter-side direction of the secondary image surface is a Yi direction, that the XiYi plane including the center of the secondary image surface is a PXiYi plane, that, of beams on the PXiYi plane that reach the secondary image surface, the beam having a principal ray which forms the largest angle with the Xi direction when incident on the secondary image surface is RaysXiYiθmax and the beam having a principal ray which forms the smallest angle with the Xi direction when incident on the secondary image surface is RaysXiYiθmin, and that the direction perpendicular to the optical extension plane of the PXiYi plane is a Zi direction.

$$(CoR1Zmin - CoR1Zmax) > 0 \tag{4}$$

where
  CoR1Zmax represents the curvature of the first curved reflective surface in the Zi direction near the region where the beam RaysXiYiθmax is reflected on the first curved reflective surface on the optical extension plane of the PXiYi plane (that is, the curvature in the Zi direction near the line where the optical extension plane of the PXiYi plane and the first curved reflective surface intersect each other, the value for the region where the beam RaysXiYiθmax is reflected), and
  CoR1Zmin represents the curvature of the first curved reflective surface in the Zi direction near the region where the beam RaysXiYiθmin is reflected on the first curved reflective surface on the optical extension plane of the PXiYi plane (that is, the curvature in the Zi direction near the line where the optical extension plane of the PXiYi plane and the first curved reflective surface intersect each other, the value for the region where the beam RaysXiYiθmin is reflected).

As mentioned in the description of the conditional formula (2), in order to maintain a favorable distortion performance, CoR1Zmin needs to be larger than CoR1Zmax. On the other hand, in order to make CoR1Zmax larger than CoR1Zmin, a principal ray reaching the lower side of the secondary image surface needs to be widened beforehand by the second curved reflective surface (second power mirror M2), which method increases the size of the first curved reflective surface (first power mirror M1) thereby leading to a cost increase. In Examples 1 to 7 to be described later, FIGS. 22, 24, 26, 28, 30, 32, and 33 show that the value at the left end of the curvature CoZ line is CoR1Zmax and that the value at the right end thereof is CoR1Zmin. The graphs are upward-sloping, thereby proving that the conditional formula (4) is fulfilled.

It is desirable that conditional formula (5) below be fulfilled.

$$(CoR1Zmin - CoR1Ymin)/(CoR1Zmax - CoR1Ymax) > 1 \tag{5}$$

where
  CoR1Ymax represents the curvature of the first curved reflective surface in the Yi direction near the region where the beam RaysXiYiθmax is reflected on the first curved reflective surface on the optical extension plane of the PXiYi plane (that is, the curvature in the Yi direction near the line where the optical extension plane of the PXiYi plane and the first curved reflective surface intersect each other, the value for the region where the beam RaysXiYiθmax is reflected), and
  CoR1Ymin represents the curvature of the first curved reflective surface in the Yi direction near the region where the beam RaysXiYiθmin is reflected on the first curved reflective surface on the optical extension plane of the PXiYi plane (that is, the curvature in the Yi direction near the line where the optical extension plane of the PXiYi plane and the first curved reflective surface intersect each other, the value for the region where the beam RaysXiYiθmin is reflected).

Fulfillment of the conditional formula (5) permits providing a wide-angle oblique projection optical system with favorable image surface quality and distortion. In Examples 1 to 7 to be described later, FIGS. 22, 24, 26, 28, 30, 32, and 33 show that the values at the left ends of the CoY and CoZ lines are CoR1Ymax and CoR1Zmax, respectively, and that the values at the right ends thereof are CoR1Ymin and CoR1Zmin, respectively. A difference between the values at the right end is larger than a difference between the values at the left end, thus proving that the conditional formula (5) is fulfilled.

Assuming that the direction normal to the secondary image surface is an Xi direction, that the image shorter-side direction of the secondary image surface is a Yi direction, that the XiYi plane including the center of the secondary image surface is a PXiYi plane, and that, of beams on the PXiYi plane that reach the secondary image surface, the beam having a principal ray which forms the largest angle with the Xi direction when incident on the secondary image surface is RaysXiYiθmax and the beam having a principal ray which forms the smallest angle with the Xi direction when incident on the secondary image surface is RaysXiYiθmin, it is desirable that the shape of the effective optical region of the first curved reflective surface on the optical extension plane of the PXiYi plane be a concave having a positive optical power at the region where the beam RaysXiYiθmax is reflected and be a convex having a negative optical power at the region where the beam RaysXiYiθmin is reflected.

If the first curved reflective surface has a convex shape having a negative optical power at the region where the beam RaysXiYiθmin is reflected, as described above, distortion can be improved while suppressing the size of the first power mirror M1. Moreover, if the first curved reflective surface has a concave shape having a positive optical power at the region where the beam RaysXiYiθmax is reflected, curvature of field can be corrected in a different manner from the manner achieved with the convex shape, thereby permitting providing a favorable projected image. When there is a great difference between the angle formed by the beam RaysXiYiθmax with respect to the Xi direction and the angle formed by the beam RaysXiYiθmin with respect to the Xi direction, the sensitivity to the curvature of field on the secondary image surface changes at a rate of approximately $(\cos \theta)^2$ (where $\theta$ is the angle of incidence on the secondary image surface). Thus, when the angle formed with respect to the Xi direction becomes relatively larger, it drastically becomes difficult to correct the image surface. Therefore, it is preferable that the first curved reflective surface be provided with a convex shape at a position where the angle formed with respect to the Xi direction is relatively small and be provided with a concave shape at a position where the aforementioned angle is large, whereby distortion and curvature of field can be kept favorable. In FIGS. 22, 24, 26, 28, 30, 32, and 33, the first power mirror M1 has a negative optical power since the first curved reflective surface is convexedly shaped when its curvature is positive while the first power mirror M1 has a positive optical power since the first curved reflective surface is concavely shaped when its curvature is negative. Therefore, it can be understood that the shape of the effective optical region of the first curved reflective surface on the optical extension plane of the PXiYi plane is a concave having a positive optical power at the region where the beam RaysXiYiθmax is reflected and is a convex having a negative optical power at the region where the beam RaysXiYiθmin is reflected.

Assuming that the principal ray emitted from the center of the primary image surface and then passing through the center of the aperture stop is a "central principal ray", and that the curvature on the line where the optical extension plane of the PXiYi plane and the first curved reflective surface intersect each other is CoR1Y, it is desirable that the point at which the sign of the curvature CoR1Y is reversed be located closer to the region where the beam RaysXiYiθmin is reflected than the intersection of the central principal ray and the first curved reflective surface. As the projection optical system has a wider angle, it becomes more difficult to maintain a favorable image surface quality of a beam reflected on the convex portion of the first curved reflective surface. Thus, for the convex portion of the first curved reflective surface, it is difficult to provide a well-balanced overall performance unless it is located near a ray reaching the lower side (lower side mentioned in the description of the conditional formula (2)) of the secondary image surface. Therefore, it is desirable to fulfill a condition that the point of curvature change lies closer to the minimum angle of incidence θmin than the reflection position of the central principal ray. In Examples 1 to 4 and 7 to be described later, FIGS. 22, 24, 26, 28, and 33 prove that the condition described above is fulfilled.

Assuming that the direction normal to the primary image surface is an Xo direction, that the image shorter-side direction of the primary image surface is a Yo direction, and that the XoYo plane including the center of the primary image surface is a PXoYo plane, it is desirable that the optical extension plane of the PXoYo plane and the optical extension plane of the PXiYi plane be on the same plane. If this condition is fulfilled, from the viewpoint of optical aberration correction, an oblique projection optical system does not have to be asymmetric with respect to the PXoYo plane (or PXiYi plane). Thus, the oblique projection optical system has a plane of symmetry, and thus has an advantage in its easiness to manufacture and adjust over those having no plane of symmetry. Moreover, in a case where an oblique projection optical system has a plane of symmetry but the PXoYo plane and the PXiYi plane are not on the same plane, the optical path may be bent by a flat reflective surface or the like to achieve this. However, in a case where a shape error, such as a curvature error, occurs in this flat reflective surface used for bending the optical path, even if this error has an axis of rotation-symmetry, in terms optical aberration, an error results which is not only rotation-asymmetric but also has no plane of symmetry. For this reason, it is advantageous that the PXoYo plane and the PXiYi plane be on the same plane.

According to the present invention, the first curved reflective surface has a surface shape that is unique in regard to an optical power, thus permitting achieving an oblique projection optical system which provides a cost advantage while maintaining a favorable optical performance and also which is provided in a slim size with a large screen and light-weight, compact optical components.

EXAMPLES

Hereinafter, practical examples of the oblique projection optical system embodying the present invention will be presented with reference to their construction data and the like. Examples 1 to 7 presented below are numerical examples of oblique projection optical systems corresponding to the first to seventh embodiments, respectively, described previously. Thus, the optical construction diagrams (FIGS. 1 to 14, FIG. 35) showing the first to seventh embodiments also show the optical arrangement, projection optical path, and other features of Examples 1 to 7, respectively. The construction data of each example shows the optical arrangement through the entire system starting with the primary image surface So on the reduction side (corresponding to the image formation surface of the display device, i.e., object surface, in enlargement projection) to the secondary image surface Si on the enlargement side (corresponding to the screen surface, i.e., image surface, in enlargement projection). The n-th surface counted from the reduction side is represented by Sn (n=1, 2, 3, . . .). It should be noted that the surfaces S1 and S2 are the both side surfaces of the cover glass CG that covers the primary image surface So to protect it, and thus do not constitute part of the oblique projection optical system.

How each optical surface is arranged is represented by the coordinates (x, y, z) (mm), as measured in a global rectangular coordinate system (x, y, z), of the origin (0) and the coordinate axis vectors (VX, VY) of the local rectangular coordinate system (X, Y, Z) established with its origin (0) located at the vertex of the optical surface. Here, all the coordinate systems are defined as right-hand systems, and the global rectangular coordinate system (x, y, z) is an absolute coordinate system that coincides with the local rectangular coordinate system (X, Y, Z) established for the primary image surface So. Thus, the origin (0) of the global rectangular coordinate system (x, y, z) coincides with the origin (0) located at the center of the primary image surface So, the vector VX on the primary image surface So is parallel to a line normal to the primary image surface So, the vector VY is perpendicular to the vector VX and parallel to the shorter sides of the image on the primary image surface So. For an optical surface that forms part of a coaxial system with an optical surface represented by coordinate data (x, y, z) regarded as the foremost surface, its arrangement is represented by the axial distance T' (mm) in the X direction with respect to the immediately previous optical surface.

The surface shape of each optical element is represented by the curvature C0 (mm$^{-1}$), the radius of curvature r (mm), etc. of the optical surface(s) it has. For example, a surface Sn marked with an asterisk (*) is a rotation-symmetric aspherical surface, whose surface shape is defined by formula (AS) below within the local rectangular coordinate system (X, Y, Z) having its origin (0) at the vertex of the surface. On the other hand, a surface Sn marked with a dollar sign ($) is a rotation-asymmetric aspherical surface (a so-called free curved surface), whose surface shape is defined by formula (BS) below within the local rectangular coordinate system (X, Y, Z) having its origin (0) at the vertex of the surface. Listed together with the construction data are rotation-symmetric aspherical surface data and rotation-asymmetric aspherical surface data. It should be noted that any coefficient that is not expressly shown equals zero, and that, for all data, "E-n" stands for "×10$^{-n}$".

$$X=(C0 \cdot H^2)/(1+\sqrt{1-\epsilon \cdot C0^2 \cdot H^2})+\Sigma(A(i) \cdot H^i) \quad (AS)$$

$$X=(C0 \cdot H^2)/(1+\sqrt{1-\epsilon \cdot C0^2 \cdot H^2})+\Sigma(G(j,k) \cdot Y^j \cdot Z^k) \quad (BS)$$

wherein
X represents the displacement (with respect to the vertex) from the reference surface as measured in the X direction at the height H;
H represents the height in a direction perpendicular to the X-axis (H=$\sqrt{Y^2+Z^2}$);
C0 represents the curvature at the vertex (a positive or negative sign added with respect to the X-axis, a positive sign added when the center of the curvature lies in the positive direction on the vector VX; C0=1/r);
$\epsilon$ represents the quadric surface parameter;
A(i) represents the rotation-symmetric aspherical surface coefficient of order i; and
G(j, k) represents the rotation-asymmetric aspherical surface coefficient of order j with respect to Y and order k with respect to Z.

Also listed are the refractive index N for the d-line of the medium located on the entrance side of each optical surface, the refractive index N' for the d-line of the medium located on the exit side thereof (when the optical surface in question is a reflective surface, its refractive index takes a negative value), and the Abbe number (vd) of the optical material. For an aperture stop ST in Examples 3, 5, and 6, the effective radius R thereof is listed, and for an aperture stop ST in Examples 1, 2, 4, and 7, imaginary aperture stop data (including the effective radius R thereof) are listed, all with other optical surface data. In Examples 1, 2, 4, and 7, the rays that pass through an optical system defined by the construction data are defined as rays that emanate from the primary image surface So and pass the edge of an imaginary circular aperture stop. The aperture stops ST1 and ST2 in the enlarged views (FIGS. 8, 9, 11, and 14) show examples of their actual arrangements.

In Examples 1 to 6, the dimensions (mm) of the image on the primary image surface So are LY=±5.0616 and LZ=±8.892. In Example 7, the dimensions (mm) of the image on the primary image surface So are LY=±5.4035 and LZ=±9.351. Here, the image on the primary image surface So has a rectangular shape, with LY representing the dimension of the image on the primary image surface So along the shorter sides thereof (that is, in the Y direction) and LZ representing the dimension of the image on the primary image surface So along the longer sides thereof (that is, in the Z direction). The optical magnification is 75.8557 in Example 1, 75.8562 in Example 2, 75.8673 in Example 3, 76.2956 in Example 4, 75.8562 in Example 5, 69.5349 in Example 6, and 69.9455 in Example 7.

Table 1 show data corresponding to conditional formulae and their relevant data for each example, together with the Y value at the point (on the primary image surface So) where a principal ray passing through the point (Co=0), where the sign of the curvature of the first power mirror M1 inverts, leaves the primary image surface So. The vector VY in Examples 1, 2, 5, 6, and 7 is opposite to the vector VY in Examples 3 and 4 (opposite in the figures); therefore, the signs in the Examples 1, 2, 5, 6, and 7 are opposite to the signs in Examples 3 and 4.

FIGS. 15A to 15Y through 21A to 21Y are spot diagrams of Examples 1 to 7, respectively. Each spot diagram shows the imaging performance (in ±1 mm divisions) observed for 3 different wavelengths (450 nm, 546 nm, and 630 nm) at 25 evaluation points on the secondary image surface Si. The coordinates (Y, Z) in the diagrams are local coordinates (Y, Z; mm; e-n=×10$^{-n}$) on the secondary image surface Si corresponding to the projection positions of the spot barycenters of the individual evaluation points. Since Examples 1 to 7 are all constructed as optical systems plane-symmetric with respect to the XY-plane, each spot diagram only shows the positive-Z-side half of the secondary image surface Si, and the other half is omitted from illustration. The evaluation points conjugate with an array of vertically five and horizontally five points that equally divide the Z-side half of the primary image surface So. When multiplied with the magnification, the Y and Z values of the local coordinates of the points on the primary image surface So indicate the ideal imaging points on the spot diagrams, and the deviations from those calculated values indicate distortion. In each spot diagram, the starting point lies on the +Z side of the primary image surface So. In Examples 1, 3, and 7, the number of reflective surfaces is even; therefore, a Z value on the secondary image surface Si is negative.

FIGS. 22, 24, 26, 28, 30, 32, and 33 show the surface shape of the first power mirror M1 of Examples 1 to 7, respectively, in curvature plots. FIGS. 23, 25, 27, 29, 31, and 34 show the surface shape of the second power mirror M2 of Examples 1 to 5 and 7, respectively, in curvature plots. In each graph of FIGS. 22 to 34, the vertical axis corresponds to the curvature CoY, CoZ (in mm$^{-1}$), and the horizontal axis corresponds to the position reaching the secondary image surface Si. The CoY line is a line plotted to indicate the curvature on the XY plane at the position where a principal ray emitted from a point on the XY plane of the primary image surface So hits the first and second power mirrors M1 and M2. The CoZ line is a line plotted to indicate the curvature in the direction parallel to the XZ plane at the position where a principal ray emitted from a point on the Xz plane of the primary image surface So hits the first and second power mirrors M1 and M2. When the curvature is positive, it means that the optical surface has a negative optical power since it has a convex shape. When the curvature is negative, it means that the optical surface has a positive optical power since it has a concave shape. As can be understood from the graphs of FIGS. 22 to 34, in any of Examples 1 to 7, on a portion where a ray on the maximum angle of incidence θ max side with respect to the secondary image surface Si enters, the curvature CoY of the first power mirror M1 is negative. Thus, the first power mirror M1 on the portion where the curvature CoY is negative has a concave surface shape.

In the first and second power mirrors M1 and M2, CoZ indicates the curvature in the Z direction near a line where the reflective surface thereof intersects with the local XY plane. In any of examples, the reflective surface has a curvature with the same sign not only on the small region near the aforementioned line but also on at least the region across its width in the Z direction which is covered by a beam emitted from one point on the primary image surface So. Moreover, in any of Examples, optical elements such as the first and second power mirrors M1 and M2 have a smooth surface that is continuous and smooth without discontinuity or the like in its effective optical region. Therefore, even although the shape of an optical surface on the effective optical region and its proximity on the optical extension plane of the PXiYi plane is uniquely formed, a favorable optical performance can be obtained not only on the corresponding region but also on the entire secondary image surface Si.

Construction Data of Example 1

So (Primary Image Surface)
Coordinates:

| O:  | 0.00000, 0.00000, 0.00000 |
| VX: | 1.00000000, 0.00000000, 0.00000000 |
| VY: | 0.00000000, 1.00000000, 0.00000000 |

N=1.00000
C0=0.00000000 (r=∞)
N'=1.00000
T'=0.47

S1 (Entrance-Side Surface of Cover Glass CG)
N=1.00000
C0=0.00000000 (r=∞)
N'=1.51872, vd=64.20
T'=3

S2 (Exit-Side Surface of Cover Glass CG)
N=1.51872, vd=64.20
C0=0.00000000 (r=∞)
N'=1.00000

S3* (Fourth Power Mirror M4)
Coordinates:

| O:  | 85.59941, −50.69170, 0.00000 |
| VX: | 0.95161079, −0.30730587, 0.00000000 |
| VY: | 0.30730587, 0.95161079, 0.00000000 |

N=1.00000
C0=−0.01108832(r=−90.1850)

Aspherical Surface Data:
  ε=1.00000000
  A(4)=7.80071875E−8
  A(6)=3.97996445E−13
  A(8)=2.04365870E−15
  A(10)=1.39723412E−20
N'=−1.00000

S4$ (Entrance-Side Surface of Lens L1)
Coordinates:

| O:  | 46.26458, −33.36292, 0.00000 |
| VX: | −0.91856276, −0.39527517, 0.00000000 |
| VY: | −0.39527517, 0.91856276, 0.00000000 |

N=1.00000
C0=0.00000000 (r=∞)

Aspherical Surface Data:
  ε=1.00000000
  G(3, 0)=8.77671782E−5
  G(4, 0)=6.04543819E−6
  G(5, 0)=3.70610540E−8
  G(6, 0)=2.41618866E−10
  G(7, 0)=−4.77087390E−11
  G(8, 0)=−5.28227499E−11
  G(1, 2)=0.000103696546
  G(2, 2)=1.03445797E−5
  G(3, 2)=4.23467349E−9
  G(4, 2)=1.71861256E−8
  G(5, 2)=4.03841271E−10
  G(6, 2)=−5.09741872E−10
  G(0, 4)=4.03644177E−6
  G(1, 4)=1.80374040E−8
  G(2, 4)=2.15340410E−8
  G(3, 4)=3.35303784E−9
  G(4, 4)=−9.55026678E−10
  G(5, 4)=−1.20753017E−10
  G(6, 4)=2.72643342E−11
  G(0, 6)=2.36387167E−8
  G(1, 6)=−7.46019181E−10
  G(2, 6)=−2.06357284E−10
  G(3, 6)=−9.08191038E−11
  G(4, 6)=−3.65767984E−11
  G(0, 8)=−2.79060403E−10
N'=1.52438, vd=52.20

S5 (Exit-Side Surface of Lens L1)
Coordinates:

| O:  | 44.28268, −33.30227, 0.00000 |
| VX: | −0.91442048, −0.40476558, 0.00000000 |
| VY: | −0.40476558, 0.91442048, 0.00000000 |

N=1.52438, vd=52.20
C0=0.00000000 (r=∞)
N'=1.00000

S6* (Third Power mirror M3)

Coordinates:

| O:  | 26.02447, −31.85209, 0.00000      |
|-----|-----------------------------------|
| VX: | −0.99285570, 0.11932125, 0.00000000 |
| VY: | 0.11932125, 0.99285570, 0.00000000  |

N=1.00000
C0=0.01355357(r=73.7813)

Aspherical Surface Data:
 $\epsilon$=13.5251770
 A(4)=−2.20195900E−9
 A(6)=1.47374708E−8
 A(8)=−5.99205447E−11
 A(10)=1.60153983E−13
 A(12)=−9.38460117E−17
N'=−1.00000

S7$ (Second Power mirror M2)

Coordinates:

| O:  | 69.20977, −74.87212, 0.00000      |
|-----|-----------------------------------|
| VX: | 0.96000691, −0.27997630, 0.00000000 |
| VY: | 0.27997630, 0.96000691, 0.00000000  |

N=1.00000
C0=0.00000000 (r=∞)

Aspherical Surface Data:
 $\epsilon$=1.00000000
 G(2, 0)=0.000332981846
 G(3, 0)=6.15622428E−6
 G(4, 0)=−9.60556133E−7
 G(5, 0)=−1.03053717E−8
 G(6, 0)=2.80438222E−10
 G(7, 0)=6.38517733E−12
 G(8, 0)=4.06476918E−15
 G(9, 0)=−1.11111282E−15
 G(10, 0)=−1.21380104E−17
 G(0, 2)=0.000461036355
 G(1, 2)=−4.67852414E−5
 G(2, 2)=−1.95098452E−6
 G(3, 2)=7.89861068E−9
 G(4, 2)=1.53700471E−9
 G(5, 2)=2.23633556E−11
 G(6, 2)=−1.69610257E−13
 G(7, 2)=−4.01239853E−15
 G(8, 2)=7.38201899E−18
 G(0, 4)=8.71108208E−7
 G(1, 4)=7.15981436E−8
 G(2, 4)=2.12977196E−9
 G(3, 4)=1.83671068E−11
 G(4, 4)=−6.86410735E−13
 G(5, 4)=−2.26108824E−14
 G(6, 4)=−2.04638489E−16
 G(0, 6)=−6.87221525E−10
 G(1, 6)=−4.51685275E−11
 G(2, 6)=−1.11139447E−12
 G(3, 6)=−1.60300613E−14
 G(4, 6)=−1.22310034E−16
 G(0, 8)=3.09872243E−13
 G(1, 8)=1.73546676E−14
 G(2, 8)=2.06645044E−16
 G(0, 10)=1.74293921E−17
N'=−1.00000

S8$ (First Power Mirror M1)

Coordinates:

| O:  | 24.51416, −39.32528, 0.00000      |
|-----|-----------------------------------|
| VX: | −0.99312583, 0.11705166, 0.00000000 |
| VY: | 0.11705166, 0.99312583, 0.00000000  |

N=1.00000
C0=0.06288945(r=15.9009)

Aspherical Surface Data:
 $\epsilon$=−2.48198722
 G(2, 0)=0.00613902954
 G(3, 0)=0.000139732235
 G(4, 0)=1.33076421E−6
 G(5, 0)=4.09347721E−9
 G(6, 0)=−3.34400691 E−11
 G(7, 0)=−3.29710220E−13
 G(8, 0)=−5.61487879E−16
 G(9, 0)=3.42229868E−18
 G(10, 0)=1.16561532E−20
 G(0, 2)=−0.000823391980
 G(1, 2)=1.91405995E−5
 G(2, 2)=−4.46531091E−7
 G(3, 2)=−2.15788892E−8
 G(4, 2)=−3.15303954E−10
 G(5, 2)=−2.18246270E−12
 G(6, 2)=−5.92040460E−15
 G(7, 2)=7.56286263E−18
 G(8, 2)=5.51941208E−20
 G(0, 4)=−2.18503392E−7
 G(1, 4)=−1.15410651E−8
 G(2, 4)=−2.36179288E−10
 G(3, 4)=−2.69610956E−12
 G(4, 4)=−1.91879873E−14
 G(5, 4)=−8.20539155E−17
 G(6, 4)=−1.60357640E−19
 G(0, 6)=2.15633363E−11
 G(1, 6)=7.82924827E−13
 G(2, 6)=1.16664315E−14
 G(3, 6)=7.77576639E−17
 G(4, 6)=1.92193996E−19
 G(0, 8)=−8.89582345E−16
 G(1, 8)=−1.00280133E−17
 G(2, 8)=−3.07792400E−20
 G(0, 10)=3.32179670E−21
N'=−1.00000

S9 (Second Flat Mirror F2)

Coordinates:

| O:  | −10.67526, −220.84700, 0.00000     |
|-----|-----------------------------------|
| VX: | 0.93021460, −0.36701607, 0.00000000 |
| VY: | 0.36701607, 0.93021460, 0.00000000  |

N=1.00000
C0=0.00000000 (r=∞)
N'=−1.00000

S10 (First Flat Mirror F1)

Coordinates:

| | |
|---|---|
| O: | −249.40480, −503.11167, 0.00000 |
| VX: | −0.90156753, 0.43263840, 0.00000000 |
| VY: | 0.43263840, 0.90156753, 0.00000000 |

N=1.00000

C0=0.00000000 (r=∞)

N'=−1.00000

Si (Secondary Image Surface)

Coordinates:

| | |
|---|---|
| O: | −273.00110, −801.91454, 0.00000 |
| VX: | 0.90156753, −0.43263840, 0.00000000 |
| VY: | −0.43263840, −0.90156753, 0.00000000 |

Imaginary Aperture Stop Data

Coordinates:

| | |
|---|---|
| O: | 100400.00000, −25032.53150, 0.00000 |
| VX: | 1.00000000, 0.00000000, 0.00000000 |
| VY: | 0.00000000, 1.00000000, 0.00000000 |

N=1.00000

C0=0.00000000 (r=∞), R=14491.5

N'=1.00000

Construction Data of Example 2

So (Primary Image Surface)

Coordinates:

| | |
|---|---|
| O: | 0.00000, 0.00000, 0.00000 |
| VX: | 1.00000000, 0.00000000, 0.00000000 |
| VY: | 0.00000000, 1.00000000, 0.00000000 |

N=1.00000

C0=0.00000000 (r=∞)

N'=1.00000

T'=0.47

S1 (Entrance-Side Surface of Cover Glass CG)

N=1.00000

C0=0.00000000 (r=∞)

N'=1.51872, νd=64.20

T'=3

S2 (Exit-Side Surface of Cover Glass CG)

N=1.51872, νd=64.20

C0=0.00000000 (r=∞)

N'=1.00000

S3* (Fourth Power Mirror M4)

Coordinates:

| | |
|---|---|
| O: | 90.82073, −47.59744, 0.00000 |
| VX: | 0.96886075, −0.24760622, 0.00000000 |
| VY: | 0.24760622, 0.96886075, 0.00000000 |

N=1.00000

C0=−0.01028024(r=−97.2740)

Aspherical Surface Data:
 $\epsilon$=1.07417884
 A(4)=8.08181592E−8
 A(6)=−8.35222346E−13
 A(8)=1.95299128E−15
 A(10)=−6.15869507E−20

N'=−1.00000

S4$ (Entrance-Side Surface of Lens L1)

Coordinates:

| | |
|---|---|
| O: | 49.44265, −34.28778, 0.00000 |
| VX: | −0.85212012, −0.52334625, 0.00000000 |
| VY: | −0.52334625, 0.85212012, 0.00000000 |

N=1.00000

C0=0.00000000 (r=∞)

Aspherical Surface Data:
 $\epsilon$=1.00000000
 G(3, 0)=3.53894224E−5
 G(4, 0)=3.13780823E−6
 G(5, 0)=7.59673717E−8
 G(6, 0)=3.71105089E−9
 G(7, 0)=−2.28779877E−10
 G(8, 0)=−4.02956084E−11
 G(1, 2)=4.34898435E−5
 G(2, 2)=6.74831520E−6
 G(3, 2)=1.05806103E−7
 G(4, 2)=5.99174836E−10
 G(5, 2)=5.84846859E−11
 G(6, 2)=−8.59922110E−11
 G(0, 4)=3.15582019E−6
 G(1, 4)=7.14694226E−8
 G(2, 4)=1.22716694E−9
 G(3, 4)=7.85125131E−10
 G(4, 4)=1.22725702E−11
 G(5, 4)=−4.27801902E−11
 G(6, 4)=−1.56024078E−12
 G(0, 6)=8.26287000E−9
 G(1, 6)=−4.17466643E−10
 G(2, 6)=−7.09879830E−11
 G(3, 6)=−6.77451411E−12
 G(4, 6)=−7.33268170E−12
 G(0, 8)=−8.30843582E−11

N'=1.52438, νd=52.20

S5 (Exit-Side Surface of Lens L1)

Coordinates:

| | |
|---|---|
| O: | 47.32804, −34.23056, 0.00000 |
| VX: | −0.84668130, −0.53210035, 0.00000000 |
| VY: | −0.53210035, 0.84668130, 0.00000000 |

N=1.52438, vd=52.20
C0=0.00000000 (r=∞)
N'=1.00000

S6* (Third Power mirror M3)

Coordinates:

| O: | 26.95565, −31.65156, 0.00000 |
| VX: | −0.99616732, 0.08746808, 0.00000000 |
| VY: | 0.08746808, 0.99616732, 0.00000000 |

N=1.00000
C0=0.00881819(r=113.4020)

Aspherical Surface Data:
ε=−0.515457877
A(4)=3.29024382E−6
A(6)=5.29040780E−9
A(8)=−1.08916294E−11
A(10)=4.43978434E−14
A(12)=−4.74058693E−17
N'=−1.00000

S7$ (Second Power Mirror M2)

Coordinates:

| O: | 88.59419, −83.91127, 0.00000 |
| VX: | 0.99831680, −0.05799626, 0.00000000 |
| VY: | 0.05799626, 0.99831680, 0.00000000 |

N=1.00000
C0=−0.00090012(r=−1110.9668)

Aspherical Surface Data:
ε=1.00000000
G(2, 0)=0.00254235299
G(3, 0)=2.88707618E−5
G(4, 0)=−6.20606753E−7
G(5, 0)=−1.43550363E−8
G(6, 0)=7.21427711E−11
G(7, 0)=5.25092503E−12
G(8, 0)=1.13053483E−13
G(9, 0)=2.59725355E−15
G(10, 0)=2.82956211E−17
G(0, 2)=0.00360360630
G(1, 2)=−2.16661651E−5
G(2, 2)=−1.76582887E6
G(3, 2)=2.11889825E−9
G(4, 2)=1.80115633E−9
G(5, 2)=4.55458805E−11
G(6, 2)=2.27980303E−13
G(7, 2)=−4.94972746E−15
G(8, 2)=−4.87162307E−17
G(0, 4)=1.01201569E−6
G(1, 4)=8.23527143E−8
G(2, 4)=2.28640961E−9
G(3, 4)=1.93158745E−11
G(4, 4)=−8.14940953E−13
G(5, 4)=−2.88038350E−14
G(6, 4)=−2.74679190E−16
G(0, 6)=−5.05491030E−10
G(1, 6)=−4.37929713E−11
G(2, 6)=−8.64052440E−13
G(3, 6)=−6.95784170E−15

G(4, 6)=−2.44035370E−17
G(0, 8)=9.61486343E−14
G(1, 8)=1.36462267E−14
G(2, 8)=1.62237823E−16
G(0, 10)=5.16114066E−17
N'=−1.00000

S8$ (First Power Mirror M1)

Coordinates:

| O: | 37.00023, −59.31105, 0.00000 |
| VX: | −0.99990438, −0.01382841, 0.00000000 |
| VY: | −0.01382841, 0.99990438, 0.00000000 |

N=1.00000
C0=0.03775486(r=26.4867)

Aspherical Surface Data:
ε=−2.47620263
G(2, 0)=−0.00217207259
G(3, 0)=−5.46272599E−6
G(4, 0)=−6.89205056E−9
G(5, 0)=−4.33308933E−11
G(6, 0)=−2.07613577E−13
G(7, 0)=2.47325645E−16
G(8, 0)=5.77552058E−18
G(9, 0)=2.24696125E−20
G(10, 0)=3.55814425E−23
G(0, 2)=−0.00245774936
G(1, 2)=−9.36458095E−6
G(2, 2)=−2.54790083E−8
G(3, 2)=−1.78256782E−10
G(4, 2)=−9.33072210E−13
G(5, 2)=4.08966947E−15
G(6, 2)=4.55031944E−17
G(7, 2)=1.06577993E−19
G(8, 2)=7.75078293E−23
G(0, 4)=3.82991631E−8
G(1, 4)=3.99493917E−10
G(2, 4)=2.95965113E−12
G(3, 4)=1.59512422E−14
G(4, 4)=7.88376893E−17
G(5, 4)=2.15068129E−19
G(6, 4)=−7.02953496E−24
G(0, 6)=−1.12023731E−12
G(1, 6)=−5.54104962E−15
G(2, 6)=−3.61753251E−17
G(3, 6)=−5.70993343E−22
G(4, 6)=6.11166388E−22
G(0, 8)=3.31821298E−17
G(1, 8)=−3.53456705E−20
G(2, 8)=−2.61219155E−22
G(0, 10)=−6.16495161E−22
N'=−1.00000

S9 (First Flat Mirror F1)

Coordinates:

| O: | 111.09989, −463.26146, 0.00000 |
| VX: | 0.99961537, 0.02773278, 0.00000000 |
| VY: | −0.02773278, 0.99961537, 0.00000000 |

N=1.00000
C0=0.00000000 (r=∞)
N'=−1.00000

Si (Secondary Image Surface)

Coordinates:

| O: | −13.61638, −727.63091, 0.00000 |
|---|---|
| VX: | −0.99961537, −0.02773278, 0.00000000 |
| VY: | 0.02773278, −0.99961537, 0.00000000 |

Imaginary Aperture Stop Data

Coordinates:

| O: | 100400.00000, −25032.53150, 0.00000 |
|---|---|
| VX: | 1.00000000, 0.00000000, 0.00000000 |
| VY: | 0.00000000, 1.00000000, 0.00000000 |

N=1.00000
C0=0.00000000 (r=∞), R=14491.5
N'=1.00000

Construction Data of Example 3

So (Primary Image Surface)

Coordinates:

| O: | 0.00000, 0.00000, 0.00000 |
|---|---|
| VX: | 1.00000000, 0.00000000, 0.00000000 |
| VY: | 0.00000000, 1.00000000, 0.00000000 |

N=1.00000
C0=0.00000000 (r=∈)
N'=1.00000
T'=0.5

S1 (Entrance-Side Surface of Cover Glass CG)
N=1.00000
C0=0.00000000 (r=∈)
N'=1.51045, vd=61.19
T'=3

S2 (Exit-Side Surface of Cover Glass CG)
N=1.51045, vd=61.19
C0=0.00000000 (r=∞)
N'=1.00000

S3* (Entrance-Side Surface of Lens L5)

Coordinates:

| O: | 33.20000, 0.37770, 0.00000 |
|---|---|
| VX: | 0.99970884, −0.02412951, 0.00000000 |
| VY: | 0.02412951, 0.99970884, 0.00000000 |

N=1.00000
C0=0.01163429(r=85.9528)
Aspherical Surface Data:
  ∈=1.00000000
  A(4)=−3.08945486E−5
  A(6)=−1.69854691E−7
  A(8)=2.98237817E−9
  A(10)=−2.87260782E−11
N'=1.77064, vd=45.55
T'=2

S4 (Exit-Side Surface of Lens L5)
N=1.77064, vd=45.55
C0=0.00000000 (r=∈)
N'=1.00000
T'=0.759492

S5 (Aperture Stop ST)
N=1.00000
C0=0.00000000 (r=∞), R=5.99
N'=1.00000
T'=3.43812

S6 (Entrance-Side Surface of Lens L4)
N=1.00000
C0=−0.01612355(r=−62.0211)
N'=1.78478, vd=26.33
T'=3

S7 (Bonded Surface of Lens L4)
N=1.78478, vd=26.33
C0=0.05675606(r=17.6193)
N'=1.63912, vd=56.10
T'=4.4604

S8 (Exit-side Surface of Lens L4)
N=1.63912, vd=56.10
C0=−0.02877877(r=−34.7478)
N'=1.00000
T'=8.07107

S9 (Entrance-side Surface of Lens L3)
N=1.00000
C0=0.00045619(r=2192.0700)
N'=1.61398, vd=36.44
T'=7.9667

S10 (Exit-side Surface of Lens L3)
N=1.61398, vd=36.44
C0=−0.04527568(r=−22.0869)
N'=1.00000
T'=30.464

S11 (Entrance-Side Surface of Lens L2)
N=1.00000
C0=−0.05191988(r=−19.2604)
N'=1.81359, vd=36.44
T'=2.5

S12 (Exit-Side Surface of Lens L2)
N=1.81359, vd=36.44
C0=−0.02453932(r=−40.7509)
N'=1.00000
T'=14.0521

S13$ (Entrance-Side Surface of Lens L1)
N=1.00000
C0=−0.00975490 (r=−102.5126)
Aspherical Surface Data:
  ∈=1.00000000
  G(2, 0)=−0.000704919616
  G(3, 0)=0.000165579062
  G(4, 0)=−1.06291352E−5
  G(5, 0)=2.62435599E−7
  G(6, 0)=1.14866774E−8
  G(7, 0)=−5.28576420E−10
  G(8, 0)=−4.20172500E−11
  G(9, 0)=2.67353071E−12
  G(10, 0)=−3.91365948E−14

G(0, 2)=−0.000266039134
G(1, 2)=0.000138335742
G(2, 2)=−8.82980350E−6
G(3, 2)=−3.68763764E−7
G(4, 2)=7.77341670E−8
G(5, 2)=−2.04184030E−9
G(6, 2)=−2.03057180E−10
G(7, 2)=1.27216128E−11
G(8, 2)=−1.97410880E−13
G(0, 4)=1.78366041E−6
G(1, 4)=−7.30246855E−7
G(2, 4)=8.73974571E−8
G(3, 4)=−3.42298694E−9
G(4, 4)=−1.35285070E−10
G(5, 4)=1.32326360E−11
G(6, 4)=−2.42765133E−13
G(0, 6)=−3.61547265E−9
G(1, 6)=1.51916107E−9
G(2, 6)=−1.92236195E−10
G(3, 6)=1.07974316E−11
G(4, 6)=−2.18196579E−13
G(0, 8)=−4.52104347E−13
G(1, 8)=−4.89544026E−13
G(2, 8)=2.14785190E−14
G(0, 10)=4.78735733E−15
N'=1.52729, νd=56.38
T'=3.4

S14 (Exit-Side Surface of Lens L1)
N=1.52729, νd=56.38
C0=−0.01007753(r=−99.2307)
N'=1.00000

S15* (Second Power Mirror M2)

Coordinates:

| | | |
|---|---|---|
| O: | 152.55096, −10.35426, 0.00000 | |
| VX: | 0.92663209, −0.37596938, 0.00000000 | |
| VY: | 0.37596938, 0.92663209, 0.00000000 | |

N=1.00000
C0=−0.00483113(r=−206.9911)

Aspherical Surface Data:
  ε=−2.52952291
  A(4)=9.55990507E−7
  A(6)=−2.29605438E−10
  A(8)=2.79383985E−14
  A(10)=−1.35003718E−18
N'=−1.00000

S16$ (First Power mirror M1)

Coordinates:

| | | |
|---|---|---|
| O: | 100.71219, 31.29259, 0.00000 | |
| VX: | −0.78457167, 0.62003814, 0.00000000 | |
| VY: | 0.62003814, 0.78457167, 0.00000000 | |

N=1.00000
C0=0.04364309(r=22.9131)

Aspherical Surface Data:
  ε=−1.74036193
  G(2, 0)=−0.00118376352
  G(3, 0)=−7.69008628E−6
  G(4, 0)=4.06090411E−8
  G(5, 0)=2.24870471E−10
G(6, 0)=−5.45283166E−13
G(7, 0)=−7.74976957E−15
G(8, 0)=7.99738170E−18
G(9, 0)=−3.57661273E−20
G(10, 0)=6.22764864E−22
G(0, 2)=−0.00147418107
G(1, 2)=−2.44420714E6
G(2, 2)=−1.44576907E−8
G(3, 2)=9.32083655E−10
G(4, 2)=−1.23497312E−12
G(5, 2)=−3.41409000E−14
G(6, 2)=3.36355244E−17
G(7, 2)=−3.25750939E−19
G(8, 2)=5.23694650E−21
G(0, 4)=3.15421469E−9
G(1, 4)=6.34627255E−10
G(2, 4)=−5.28979445E−12
G(3, 4)=−4.39013091E−14
G(4, 4)=3.47237906E−16
G(5, 4)=1.53887334E−18
G(6, 4)=−9.79397825E−21
G(0, 6)=−8.50955294E−12
G(1, 6)=1.47647924E−13
G(2, 6)=−2.92124183E−16
G(3, 6)=−1.12156633E−18
G(4, 6)=−9.86954578E−21
G(0, 8)=1.24003124E−15
G(1, 8)=−3.13508404E−17
G(2, 8)=1.50816722E−19
G(0, 10)=2.89628271E−20
N'=−1.00000

S17 (Second Flat Mirror F2)

Coordinates:

| | | |
|---|---|---|
| O: | 238.38001, 164.43476, 0.00000 | |
| VX: | 0.83759424, −0.54629285, 0.00000000 | |
| VY: | 0.54629285, 0.83759424, 0.00000000 | |

N=1.00000
C0=0.00000000 (r=∞)
N'=−1.00000

S18 (First Flat Mirror F1)

Coordinates:

| | | |
|---|---|---|
| O: | 286.23334, 464.77735, 0.00000 | |
| VX: | −0.87063163, 0.49193552, 0.00000000 | |
| VY: | 0.49193552, 0.87063163, 0.00000000 | |

N=1.00000
C0=0.00000000 (r=∞)
N'=−1.00000

Si (Secondary Image Surface)

Coordinates:

| | | |
|---|---|---|
| O: | −13.61638, −727.63091, 0.00000 | |
| VX: | −0.99961537, −0.02773278, 0.00000000 | |
| VY: | 0.02773278, −0.99961537, 0.00000000 | |

Construction Data of Example 4

So (Primary Image Surface)

Coordinates:

| O: | 0.00000, 0.00000, 0.00000 |
| --- | --- |
| VX: | 1.00000000, 0.00000000, 0.00000000 |
| VY: | 0.00000000, 1.00000000, 0.00000000 |

N=1.00000
C0=0.00000000 (r=∞)
N'=1.00000
T'=0.5

S1 (Entrance-Side Surface of Cover Glass CG)
N=1.00000
C0=0.00000000 (r=∞)
N'=1.51045, vd=61.19
T'=3

S2 (Exit-Side Surface of Cover Glass CG)
N=1.51045, vd=61.19
C0=0.00000000 (r=∞)
N'=1.00000

S3* (Entrance-Side Surface of Lens L5)

Coordinates:

| O: | 33.20000, −0.59011, 0.00000 |
| --- | --- |
| VX: | 0.99982965, −0.01845732, 0.00000000 |
| VY: | 0.01845732, 0.99982965, 0.00000000 |

N=1.00000
C0=0.00824622(r=121.2676)

Aspherical Surface Data:
  $\epsilon$=1.00000000
  A(4)=−3.39988927E−5
  A(6)=−2.27240582E−8
  A(8)=−1.53875232E−9
  A(10)=1.73416040E−11
N'=1.79806, vd=42.10
T'=1.86925

S4 (Exit-Side Surface of Lens L5)
N=1.79806, vd=42.10
C0=0.00000000 (r=∞)
N'=1.00000
T'=2.16329

S5 (Entrance-Side Surface of Lens L4)
N=1.00000
C0=−0.02536458(r=−39.4251)
N'=1.81264, vd=25.46
T'=2.23376

S6 (Bonded Surface of Lens L4)
N=1.81264, vd=25.46
C0=0.04964076(r=20.1447)
N'=1.70941, vd=55.48
T'=3.42088

S7 (Exit-Side Surface of Lens L4)
N=1.70941, vd=55.48
C0=−0.03697390 (r=−27.0461)
N'=1.00000
T'=10.4902

S8 (Entrance-Side Surface of Lens L3)
N=1.00000
C0=−0.00441414(r=−226.5446)
N'=1.64843, vd=33.32
T'=5.78435

S9 (Exit-Side Surface of Lens L3)
N=1.64843, vd=33.32
C0=−0.04463122(r=−22.4058)
N'=1.00000
T'=37.0601

S10 (Entrance-Side Surface of Lens L2)
N=1.00000
C0=−0.05034909(r=−19.8613)
N'=1.81345, vd=34.26
T'=2

S11 (Exit-Side Surface of Lens L2)
N=1.81345, vd=34.26
C0=−0.02237428(r=−44.6942)
N'=1.00000
T'=18.7721

S12$ (Entrance-Side Surface of Lens L1)
N=1.00000
C0=−0.02955061 (r=−33.8402)

Aspherical Surface Data:
  $\epsilon$=1.00000000
  G(2, 0)=−0.00190891783
  G(3, 0)=8.91795058E−5
  G(4, 0)=−2.14835850E−6
  G(5, 0)=−2.37326384E−7
  G(6, 0)=2.04420216E−8
  G(7, 0)=7.75188017E−11
  G(8, 0)=−5.21144542E−11
  G(9, 0)=1.34606486E−12
  G(10, 0)=−3.99461720E−15
  G(0, 2)=−0.00181832232
  G(1, 2)=0.000125424806
  G(2, 2)=−4.33122168E−6
  G(3, 2)=−4.90861704E−7
  G(4, 2)=3.96942191E−8
  G(5, 2)=1.41615512E−9
  G(6, 2)=−1.94423978E−10
  G(7, 2)=3.52084628E−12
  G(8, 2)=3.11848767E−14
  G(0, 4)=3.19655196E−6
  G(1, 4)=−7.65642982E−7
  G(2, 4)=5.23005937E−8
  G(3, 4)=1.02673069E−9
  G(4, 4)=−2.02814406E−10
  G(5, 4)=2.67145268E−12
  G(6, 4)=9.87087116E−14
  G(0, 6)=−8.13036828E−9
  G(1, 6)=2.25138847E−9
  G(2, 6)=−1.65439727E−10
  G(3, 6)=2.58239539E−13
  G(4, 6)=1.51956257E−13
  G(0, 8)=5.15024688E−12
  G(1, 8)=−2.32071445E−12
  G(2, 8)=1.44321783E−13
  G(0, 10)=4.67793604E−15
N'=1.52729, vd=56.38
T'=2.5

S13 (Exit-Side Surface of Lens L1)
N=1.52729, vd=56.38
C0=−0.02949884(r=−33.8996)
N'=1.00000

S14* (Second Power mirror M2)
Coordinates:

| O:  | 164.22119, −7.53257, 0.00000      |
| --- | --------------------------------- |
| VX: | 0.97045933, −0.24126479, 0.00000000 |
| VY: | 0.24126479, 0.97045933, 0.00000000  |

N=1.00000
C0=−0.00479001 (r=−208.7679)

Aspherical Surface Data:
  ε=1.00000000
  A(4)=9.33423274E−7
  A(6)=−1.92121923E−10
  A(8)=2.13374894E−14
  A(10)=−9.45616798E−19
N'=−1.00000

S15$ (First Power Mirror M1)
Coordinates:

| O:  | 98.50163, 21.60438, 0.00000        |
| --- | ---------------------------------- |
| VX: | −0.91638973, 0.40028722, 0.00000000 |
| VY: | 0.40028722, 0.91638973, 0.00000000  |

N=1.00000
C0=0.04240525(r=23.5820)

Aspherical Surface Data:
  ε=−1.78893763
  G(2, 0)=−0.00102268052
  G(3, 0)=−1.02925596E−5
  G(4, 0)=1.02602074E−7
  G(5, 0)=−3.80023997E−10
  G(6, 0)=3.49116717E−13
  G(7, 0)=2.22591002E−15
  G(8, 0)=−2.65599209E−18
  G(9, 0)=−4.37667698E−20
  G(10, 0)=8.81280636E−23
  G(0, 2)=−0.00145858338
  G(1, 2)=−1.84089413E−6
  G(2, 2)=1.76285407E−9
  G(3, 2)=5.75006885E−10
  G(4, 2)=−2.93017283E−12
  G(5, 2)=−2.39557673E−16
  G(6, 2)=−2.01658958E−17
  G(7, 2)=1.39883238E−19
  G(8, 2)=3.66316782E−22
  G(0, 4)=6.00791862E−9
  G(1, 4)=3.66027942E−10
  G(2, 4)=−2.69443810E−12
  G(3, 4)=−7.16547677E−15
  G(4, 4)=2.87291731E−17
  G(5, 4)=4.83552190E−19
  G(6, 4)=−2.23175448E−21
  G(0, 6)=−1.93013432E−12
  G(1, 6)=3.25306682E−15
  G(2, 6)=6.46850475E−17
  G(3, 6)=6.63063775E−19
  G(4, 6)=−2.96001045E−21
  G(0, 8)=2.49205301E−16
  G(1, 8)=−3.40177648E−18
  G(2, 8)=7.51614539E−21
  G(0, 10)=3.74458663E−21
N'=−1.00000

S16 (First Flat Mirror F1)
Coordinates:

| O:  | 179.17601, 26.02362, 0.00000        |
| --- | ----------------------------------- |
| VX: | 0.92688579, −0.37534349, 0.00000000 |
| VY: | 0.37534349, 0.92688579, 0.00000000  |

N=1.00000
C0=0.00000000 (r=∞)
N'=−1.00000

Si (Secondary Image Surface)
Coordinates:

| O:  | 275.70307, 656.69871, 0.00000         |
| --- | ------------------------------------- |
| VX: | −0.92688579, 0.37534349, 0.00000000   |
| VY: | −0.37534349, −0.92688579, 0.00000000  |

Imaginary Aperture Stop Data
Coordinates:

| O:  | 35.72351, 0.00000, 0.00000        |
| --- | --------------------------------- |
| VX: | 1.00000000, 0.00000000, 0.00000000 |
| VY: | 0.00000000, 1.00000000, 0.00000000 |

N=1.00000
C0=0.00000000 (r=∞), R=5.15624
N'=1.00000

Construction Data of Example 5

So (Primary Image Surface)
Coordinates:

| O:  | 0.00000, 0.00000, 0.00000         |
| --- | --------------------------------- |
| VX: | 1.00000000, 0.00000000, 0.00000000 |
| VY: | 0.00000000, 1.00000000, 0.00000000 |

N=1.00000
C0=0.00000000 (r=∞)
N'=1.00000
T'=0.5

S1 (Entrance-Side Surface of Cover Glass CG)
N=1.00000
C0=0.00000000 (r=∞)
N'=1.51045, vd=61.19
T'=3

S2 (Exit-Side Surface of Cover Glass CG)
N=1.51045, vd=61.19
C0=0.00000000 (r=∞)
N'=1.00000

S3* (Entrance-Side Surface of Lens L5)
Coordinates:

| O: | 33.20000, 0.06088, 0.00000 |
|---|---|
| VX: | 0.99924677, 0.03880587, 0.00000000 |
| VY: | −0.03880587, 0.99924677, 0.00000000 |

N=1.00000
C0=0.00844974(r=118.3469)

Aspherical Surface Data:
  $\epsilon$=1.00000000
  A(4)=−4.34498412E−5
  A(6)=−5.42112137E−10
  A(8)=−5.03391393E−9
  A(10)=8.79566363E−11
N'=1.74689, vd=49.33
T'=2

S4 (Exit-Side Surface of Lens L5)
N=1.74689, vd=49.33
C0=0.00000000 (r=∞)
N'=1.00000
T'=1.43221

S5 (Aperture Stop ST)
N=1.00000
C0=0.00000000 (r=∞), R=5.16
N'=1.00000
T'=2.29803

S6 (Entrance-Side Surface of Lens L4)
N=1.00000
C0=−0.02626016(r=−38.0805)
N'=1.76167, vd=27.53
T'=0.822209

S7 (Bonded Surface of Lens L4)
N=1.76167, vd=27.53
C0=0.04049134(r=24.6966)
N'=1.62032, vd=63.39
T'=3.39389

S8 (Exit-side Surface of Lens L4)
N=1.62032, vd=63.39
C0=−0.04445374(r=−22.4953)
N'=1.00000
T'=10.6368

S9 (Entrance-side Surface of Lens L3)
N=1.00000
C0=−0.00929704(r=−107.5612)
N'=1.70559, vd=41.15
T'=5.2254

S10 (Exit-side Surface of Lens L3)
N=1.70559, vd=41.15
C0=−0.04585680 (r=−21.8070)
N'=1.00000
T'=34.9631

S11 (Entrance-Side Surface of Lens L2)
N=1.00000
C0=−0.05323455(r=−18.7848)
N'=1.67340, vd=47.20
T'=2.10901

S12 (Exit-Side Surface of Lens L2)
N=1.67340, vd=47.20
C0=−0.01611080 (r=−62.0702)
N'=1.00000
T'=16.2565

S13$ (Entrance-Side Surface of Lens L1)
N=1.00000
C0=−0.01961906(r=−50.9708)

Aspherical Surface Data:
  $\epsilon$=1.00000000
  G(2, 0)=−0.00254135070
  G(3, 0)=0.000115295827
  G(4, 0)=−1.87552142E−6
  G(5, 0)=1.54773685E−7
  G(6, 0)=1.03041806E−9
  G(7, 0)=−4.36446481E−10
  G(8, 0)=−3.25477379E−11
  G(9, 0)=2.79815832E−12
  G(10, 0)=−4.66040823E−14
  G(0, 2)=−0.00189476662
  G(1, 2)=0.000115821570
  G(2, 2)=−2.46758254E−6
  G(3, 2)=−1.20769090E−7
  G(4, 2)=4.90506721E−8
  G(5, 2)=−2.91816079E−9
  G(6, 2)=−1.16052359E−10
  G(7, 2)=1.30898836E−11
  G(8, 2)=−2.54224529E−13
  G(0, 4)=1.53299406E−6
  G(1, 4)=−3.48039135E−7
  G(2, 4)=4.23487510E−8
  G(3, 4)=−1.87053543E−9
  G(4,4)=−1.12835080E−10
  G(5, 4)=1.29658921E−11
  G(6, 4)=−2.87454996E−13
  G(0, 6)=5.40708807E−10
  G(1, 6)=6.89896599E−10
  G(2, 6)=−8.95551154E−11
  G(3, 6)=5.40969772E−12
  G(4, 6)=−1.26127727E−13
  G(0, 8)=−3.33821344E−12
  G(1, 8)=−5.17137706E−13
  G(2, 8)=3.38951155E−14
  G(0, 10)=6.05583823E−15
N'=1.52729, vd=56.38
T'=3.25156

S14 (Exit-Side Surface of Lens L1)
N=1.52729, vd=56.38
C0=−0.01970268(r=−50.7545)
N'=1.00000

S15* (Second Power Mirror M2)
Coordinates:

| O: | 141.06651, −1.86431, 0.00000 |
|---|---|
| VX: | 0.94370000, −0.33080252, 0.00000000 |
| VY: | 0.33080252, 0.94370000, 0.00000000 |

N=1.00000
C0=−0.00454287(r=−220.1249)

Aspherical Surface Data:
  $\epsilon$=1.00000000
  A(4)=7.61357271E−7
  A(6)=−2.13761178E−10

A(8)=3.48208153E−14
A(10)=−2.33392487E−18
N'=−1.00000

S16* (First Power Mirror M1)

Coordinates:

| O: | 61.19744, 62.94728, 0.00000 |
| VX: | −0.81504220, 0.57940160, 0.00000000 |
| VY: | 0.57940160, 0.81504220, 0.00000000 |

N=1.00000
C0=0.02866923(r=34.8806)

Aspherical Surface Data:
ϵ=−2.90628891
A(4)=−6.54902009E−8
A(6)=5.36445900E−12
A(8)=−2.38872865E−16
A(10)=4.31974092E−21
N'=−1.00000

S17 (First Flat Mirror F1)

Coordinates:

| O: | 147.25129, −10.02980, 0.00000 |
| VX: | 0.84088579, −0.54121261, 0.00000000 |
| VY: | 0.54121261, 0.84088579, 0.00000000 |

N=1.00000
C0=0.00000000 (r=∞)
N'=−1.00000

Si (Secondary Image Surface)

Coordinates:

| O: | 302.94739, 531.20344, 0.00000 |
| VX: | −0.84088579, 0.54121261, 0.00000000 |
| VY: | −0.54121261, −0.84088579, 0.00000000 |

Construction Data of Example 6

So (Primary Image Surface)

Coordinates:

| O: | 0.00000, 0.00000, 0.00000 |
| VX: | 1.00000000, 0.00000000, 0.00000000 |
| VY: | 0.00000000, 1.00000000, 0.00000000 |

N=1.00000
C0=0.00000000 (r=∞)
N'=1.00000
T'=0.5

S1 (Entrance-Side Surface of Cover Glass CG)
N=1.00000
C0=0.00000000 (r=∞)
N'=1.51045, vd=61.19
T'=3

S2 (Exit-Side Surface of Cover Glass CG)
N=1.51045, vd=61.19
C0=0.00000000 (r=∞)
N'=1.00000

S3* (Entrance-Side Surface of Lens L8)

Coordinates:

| O: | 33.20000, 0.52376, 0.00000 |
| VX: | 0.99974238, −0.02269753, 0.00000000 |
| VY: | 0.02269753, 0.99974238, 0.00000000 |

N=1.00000
C0=−0.03120243(r=−32.0488)

Aspherical Surface Data:
ϵ=1.00000000
A(4)=−5.90605911E−5
A(6)=−2.71749917E−7
A(8)=4.09983339E−9
A(10)=−5.57568275E−11
N'=1.77638, vd=27.20
T'=2.0035

S4 (Exit-Side Surface of Lens L8)
N=1.77638, vd=27.20
C0=0.00000000 (r=∞)
N'=1.00000
T'=0

S5 (Aperture Stop ST)
N=1.00000
C0=0.00000000 (r=∞), R=5.7
N'=1.00000
T'=1.31148

S6 (Entrance-Side Surface of Lens L7)
N=1.00000
C0=0.01562647(r=63.9940)
N'=1.76109, vd=27.18
T'=1.20058

S7 (Bonded Surface of Lens L7)
N=1.76109, vd=27.18
C0=0.04524503(r=22.1019)
N'=1.75491, vd=52.14
T'=3.66711

S8 (Exit-Side Surface of Lens L7)
N=1.75491, vd=52.14
C0=−0.05766619(r=−17.3412)
N'=1.00000
T'=0.298118

S9 (Entrance-Side Surface of Lens L6)
N=1.00000
C0=−0.02841175(r=−35.1967)
N'=1.61518, vd=36.31
T'=3.84278

S10 (Bonded Surface of Lens L6)
N=1.61518, vd=36.31
C0=−0.09316716(r=−10.7334)
N'=1.79321, vd=26.06
T'=1.8

S11 (Exit-Side Surface of Lens L6)
N=1.79321, vd=26.06
C0=0.00952410 (r=104.9968)

N'=1.00000
T'=9.15513

S12 (Entrance-Side Surface of Lens L5)
N=1.00000
C0=−0.01079619(r=−92.6253)
N'=1.80927, vd=25.56
T'=7.10731

S13 (Exit-Side Surface of Lens L5)
N=1.80927, vd=25.56
C0=−0.04275071(r=−23.3914)
N'=1.00000
T'=13.3791

S14 (Entrance-Side Surface of Lens L4)
N=1.00000
C0=0.01077861(r=92.7764)
N'=1.80681, vd=28.16
T'=5.2

S15 (Exit-Side Surface of Lens L4)
N=1.80681, vd=28.16
C0=−0.00500527(r=−199.7893)
N'=1.00000
T'=13.0492

S16 (Entrance-Side Surface of Lens L3)
N=1.00000
C0=0.00038365(r=2606.5318)
N'=1.75386, vd=52.25
T'=7.68826

S17 (Bonded Surface of Lens L3)
N=1.75386, vd=52.25
C0=−0.03411557(r=−29.3121)
N'=1.77159, vd=26.79
T'=2.94078

S18 (Exit-Side Surface of Lens L3)
N=1.77159, vd=26.79
C0=0.01860106(r=53.7604)
N'=1.00000
T'=12.6573

S19 (Entrance-Side Surface of Lens L2)
N=1.00000
C0=−0.04776031(r=−20.9379)
N'=1.79171, vd=26.10
T'=3

S20 (Exit-Side Surface of Lens L2)
N=1.79171, vd=26.10
C0=−0.02811823(r=−35.5641)
N'=1.00000
T'=30.8302

S21$ (Entrance-Side Surface of Lens L1)
N=1.00000
C0=−0.02932993(r=−34.0949)
Aspherical Surface Data:
  $\epsilon$=1.00000000
  G(2, 0)=0.000531360278
  G(3, 0)=2.88095919E−5
  G(4, 0)=−3.47968400E−6
  G(5, 0)=3.59230926E−8
  G(6, 0)=1.45515392E−9
  G(7, 0)=−4.08886074E−11
  G(8, 0)=−1.53652231E−13
  G(9, 0)=7.71773568E−15
  G(10, 0)=−1.59895780E−16
  G(0, 2)=0.000588508687
  G(1, 2)=2.54697110E−5
  G(2, 2)=−3.09115193E−6
  G(3, 2)=−1.49555805E−7
  G(4, 2)=1.02398516E−8
  G(5, 2)=−1.35351791E−10
  G(6, 2)=−1.24601650E−12
  G(7, 2)=−5.07736637E−14
  G(8, 2)=1.00923527E−15
  G(0, 4)=−6.12497020E−7
  G(1, 4)=−1.03030103E−7
  G(2, 4)=6.39027845E−9
  G(3, 4)=4.81182122E−11
  G(4, 4)=−7.09442936E−12
  G(5, 4)=−1.44507262E−13
  G(6, 4)=5.86327137E−15
  G(0, 6)=5.03036466E−10
  G(1, 6)=1.18773933E−10
  G(2, 6)=−9.97153071E−12
  G(3, 6)=1.12788823E−13
  G(4, 6)=2.34108101E−15
  G(0, 8)=−1.65200776E−12
  G(1, 8)=−5.46121788E−14
  G(2, 8)=4.34100363E−15
  G(0, 10)=1.20305385E−15
N'=1.52729, vd=56.38
T'=5

S22 (Exit-Side Surface of Lens L1)
N=1.52729, vd=56.38
C0=−0.02660134(r=−37.5921)
N'=1.00000

S23* (First Power Mirror M1)
Coordinates:

| O: | 295.52060, −13.46506, 0.00000 |
| VX: | 0.99861593, −0.05259487, 0.00000000 |
| VY: | 0.05259487, 0.99861593, 0.00000000 |

N=1.00000
C0=0.01236714(r=80.8595)
Aspherical Surface Data:
  $\epsilon$=−4.59296886
  A(4)=−2.16422720E−8
  A(6)=1.00518643E−12
  A(8)=−2.98750271E−17
  A(10)=5.04219213E−22
  A(12)=−3.61772802E−27
N'=−1.00000

S24 (Second Flat Mirror F2)
Coordinates:

| O: | 257.41195, 191.61954, 0.00000 |
| VX: | −0.97753162, 0.21078883, 0.00000000 |
| VY: | 0.21078883, 0.97753162, 0.00000000 |

N=1.00000
C0=0.00000000 (r=∞)
N'=−1.00000

S25 (First Flat Mirror F1)

Coordinates:

| O: | 463.30474, 360.85577, 0.00000 |
| VX: | 0.93411159, −0.35698114, 0.00000000 |
| VY: | 0.35698114, 0.93411159, 0.00000000 |

N=1.00000  
C0=0.00000000 (r=∞)  
N'=−1.00000

Si (Secondary Image Surface)

Coordinates:

| O: | 412.55325, 690.26377, 0.00000 |
| VX: | −0.93411159, 0.35698114, 0.00000000 |
| VY: | −0.35698114, −0.93411159, 0.00000000 |

Construction Data of Example 7

So (Primary Image Surface)

Coordinates:

| O: | 0.00000, 0.00000, 0.00000 |
| VX: | 1.00000000, 0.00000000, 0.00000000 |
| VY: | 0.00000000, 1.00000000, 0.00000000 |

N=1.00000  
C0=0.00000000 (r=∞)  
N'=1.00000  
T'=0.47

S1 (Entrance-Side Surface of Cover Glass CG)  
N=1.00000  
C0=0.00000000 (r=∞)  
N'=1.51872, νd=64.20  
T'=3

S2 (Exit-Side Surface of Cover Glass CG)  
N=1.51872, νd=64.20  
C0=0.00000000 (r=∞)  
N'=1.00000

S3* (Fourth Power Mirror M4)

Coordinates:

| O: | 92.11141, −65.64228, 0.00000 |
| VX: | 0.92359231, −0.38337611, 0.00000000 |
| VY: | 0.38337611, 0.92359231, 0.00000000 |

N=1.00000  
C0=−0.00951851(r=−105.0585)  
Aspherical Surface Data:  
 ε=1.00000000  
 A(4)=2.69503344E−8  
 A(6)=3.40314345E−12  
 A(8)=−3.49032173E−16  
 A(10)=8.32026999E−20  
N'=−1.00000

S4* (Entrance-Side Surface of Lens L1)

Coordinates:

| O: | 47.40572, −44.58338, 0.00000 |
| VX: | −0.92709818, −0.37481857, 0.00000000 |
| VY: | −0.37481857, 0.92709818, 0.00000000 |

N=1.00000  
C0=0.00000000 (r=∞)

Aspherical Surface Data:  
 ε=1.00000000  
 A(4)=2.16101360E−6  
 A(6)=1.04082924E−9  
 A(8)=−1.11804091E−13  
 A(10)=−1.34638049E−15  
N'=1.52438, νd=52.20

S5 (Exit-Side Surface of Lens L1)

Coordinates:

| O: | 42.00821, −38.33420, 0.00000 |
| VX: | −0.92245737, −0.38609894, 0.00000000 |
| VY: | −0.38609894, 0.92245737, 0.00000000 |

N=1.52438, νd=52.20  
C0=0.00000000 (r=∞)  
N'=1.00000

S6* (Third Power Mirror M3)

Coordinates:

| O: | 22.28507, −35.32351, 0.00000 |
| VX: | −0.99540363, 0.09576851, 0.00000000 |
| VY: | 0.09576851, 0.99540363, 0.00000000 |

N=1.00000  
C0=0.01083475(r=92.2956)

Aspherical Surface Data:  
 ε=2.98919957  
 A(4)=2.03028917E−6  
 A(6)=4.86059722E−9  
 A(8)=−1.37047460E−12  
 A(10)=−4.07715438E−15  
 A(12)=2.47961887E−17  
N'=−1.00000

S7$ (Second Power Mirror M2)

Coordinates:

| O: | 80.73163, −88.73378, 0.00000 |
| VX: | 0.98976601, −0.14269985, 0.00000000 |
| VY: | 0.14269985, 0.98976601, 0.00000000 |

N=1.00000  
C0=0.00000000 (r=∞)

Aspherical Surface Data:  
 ε=1.00000000  
 G(2, 0)=0.000763094324

G(3, 0)=7.98759927E6
G(4, 0)=−5.05072108E−7
G(5, 0)=−7.55128099E−9
G(6, 0)=3.79654548E−11
G(7, 0)=2.24274584E−12
G(8, 0)=3.77608237E−14
G(9, 0)=4.72935916E−16
G(10, 0)=3.07837577E−18
G(0, 2)=0.000406501254
G(1, 2)=−3.57585284E−5
G(2, 2)=−1.16602083E−6
G(3, 2)=2.93098479E−9
G(4, 2)=6.88481993E−10
G(5, 2)=1.13276388E−11
G(6, 2)=1.10778179E−14
G(7, 2)=−1.24262385E−15
G(8, 2)=−1.01910384E−17
G(0, 4)=5.17599222E−7
G(1, 4)=3.38689042E−8
G(2, 4)=8.45989777E−10
G(3, 4)=5.76267730E−12
G(4, 4)=−1.88444408E−13
G(5, 4)=−3.77447076E−15
G(6, 4)=−1.43619637E−17
G(0, 6)=−2.02806547E−10
G(1, 6)=−1.16411195E−11
G(2, 6)=−2.72639481E−13
G(3, 6)=−4.73963383E−15
G(4, 6)=−4.10264902E−17
G(0, 8)=5.65543016E−14
G(1, 8)=3.05481633E−15
G(2, 8)=2.85771821E−17
G(0, 10)=5.54389329E−18
N'=−1.00000

S8$ (First Power Mirror M1)

Coordinates:

| O: | 30.65366, −58.34461, 0.00000 |
| VX: | −0.99980012, −0.01999278, 0.00000000 |
| VY: | −0.01999278, 0.99980012, 0.00000000 |

N=1.00000
C0=0.03907810 (r=25.5898)

Aspherical Surface Data:
  ε=−3.45352228
  G(2, 0)=0.00197687882
  G(3, 0)=4.88316039E−5
  G(4, 0)=3.39143708E−7
  G(5, 0)=−3.97086811E−10
  G(6, 0)=−2.48852956E−11
  G(7, 0)=−2.05046400E−13
  G(8, 0)=−8.89351381E−16
  G(9, 0)=−2.24656044E−18
  G(10, 0)=−2.77658285E−21
  G(0, 2)=0.000281136883
  G(1, 2)=1.24916945E−5
  G(2, 2)=−7.43330221E−7
  G(3, 2)=−2.25639168E−8
  G(4, 2)=−2.88390511E−10
  G(5, 2)=−1.99117480E−12
  G(6, 2)=−7.12212861E−15
  G(7, 2)=−9.16561809E−18
  G(8, 2)=6.12254049E−21
  G(0, 4)=−3.99009057E−7
  G(1, 4)=−1.38768755E−8
  G(2, 4)=−2.29189970E−10
  G(3, 4)=−2.41660769E−12
  G(4, 4)=−1.71522697E−14
  G(5, 4)=−7.33699409E−17
  G(6, 4)=−1.37795656E−19
  G(0, 6)=4.10840678E−11
  G(1, 6)=1.21564310E−12
  G(2, 6)=1.50223192E−14
  G(3, 6)=8.80810704E−17
  G(4, 6)=1.98828477E−19
  G(0, 8)=−1.47289776E−15
  G(1, 8)=−2.04622983E−17
  G(2, 8)=−7.03240889E−20
  G(0, 10)=−1.65357576E−21
N'=−1.00000

S9 (Second Flat Mirror F2)

Coordinates:

| O: | 54.86538, −251.38662, 0.00000 |
| VX: | 0.99672931, −0.08081267, 0.00000000 |
| VY: | 0.08081267, 0.99672931, 0.00000000 |

N=1.00000
C0=0.00000000 (r=∞)
N'=−1.00000

S10 (First Flat Mirror F1)

Coordinates:

| O: | −90.84794, −503.11167, 0.00000 |
| VX: | −0.98686332, 0.16155739, 0.00000000 |
| VY: | 0.16155739, 0.98686332, 0.00000000 |

N=1.00000
C0=0.00000000 (r=∞)
N'=−1.00000

Si (Secondary Image Surface)

Coordinates:

| O: | −29.50845, −871.19325, 0.00000 |
| VX: | 0.98686332, −0.16155739, 0.00000000 |
| VY: | −0.16155739, −0.98686332, 0.00000000 |

Imaginary Aperture Stop Data

Coordinates:

| O: | 100400.00000, −25032.53150, 0.00000 |
| VX: | 1.00000000, 0.00000000, 0.00000000 |
| VY: | 0.00000000, 1.00000000, 0.00000000 |

N=1.00000
C0=0.00000000 (r=∞), R=14491.5
N'=1.00000

TABLE 1

| Ex. | (1) $\theta 1$ | (2) CoR2Zmax − CoR2Zmin | (3), (3a) | | | (4) CoR1Zmin − CoR1Zmax | (5) (CoR1Zmin − CoR1Ymin)/ (CoR1Zmax − CoR1Ymax) | Sign Reversal Y(Co = 0) |
|---|---|---|---|---|---|---|---|---|
| | | | $\alpha$ max | $\alpha$ min | $\alpha$ max/ $\alpha$ min | | | |
| 1 | 4.1 | 0.0022 | 77.58 | 61.49 | 1.26 | 0.017 | 4.2 | −2.531 |
| 2 | — | 0.0011 | 76.55 | 52.65 | 1.45 | 0.018 | 4.7 | −2.531 |
| 3 | 3.6 | 0.0032 | 75.93 | 56.21 | 1.35 | 0.018 | 2.8 | 1.721 |
| 4 | — | 0.0038 | 75.34 | 48.34 | 1.56 | 0.023 | 2.9 | 1.114 |
| 5 | — | 0.0024 | 72.86 | 25.9 | 2.81 | 0.020 | 0.8 | −2.531 |
| 6 | 8.7 | — | 69.9 | 43.66 | 1.60 | 0.006 | 1.4 | −0.810 |
| 7 | 4.7 | 0.0022 | 75.86 | 48.34 | 1.57 | 0.015 | 4.0 | −3.026 |

What is claimed is:

1. An oblique projection optical system for performing enlargement projection from a primary image surface on a reduction side to a secondary image surface on an enlargement side, the oblique projection optical system comprising: in order along a projection optical path from a secondary image surface side,
   only one curved reflective surface; and
   a lens unit having a plurality of lens elements,
   wherein the curved reflective surface has a portion having a positive optical power and a portion having a negative optical power, and
   wherein, given that a principal ray emitted from a center of the primary image surface and passing through a center of an aperture stop is a central principal ray, the curved reflective surface includes at an intersection thereof with the central principal ray a direction having a positive optical power and a direction having a negative optical power.

2. The oblique projection optical system according to claim 1,
   wherein the direction having a positive optical power and the direction having a negative optical power are two directions orthogonal to each other at the intersection.

3. The oblique projection optical system according to claim 2
   wherein the two directions orthogonal to each other at the intersection correspond to an image vertical direction and an image horizontal direction.

4. The oblique projection optical system according to claim 1, wherein, given that a direction normal to the secondary image surface is an Xi direction, that an image shorter-side direction of the secondary image surface is a Yi direction, and that an XiYi plane including a center of the secondary image surface is a PXiYi plane, an effective optical region of the curved reflective surface on an optical extension plane of the PXiYi plane is formed of a concavely shaped portion having a positive optical power and a convexly shaped portion having a negative optical power.

5. An oblique projection optical system for performing enlargement projection from a primary image surface on a reduction side to a secondary image surface on an enlargement side, the oblique projection optical system comprising: in order along a projection optical path from a secondary image surface side,
   only one curved reflective surface; and
   a lens unit having a plurality of lens elements,
   wherein the curved reflective surface has a portion having a positive optical power and a portion having a negative optical power,
   wherein at least one rotation-symmetric optical element is provided which has an optical power and whose rotation-symmetric shape is formed at least partly with either of the curved reflective surface or a refractive surface of the lens unit, and
   wherein, given that a direction normal to the primary image surface is an Xo direction, that an image shorter-side direction of the primary image surface is a Yo direction, and that an XoYo plane including a center of the primary image surface is a PXoYo plane, a rotation center axis of said at least one rotation-symmetric optical element lies within an optical extension plane of the PXoYo plane and also is not parallel to an optical extension direction of the Xo direction.

6. The oblique projection optical system according to claim 5, wherein at least one rotation-asymmetric optical surface is provided on the projection optical path.

7. The oblique projection optical system according to claim 6,
   wherein the rotation-asymmetric optical surface is a refractive surface so formed as to be rotation-asymmetric.

8. The oblique projection optical system according to claim 6, wherein the rotation-asymmetric optical surface is the curved reflective surface so formed as to be rotation-asymmetric.

9. An oblique projection optical system for performing enlargement projection from a primary image surface on a reduction side to a secondary image surface on an enlargement side, the oblique projection optical system comprising: in order along a projection optical path from a secondary image surface side,
   only one curved reflective surface; and
   a lens unit having a plurality of lens elements,
   wherein the curved reflective surface has a portion having a positive optical power and a portion having a negative optical power,
   wherein a maximum value of an angle of incidence that is formed by a principal ray of a projected beam with respect to the secondary image surface is 65 degrees or more, and
   wherein conditional formula (3) below is fulfilled:

$$1.05 < (\alpha max/\alpha min) < 3 \qquad (3)$$

where
   $\alpha$max represents the maximum value (in degrees) of the angle of incidence that is formed by the principal ray of the projected beam with respect to the secondary image surface, and αmin represents a minimum value (in degrees) of the angle of incidence that is formed by the principal ray of the projected beam with respect to the secondary image surface.

10. The oblique projection optical system according to claim 9,
wherein, given that a direction normal to the secondary image surface is an Xi direction, that an image shorter-side direction of the secondary image surface is a Yi direction, that an XiYi plane including a center of the secondary image surface is a PXiYi plane, that, of beams on the PXiYi plane that reach the secondary image surface, the beam having a principal ray which forms a largest angle with the Xi direction when incident on the secondary image surface is RaysXiYiθmax and the beam having a principal ray which forms a smallest angle with the Xi direction when incident on the secondary image surface is RaysXiYiθmin, and that a direction perpendicular to an optical extension plane of the PXiYi plane is a Zi direction, conditional formula (4) below is fulfilled:

$$(CoR1Zmin - CoR1Zmax) > 0 \quad (4)$$

where
CoR1Zmax represents a curvature of the curved reflective surface in the Zi direction near a region where the beam RaysXiYiθmax is reflected on the curved reflective surface on the optical extension plane of the PXiYi plane, and
CoR1Zmin represents a curvature of the curved reflective surface in the Zi direction near a region where the beam RaysXiYiθmin is reflected on the curved reflective surface on the optical extension plane of the PXiYi plane.

11. The oblique projection optical system according to claim 10,
wherein conditional formula (5) below be fulfilled:

$$(CoR1Zmin - CoR1Ymin)/(CoR1Zmax - CoR1Ymax) > 1 \quad (5)$$

where
CoR1Ymax represents a curvature of the curved reflective surface in the Yi direction near the region where the beam RaysXiYiθmax is reflected on the curved reflective surface on the optical extension plane of the PXiYi plane, and
CoR1Ymin represents a curvature of the curved reflective surface in the Yi direction near the region where the beam RaysXiYiθmin is reflected on the curved reflective surface on the optical extension plane of the PXiYi plane.

12. The oblique projection optical system according to claim 9,
wherein, given that a direction normal to the secondary image surface is an Xi direction, that an image shorter-side direction of the secondary image surface is a Yi direction, that an XiYi plane including a center of the secondary image surface is a PXiYi plane, and, that, of beams on the PXiYi plane that reach the secondary image surface, the beam having a principal ray which forms a largest angle with the Xi direction when incident on the secondary image surface is RaysXiYiθmax and the beam having a principal ray which forms a smallest angle with the Xi direction when incident on the secondary image surface is RaysXiYiθmin, a shape of an effective optical region of the curved reflective surface on an optical extension plane of the PXiYi plane is a concave having a positive optical power at a region where the beam RaysXiYiθmax is reflected and is a convex having a negative optical power at a region where the beam RaysXiYiθmin is reflected.

13. The oblique projection optical system according to claim 12,
wherein, given that a principal ray emitted from a center of the primary image surface and then passing through a center of an aperture stop is a central principal ray, and that a curvature on a line where the optical extension plane of the PXiYi plane and the curved reflective surface intersect each other is CoR1Y, a point at which a sign of the curvature CoR1Y is reversed is located closer to the region where the beam RaysXiYiθmin is reflected than the intersection of the central principal ray and the curved reflective surface.

14. The oblique projection optical system according to claim 9,
wherein, given that a direction normal to the secondary image surface is an Xi direction, that an image shorter-side direction of the secondary image surface is a Yi direction, that an XiYi plane including a center of the secondary image surface is a PXiYi plane, that a direction normal to the primary image surface is an Xo direction, that an image shorter side direction of the primary surface is a Yo direction, and that an XoYo plane including a center of the primary image surface is a PXoYo plane, an optical extension plane of the PXoYo plane and an optical extension plane of the PXiYi plane are on the same plane.

15. The oblique projection optical system according to claim 9, farther comprising:
a flat reflective surface, for bending the projection optical path such that a direction normal to the secondary image surface and an image longer-side direction of the primary image surface are parallel to each other, that is arranged between the lens unit and the curved reflective surface.

16. An image projection apparatus comprising:
an image display device that forms an image to be projected;
a light source;
an illumination optical system that guides light from the light source to the image display device; and
an oblique projection optical system for performing enlargement projection from a primary image surface on a reduction side to a secondary image surface on an enlargement side, the oblique projection optical system comprising: in order along a projection optical path from a secondary image surface side,
only one curved reflective surface; and
a lens unit having a plurality of lens elements,
wherein the curved reflective surface has a portion having a positive optical power and a portion having a negative optical power,
wherein a maximum value of an angle of incidence that is formed by a principal ray of a projected beam with respect to the secondary image surface is 65 degrees or more, and
wherein conditional formula (3) below is fulfilled:

$$1.05 < (\alpha max/\alpha min) < 3 \quad (3)$$

where
αmax represents the maximum value (in degrees) of the angle of incidence that is formed by the principal ray of the projected beam with respect to the secondary image surface, and αmin represents a minimum value (in degrees) of the angle of incidence that is formed by the principal ray of the projected beam with respect to the secondary image surface, wherein the image display device is positioned on the primary image surface.

17. An oblique projection optical system for performing enlargement projection from a primary image surface on a reduction side to a secondary image surface on an enlargement side, the oblique projection optical system comprising: in order along a projection optical path from a secondary image surface side, a first curved reflective surface;
a second curved reflective surface;
a third curved reflective surface having a negative optical power; and
a fourth curved reflective surface having a positive optical power, wherein the first curved reflective surface has a portion having a positive optical power and a portion having a negative optical power.

18. The oblique projection optical system according to claim 17, further comprising a refractive optical element having an aberration correction capability on the projection optical path.

19. The oblique projection optical system according to claim 18,
wherein the refractive optical element has at least one refractive surface formed with an aspherical surface.

20. The oblique projection optical system according to claim 17,
wherein, given that a direction normal to the secondary image surface is an Xi direction, that an image shorter-side direction of the secondary image surface is a Yi direction, that an XiYi plane including a center of the secondary image surface is a PXiYi plane, that, of beams on the PXiYi plane that reach the secondary image surface, the beam having a principal ray which forms a largest angle with the Xi direction when incident on the secondary image surface is RaysXiYiθmax and the beam having a principal ray which forms a smallest angle with the Xi direction when incident on the secondary image surface is RaysXiYiθmin, that a direction perpendicular to an optical extension plane of the PXiYi plane is a Zi direction, the second curved reflective surface fulfills conditional formula (2) below:

$$(CoR2Zmax-CoR2Zmin)>0 \qquad (2)$$

where
CoR2Zmax represents a curvature of the second curved reflective surface in the Zi direction near a region where the beam RaysXiYiθmax is reflected on the second curved reflective surface on the optical extension plane of the PXiYi plane, and CoR2Zmin represents a curvature of the second curved reflective surface in the Zi direction near a region where the beam RaysXiYiθmin is reflected on the second curved reflective surface on the optical extension plane of the PXiYi plane.

21. The oblique projection optical system according to claim 17,
wherein, given that a direction normal to the secondary image surface is an Xi direction, that an image shorter-side direction of the secondary image surface is a Yi direction, that an XiYi plane including a center of the secondary image surface is a PXiYi plane, that, of beams on the PXiYi plane that reach the secondary image surface, the beam having a principal ray which forms a largest angle with the Xi direction when incident on the secondary image surface is RaysXiYiθmax and the beam having a principal ray which forms a smallest angle with the Xi direction when incident on the secondary image surface is RaysXiYiθmin, where the second curved reflective surface and an optical extension plane of the PXiYi plane intersect each other, from a region where the beam RaysXiYiθmax is reflected to a region where the beam RaysXiYiθmin is reflected, there exists a range such that a curvature on this line once becomes large and then small.

22. The oblique projection optical system according to claim 17, further comprising,
a rotation-asymmetric aspherical surface lens that is arranged between the third curved reflective surface and the fourth curved reflective surface.

* * * * *

UNITED STATES PATENT AND TRADEMARK OFFICE
CERTIFICATE OF CORRECTION

PATENT NO. : 7,670,008 B2 Page 1 of 1
APPLICATION NO. : 11/266674
DATED : March 2, 2010
INVENTOR(S) : Tomiei Kuwa It is certified that error appears in the above-identified patent and that said Letters Patent is hereby corrected as shown below:

Column 52:
Line 31 claim 15, delete "farther" and insert -- further --.

Signed and Sealed this

Twentieth Day of April, 2010

David J. Kappos
*Director of the United States Patent and Trademark Office*